(12) United States Patent
Kobayashi et al.

(10) Patent No.: US 7,768,716 B2
(45) Date of Patent: Aug. 3, 2010

(54) ZOOM OPTICAL SYSTEM AND ELECTRONIC EQUIPMENT USING THE SAME

(75) Inventors: Yuko Kobayashi, Hachioji (JP); Noriyuki Iyama, Hachioji (JP); Ayami Imamura, Hachioji (JP)

(73) Assignee: Olympus Corporation, Tokyo (JP)

( * ) Notice: Subject to any disclaimer, the term of this patent is extended or adjusted under 35 U.S.C. 154(b) by 1156 days.

(21) Appl. No.: 11/356,205

(22) Filed: Feb. 17, 2006

(65) Prior Publication Data

US 2006/0187323 A1 Aug. 24, 2006

(30) Foreign Application Priority Data

| Feb. 21, 2005 | (JP) | 2005-044304 |
| Apr. 28, 2005 | (JP) | 2005-132563 |
| May 25, 2005 | (JP) | 2005-151949 |
| Jun. 24, 2005 | (JP) | 2005-184695 |

(51) Int. Cl.
*G02B 15/14* (2006.01)

(52) U.S. Cl. .................................. 359/682; 359/676

(58) Field of Classification Search ............... 359/676, 359/680, 682; 348/240.99–240.3; 396/72
See application file for complete search history.

(56) References Cited

U.S. PATENT DOCUMENTS

| 7,042,650 B2 * | 5/2006 | Hagimori et al. ............ 359/682 |
| 7,136,232 B2 * | 11/2006 | Komatsu et al. ............ 359/689 |
| 2005/0207024 A1 * | 9/2005 | Mihara ........................ 359/689 |

FOREIGN PATENT DOCUMENTS

JP 2003-177315 A 6/2003

\* cited by examiner

*Primary Examiner*—Darryl J Collins
(74) *Attorney, Agent, or Firm*—Kenyon & Kenyon LLP

(57) ABSTRACT

A zoom optical system that comprising: a first lens unit having a negative refractive power; a second lens unit having a positive refractive power; and a third lens unit having a positive refractive power which are arranged in order from an object side, a space between the lens units being changed to perform variation of magnification, the first lens unit includes a negative lens, the second lens unit includes a positive lens and a negative lens in order from the object side, the third lens unit includes a positive lens, and an electronic equipment provided with the zoom optical system.

33 Claims, 27 Drawing Sheets

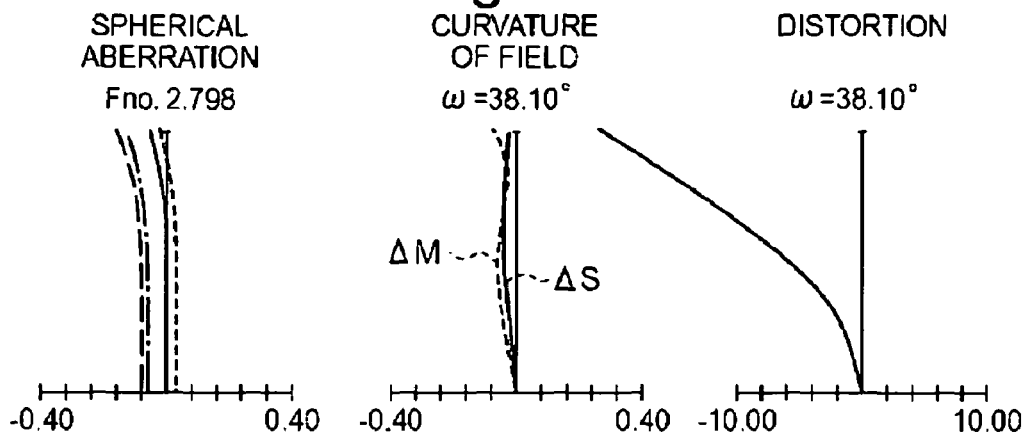
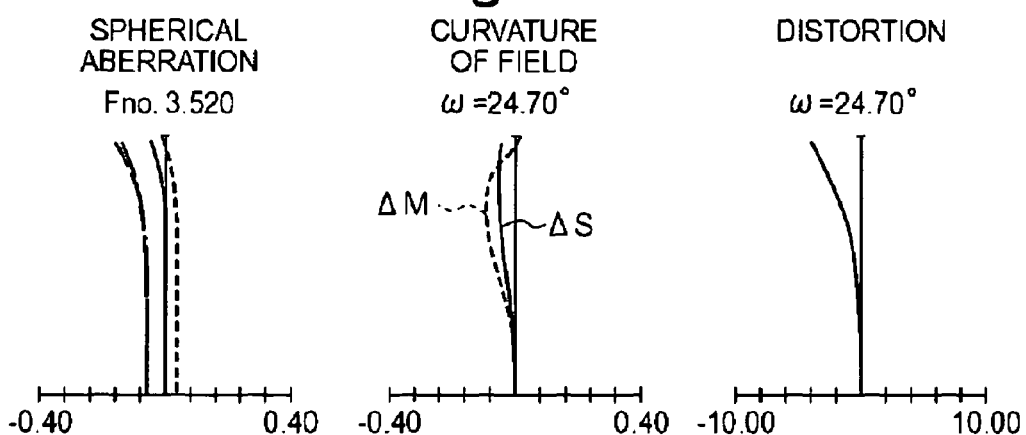
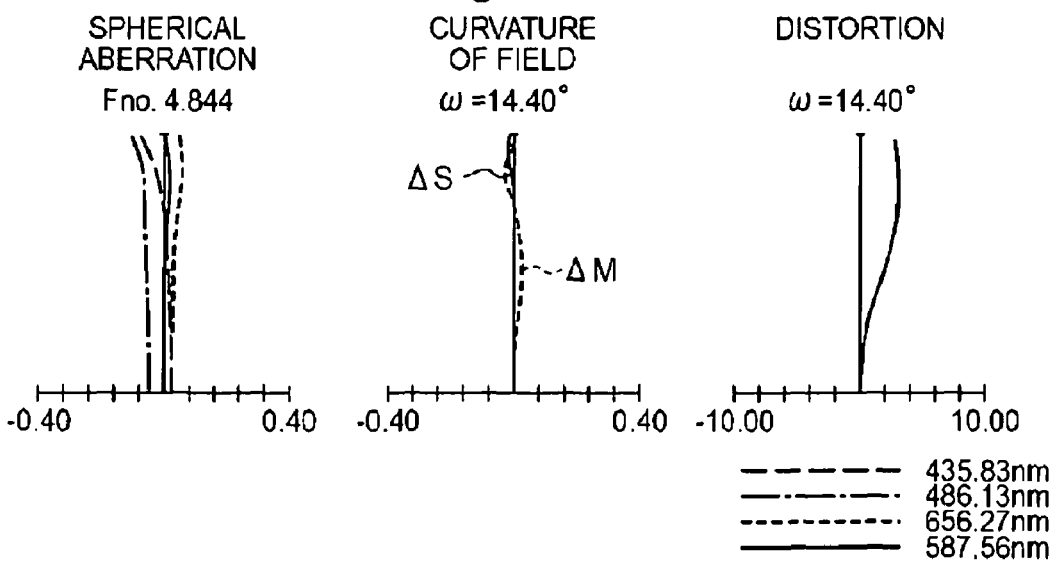

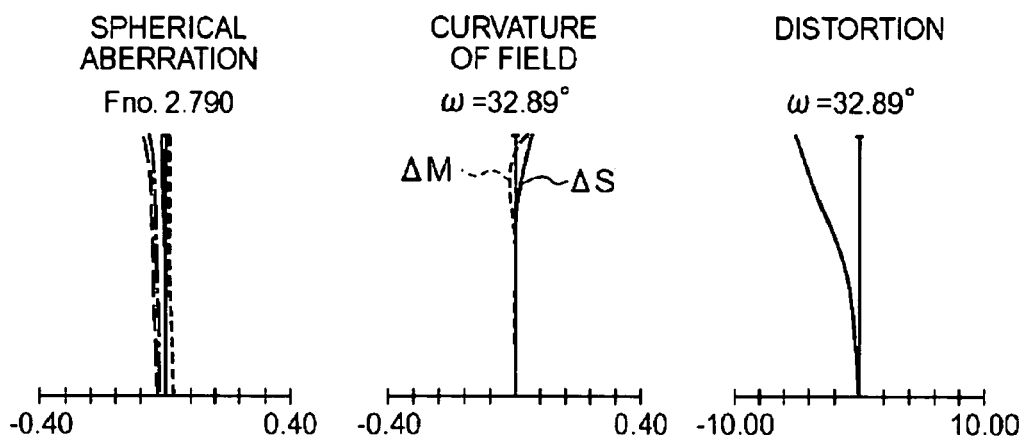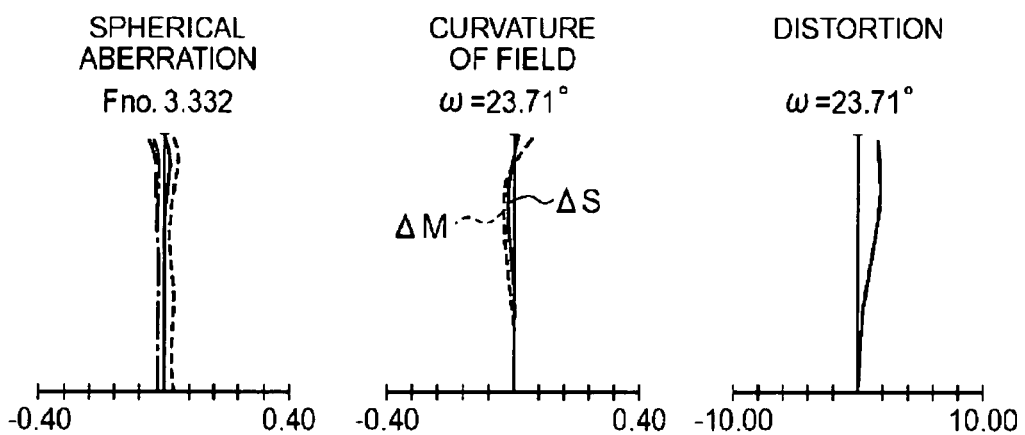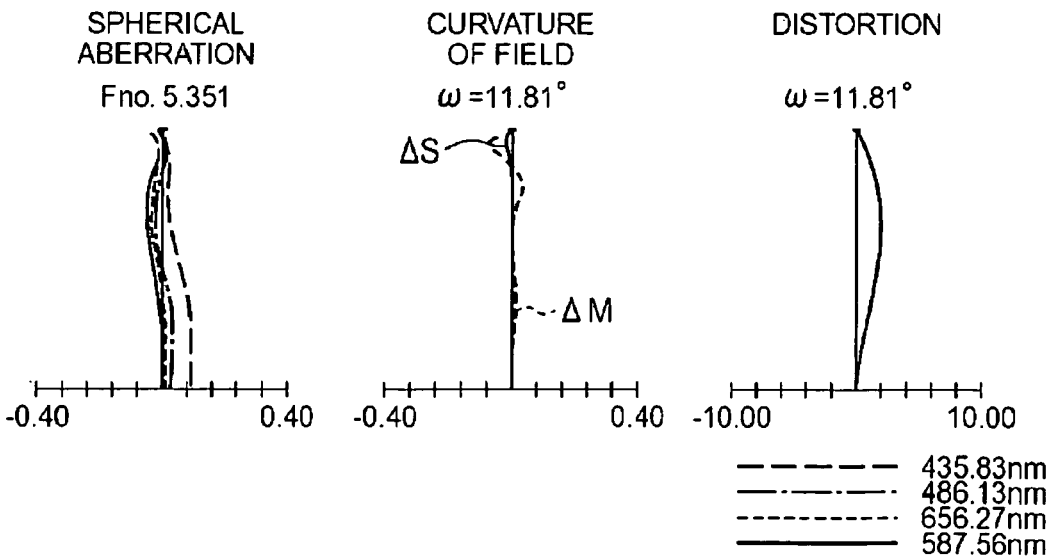

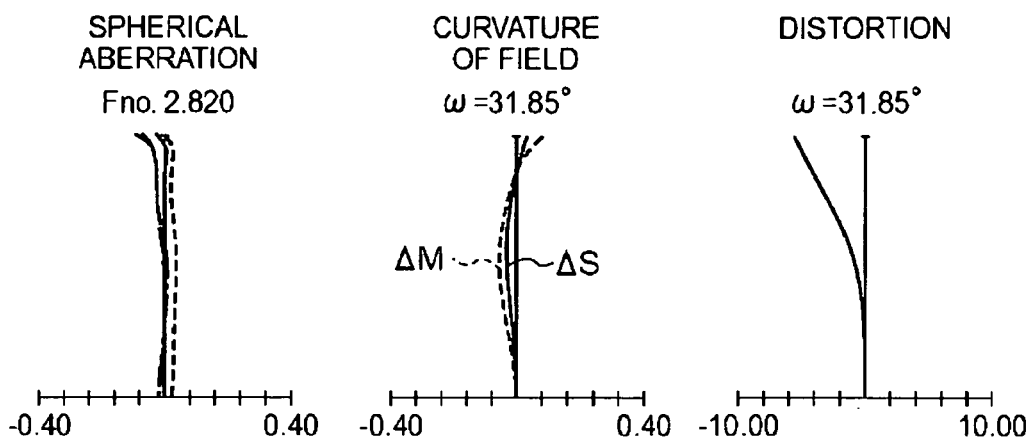
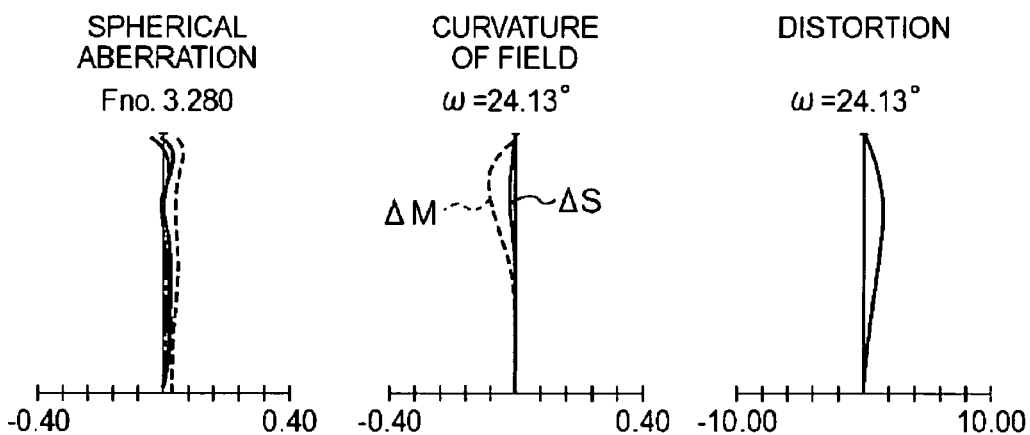
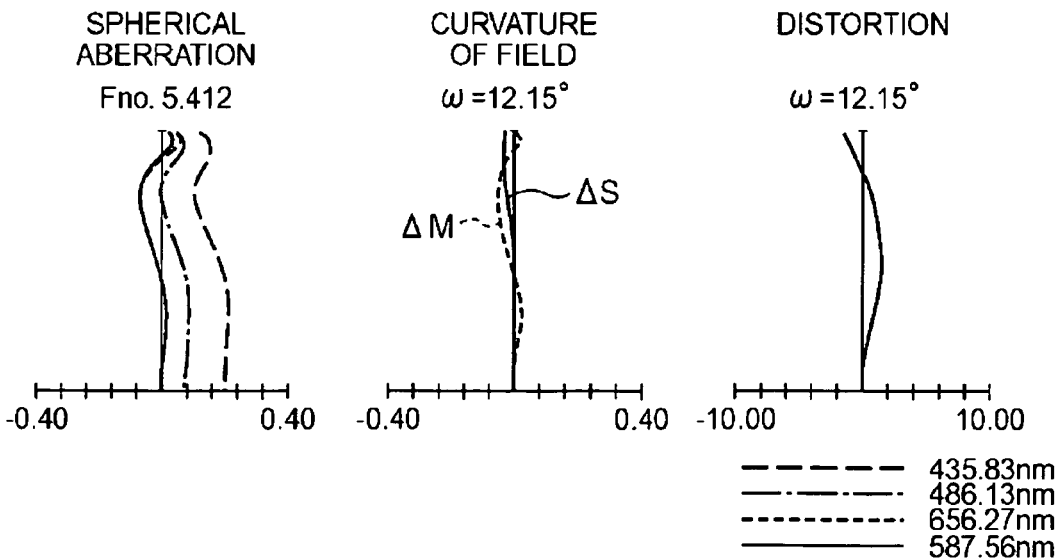

ZOOM OPTICAL SYSTEM AND ELECTRONIC EQUIPMENT USING THE SAME

CROSS REFERENCE TO RELATED APPLICATION

This application claims benefit under 35 U.S.C. §119 of Japanese Patent Applications of No. 2005-44,304, filed in Japan on Feb. 21, 2005, No. 2005-132,563, filed in Japan on Apr. 28, 2005, No. 2005-151,949, filed in Japan on May 25, 2005 and No. 2005-184,695, filed in Japan on Jun. 24, 2005, the contents of which are incorporated herein by reference.

BACKGROUND OF THE INVENTION

1. Field of the Invention

The present invention relates to a variable-magnification optical system, and an electronic equipment using this system.

2. Description of the Related Art

In these days, a personal digital assistant (PDA) or a cellular phone has explosively spread. There are also increasing compact digital cameras using electronic image sensors such as a charge coupled device (CCD) sensor and a complementary metal oxide semiconductor (CMOS) sensor, and increasing equipments in which digital video units are built. Moreover, to miniaturize such electronic equipment, it has been demanded that an imaging unit or the like disposed in such electronic equipment be miniaturized and lightened.

In these days, there has been developed an image sensor for use in such electronic equipment, whose image plane has a small size and which has a large number of pixels, for example, of the order of megapixels. Therefore, it is possible to pick up a high-definition image even having a small image size. On the other hand, to miniaturize the imaging unit by use of the image sensor, it is also demanded that an optical system for combined use with the image sensor be miniaturized and sophisticated.

As a technology concerning such miniaturization of the conventional optical system, there is proposed a zoom optical system described in, for example, Laid-Open Japanese Patent Application No. 2003-177315.

The zoom optical system described in Laid-Open Japanese Patent Application No. 2003-177315 is provided with a first lens unit having a negative refractive power, a second lens unit having a positive refractive power, and a third lens unit having a positive refractive power which are arranged in order from an object side. The first lens unit is composed of one negative lens, the second lens unit is composed of one positive lens and one negative lens which are arranged in order from the object side, and the third lens unit is composed of one positive lens. The zoom optical system is composed of four lenses divided into three lens units. The number of the lenses forming the optical system is reduced to four. Accordingly, a total length of the optical system at a wide-angle end is set to be about three or four times a focal length at the wide-angle end.

BRIEF SUMMARY OF THE INVENTION

In one aspect, a zoom optical system of the present invention is a zoom optical system comprising: a first lens unit having a negative refractive power; a second lens unit having a positive refractive power; and a third lens unit having a positive refractive power which are arranged in order from an object side, at least the first and second lens units being moved to change a space therebetween for varying magnification, wherein the first lens unit includes a negative lens, the second lens unit includes a positive lens and a negative lens in order from the object side, the third lens unit includes a positive lens, and the following condition is satisfied:

$$-5.0 < (r5+r6)/(r5-r6) < 2.0 \quad (1)$$

wherein r5 denotes a radius of curvature of an image-side surface of the positive lens in the second lens unit on an optical axis, and r6 denotes a radius of curvature of an object-side surface of the negative lens in the second lens unit on the optical axis.

In another aspect, a zoom optical system of the present invention is a zoom optical system comprising: a first lens unit having a negative refractive power; a second lens unit having a positive refractive power; and a third lens unit having a positive refractive power which are arranged in order from an object side, at least the first and second lens units being moved to change a space therebetween for varying magnification, wherein the first lens unit includes a negative lens, the second lens unit includes a positive lens and a negative lens in order from the object side, the third lens unit includes a positive lens, and the following condition is satisfied:

$$-0.1 < (r6+r7)/(r6-r7) < 5.0 \quad (2)$$

wherein r6 denotes a radius of curvature of an object-side surface of the negative lens in the second lens unit on an optical axis, and r7 denotes a radius of curvature of an image-side surface of the negative lens in the second lens unit along the optical axis.

In still another aspect, a zoom optical system of the present invention is a zoom optical system comprising: a first lens unit having a negative refractive power; a second lens unit having a positive refractive power; and a third lens unit having a positive refractive power which are arranged in order from an object side, spaces between the lens units being changed for varying magnification, wherein the following condition is satisfied:

$$-35(\%) \leq DT\min \leq -10(\%)$$

wherein DTmin is a minimum value (a unit being %) of distortion of the zoom optical system.

In further aspect, a zoom optical system of the present invention is a three-unit zoom lens system comprising: a first lens unit having a negative refractive power; a second lens unit having a positive refractive power; and a third lens unit having a positive refractive power which are arranged in order from an object side, spaces between the lens units being changed for varying magnification, wherein the first lens unit includes a double-concave negative lens, the second lens unit includes a positive lens and a negative lens in order from the object side, the third lens unit includes a positive lens, and the following condition is satisfied:

$$1.2 \text{ mm} \leq D12t \leq 3.0 \text{ mm},$$

wherein D12t denotes a space between the first lens unit and the second lens unit at a telephoto end.

In still further aspect, a zoom optical system of the present invention is a three-unit zoom lens system comprising: a first lens unit having a negative refractive power; an aperture stop; a second lens unit having a positive refractive power; and a third lens unit having a positive refractive power which are arranged in order from an object side, spaces between the lens units being changed for varying magnification, wherein the first lens unit includes a double-concave negative lens, the second lens unit includes a positive lens and a negative lens in order from the object side, the third lens unit includes a positive lens, and the following condition is satisfied:

0.3 mm≦Ds2t≦1.2 mm, wherein Ds2t denotes a space between the aperture stop and the second lens unit at a telephoto end.

Advantages of the invention will be set forth in the description which follows, and in part will be obvious from the description. Advantages of the invention may be realized and obtained by means of the instrumentalities and combinations particularly pointed out hereinafter.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 3A shows a state at the wide-angle end, FIG. 3B shows a state at an intermediate focal length position, and FIG. 3C shows a state at the telephoto end, respectively;

FIGS. 4A to 4C show spherical aberration, astigmatism, and distortion of the first embodiment, FIG. 4A shows a state at the wide-angle end, FIG. 4B shows a state at the intermediate focal length position, and FIG. 4C shows a state at the telephoto end, respectively;

FIG. 5A shows a state at the wide-angle end, FIG. 5B shows a state at an intermediate focal length position, and FIG. 5C shows a state at the telephoto end, respectively;

FIG. 6A shows a state at the wide-angle end, FIG. 6B shows a state at the intermediate focal length position, and FIG. 6C shows a state at the telephoto end, respectively;

FIG. 7A shows a state at the wide-angle end, FIG. 7B shows a state at an intermediate focal length position, and FIG. 7C shows a state at the telephoto end, respectively;

FIGS. 8A to 8C show spherical aberration, astigmatism, and distortion of the third embodiment, FIG. 8A shows a state at the wide-angle end, FIG. 8B shows a state at the intermediate focal length position, and FIG. 8C shows a state at the telephoto end, respectively;

FIG. 9A shows a state at the wide-angle end, FIG. 9B shows a state at an intermediate focal length position, and FIG. 9C shows a state at the telephoto end, respectively;

FIGS. 10A to 10C show spherical aberration, astigmatism, and distortion of the fourth embodiment, FIG. 10A shows a state at the wide-angle end, FIG. 10B shows a state at the intermediate focal length position, and FIG. 10C shows a state at the telephoto end, respectively;

FIG. 11A shows a state at the wide-angle end, FIG. 11B shows a state at an intermediate focal length position, and FIG. 11C shows a state at the telephoto end, respectively;

FIG. 12A shows a state at the wide-angle end, FIG. 12B shows a state at the intermediate focal length position, and FIG. 12C shows a state at the telephoto end, respectively;

FIG. 13A shows a state at the wide-angle end, FIG. 13B shows a state at an intermediate focal length position, and FIG. 13C shows a state at the telephoto end, respectively;

FIG. 14A shows a state at the wide-angle end, FIG. 14B shows a state at the intermediate focal length position, and FIG. 14C shows a state at the telephoto end, respectively;

FIG. 15A shows a state at the wide-angle end, FIG. 15B shows a state at an intermediate focal length position, and FIG. 15C shows a state at the telephoto end, respectively;

FIG. 16A shows a state at the wide-angle end, FIG. 16B shows a state at the intermediate focal length position, and FIG. 16C shows a state at the telephoto end, respectively;

FIG. 17A shows a state at the wide-angle end, FIG. 17B shows a state at an intermediate focal length position, and FIG. 17C shows a state at the telephoto end, respectively;

FIG. 18A shows a state at the wide-angle end, FIG. 18B shows a state at the intermediate focal length position, and FIG. 18C shows a state at the telephoto end, respectively;

FIG. 19A shows a state at the wide-angle end, FIG. 19B shows a state at an intermediate focal length position, and FIG. 19C shows a state at the telephoto end, respectively;

FIG. 20A shows a state at the wide-angle end, FIG. 20B shows a state at the intermediate focal length position, and FIG. 20C shows a state at the telephoto end, respectively;

FIG. 21A is a front view, FIG. 21B is a side view, and FIG. 21C is a sectional view of a picture taking optical system;

FIG. 22 is a front perspective view of the electronic camera, FIG. 23 is a rear perspective view of the electronic camera shown in FIG. 22 and FIG. 24 is a sectional view showing an internal constitution of the electronic camera shown in FIG. 22;

FIG. 26A is a schematic explanatory view of the electronic endoscope system, and FIG. 26B is a diagram showing the optical system built in the distal end section and the eyepiece section of the electronic endoscope;

FIG. 27 is a front perspective view of the state in which the cover of the personal computer is opened, FIG. 28 is a sectional view of the picture taking optical system built in the personal computer shown in FIG. 27, and FIG. 29 is a side view of the personal computer shown in FIG. 27.

DETAILED DESCRIPTION OF THE EMBODIMENTS

Figure 1:
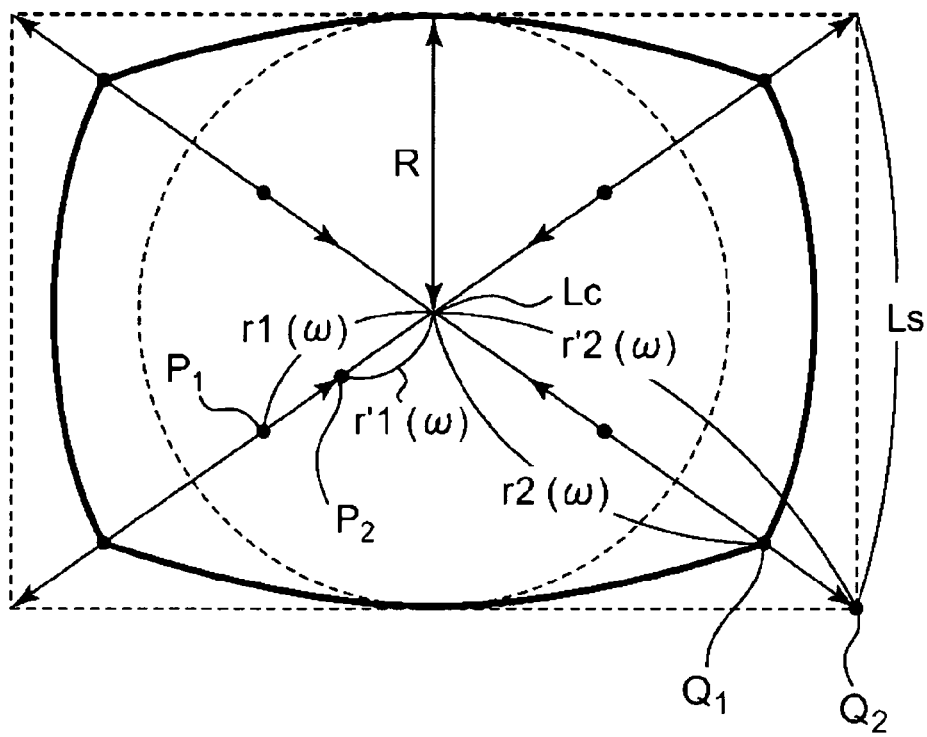
FIG. 1 is an explanatory view showing the basic concept for electrically correcting image distortion by digital signal processing.

As described above, in one aspect, the zoom optical system of the present invention comprises: a first lens unit having a negative refractive power; a second lens unit having a positive refractive power; and a third lens unit having a positive refractive power which are arranged in order from an object side. At least the first and second lens units are moved to change a space therebetween for varying magnification.

The first lens unit includes a negative lens, the second lens unit includes a positive lens and a negative lens in order from the object side, the third lens unit includes a positive lens, and the zoom optical system satisfies the following condition:

$$-5.0<(r5+r6)/(r5-r6)<2.0 \quad (1)$$

wherein r5 denotes a radius of curvature of the image-side surface of the positive lens in the second lens unit on the optical axis, and r6 denotes a radius of curvature of the object-side surface of the negative lens in the second lens unit on the optical axis.

In another aspect, the zoom optical system of the present invention comprises: a first lens unit having a negative refractive power; a second lens unit having a positive refractive power; and a third lens unit having a positive refractive power which are arranged in order from an object side. At least the first and second lens units are moved to change the space therebetween for varying magnification. The first lens unit includes a negative lens, the second lens unit includes a positive lens and a negative lens in order from the object side, the third lens unit includes a positive lens, and the zoom optical system satisfies the following condition:

$$-0.1<(r6+r7)/(r6-r7)<5.0 \quad (2)$$

wherein r6 denotes a radius of curvature of the object-side surface of the negative lens in the second lens unit on the optical axis, and r7 denotes a radius of curvature of the image-side surface of the negative lens in the second lens unit on the optical axis.

In general, an optical system used in an electronic equipment such as digital cameras is required to have comparatively long back focus. Therefore, to lengthen back focus for the focal length, it is appropriate to adopt the retrofocus type (inverted telephoto type) optical system in which the lens unit having the negative refractive power is disposed in the front.

In the zoom optical system of the present invention, the first lens unit having the negative refractive power is disposed closest to an object, and this is advantageous in widening the angle of view of the zoom optical system, and allowing the zoom optical system to have comparatively long back focus.

Moreover, when each of the first and third lens units is composed of one lens, the total length measured along the optical axis of the zoom optical system can be shortened as compared with the case where each lens unit is composed of a plurality of lenses.

Furthermore, when the lens unit having the positive refractive power is disposed as the third lens unit, the position of the exit pupil can be set to be distant from the image plane.

In addition, when the second lens unit is composed of a positive lens and a negative lens, the remaining aberration which is uncorrected by the positive lens can be corrected by the subsequent negative lens. Therefore, it is possible to effectively correct various aberrations, especially curvature of field, and chromatic aberration.

A zoom lens of the present invention preferably satisfies the following condition (1):

$$-5.0<(r5+r6)/(r5-r6)<2.0 \quad (1)$$

wherein r5 denotes a radius of curvature of the image-side surface of the positive lens in the second lens unit on the optical axis, and r6 denotes a radius of curvature of the object-side surface of the negative lens in the second lens unit on the optical axis.

When the condition (1) is satisfied, it is possible to satisfactorily correct various aberrations generated in the second lens unit, especially curvature of field and coma. Therefore, in the optical system having a shorter total length, it is possible to secure a capability to obtain a high-quality image for an image sensor having a high image resolution, for example, of the order of megapixels.

Moreover, it is possible to strengthen the refractive power of the second lens unit, and an optical system can be realized which has a high zooming ratio without increasing the total length.

If the value of (r5+r6)/(r5−r6) exceeds the upper limit of the condition (1), there increases the amount of aberrations generated by the object-side surface of the negative lens in the second lens unit, and it becomes difficult to correct curvature of field. As a result, it is difficult to secure the satisfactory performance of the zoom optical system.

On the other hand, if the value of (r5+r6)/(r5−r6) is less than the lower limit of the condition (1), it becomes difficult to correct curvature of field and coma, and it becomes difficult to secure the satisfactory performance of the zoom optical system.

It is to be noted that the following condition is further preferably satisfied:

$$-3.8<(r5+r6)/(r5-r6)<0 \quad (1\text{-}1).$$

When the condition (1-1) is satisfied, the amount of various aberrations, especially off-axial aberration can further be reduced, and it is possible to realize both miniaturization of the zoom optical system and securement of the high performance in image quality.

Moreover, in the present invention, the zoom optical system preferably satisfies the following condition (2):

$$-0.1<(r6+r7)/(r6-r7)<5.0 \tag{2}$$

wherein r6 denotes the radius of curvature of the object-side surface of the negative lens in the second lens unit on the optical axis, and r7 denotes the radius of curvature of the image-side surface of the negative lens in the second lens unit on the optical axis.

When the condition (2) is satisfied, principal points of the second lens unit can be positioned closer to the object. Therefore, the total length of the zoom optical system measured along the optical axis can be shortened, and this is advantageous for the miniaturization of the zoom optical system.

If the value of (r6+r7)/(r6−r7) exceeds the upper limit of the condition (2), fluctuations of the off-axial aberration generated by the image-side surface of the second lens unit increase, and it is difficult to keep the satisfactory performance of the zoom optical system.

On the other hand, if the value of (r6+r7)/(r6−r7) is less than the lower limit of the condition (2), the space between the principal points of the second lens unit increases, and the total length of the second lens unit increases. As a result, the total length of the zoom optical system increases, and this is disadvantage for the miniaturization.

Moreover, the zoom optical system further preferably satisfies the following condition (2-1):

$$0.1<(r6+r7)/(r6-r7)<1.81 \tag{2-1}$$

If the condition (2-1) is satisfied, the principal points of the second lens unit can be positioned closer to the object. Therefore, it is possible to further shorten the total length of the zoom optical system measured along the optical axis, and this is further advantageous for the miniaturization of the zoom optical system.

By adopting aforementioned constitution, it is possible to satisfactorily correct various aberrations generated by the second lens unit, especially curvature of field and coma. When the total length of the second lens unit is reduced, it is possible to shorten the total length of the zoom optical.

The zoom optical system preferably satisfies the following condition (3):

$$0.53 \leq r4/fw < 1.2 \tag{3}$$

wherein r4 denotes a radius of curvature of the object-side surface of the positive lens in the second lens unit on the optical axis, and fw denotes a focal length of the zoom optical system at the wide-angle end.

The condition (3) defines the ratio between the radius of curvature r4 of the object-side surface of the positive lens in the second lens unit on the optical axis and the focal length fw of the zoom optical system at the wide-angle end.

If the value of r4/fw satisfies the condition (3), it is possible to reduce the total length of the second lens unit, and this is advantageous for the miniaturization of the zoom optical system. It is also possible to suppress the generation of the spherical aberration in the second lens unit. As a result, it is possible to establish both the miniaturizing of the zoom optical system and the securing of high performance.

If the value of r4/fw exceeds the upper limit of the condition (3), the positive refractive power of the positive lens in the second lens unit weakens, and the total length of the second lens unit increases. As a result, the total length of the zoom optical system increases, and this is disadvantageous in miniaturizing the zoom optical system.

On the other hand, when the value of r4/fw is less than the lower limit of the condition (3), there increases the generation of spherical aberration by the object-side surface of the positive lens in the second lens unit, and the high image quality of the zoom optical system cannot be secured.

Moreover, the zoom optical system further preferably satisfies the following condition:

$$0.55 \leq r4/fw < 0.95 \tag{3-1}$$

When the condition formula (3-1) is satisfied, it is possible to shorten the total length along the optical axis of the second lens unit, and this is advantageous for the miniaturization of the zoom optical system. It is possible to further suppress the generation of spherical aberration in the second lens unit. As a result, it is possible to achieve the miniaturization of the zoom optical system and further improvement of the imaging performance.

Moreover, the zoom optical system preferably satisfies the following condition (4):

$$0.1<r7/fw \leq 1.1 \tag{4}$$

wherein r7 denotes a radius of curvature of the image-side surface of the negative lens in the second lens unit, and fw denotes the focal length of the zoom optical system at the wide-angle end.

The condition (4) defines the ratio between the radius of curvature r7 of the image-side surface of the negative lens in the second lens unit on the optical axis and the focal length fw of the zoom optical system at the wide-angle end.

If the value of r7/fw satisfies the condition (4), it is possible to correct the aberration generated in the second lens unit, and the high performance of the zoom optical system can be secured.

If the value of r7/fw exceeds the upper limit of the condition (4), the negative spherical aberration generated by the image-side surface of the negative lens in the second lens unit excessively decreases and becomes undercorrected. As a result, it is not possible to offset and correct this negative aberration with the positive spherical aberration generated in another lens, and the high image quality of the zoom optical system cannot be secured.

On the other hand, if the value of r7/fw is less than the lower limit of the condition (4), the aberration is excessively generated, and there increases the generation of coma by the image-side surface of the negative lens in the second lens unit. As a result, the quality of image in a peripheral portion of the image plane deteriorates, and the high imaging performance of the zoom optical system cannot be secured.

Moreover, the zoom optical system further preferably satisfies the following condition (4-1):

$$0.23<r7/fw \leq 1.0 \tag{4-1}$$

If the system satisfies the condition (4-1), it is possible to further suppress generation of various aberrations in the second lens unit. As a result, the performance of the zoom optical system can further be improved.

Furthermore, the zoom optical system preferably satisfies the following condition:

$$50<vd1 \tag{5}$$

wherein vd1 denotes the Abbe number of the negative lens in the first lens unit.

If the condition (5) is satisfied, it is possible to correct chromatic aberration of the zoom optical system more satisfactorily. If vd1 is less than the lower limit of the condition (5), chromatic aberration generated in the first lens unit cannot be corrected completely, and it is difficult to secure the performance.

Moreover, when the material of the negative lens in the first lens unit is glass, it is preferable to select an anomalous dispersion glass material having low dispersion. Then, since it is possible to correct chromatic aberration over a broader wavelength region, it is possible to reduce fluctuations of axial chromatic aberration generated by variation of magnification of the zoom optical system.

Furthermore, the zoom optical system further preferably satisfies the following condition:

$$50 < vd1 < 100 \tag{5-1}$$

If an upper limit of the condition (5-1) is exceeded, it is difficult to find a suitable optical material for the negative lens.

In addition, a plastic may be adopted as the material of the lens without considering the condition formula (5) or the anomalous dispersion. Then, costs can be reduced as compared with the case where the lens constituting the zoom optical system is made of glass.

Moreover, the zoom optical system preferably satisfies the following condition (6):

$$50 < vd2 \tag{6}$$

wherein vd2 denotes the Abbe number of the positive lens in the second lens unit.

When the system satisfies the condition (6), chromatic aberration of the zoom optical system can be corrected more satisfactorily. When the lower limit of the condition formula (6) is not reached, it is not possible to completely correct axial chromatic aberration especially in the telephoto state, and it is difficult to secure the performance of the zoom optical system.

Moreover, when the material of the positive lens in the second lens unit is glass, it is preferable to select anomalous dispersion glass having low dispersion. Then, since it is possible to correct chromatic aberration over a broader wavelength region, it possible to further reduce the fluctuations of axial chromatic aberration by the variation of magnification of the zoom optical system.

The zoom optical system further preferably satisfies the following condition (6-1):

$$50 < vd2 < 100 \tag{6-1}$$

If the upper limit of the condition (6-1) is exceeded, it is difficult to find suitable optical materials for the positive lens.

In addition, a plastic may be adopted as the material of the lens without considering the condition formula (6) or the anomalous dispersion. Then, the costs can be reduced as compared with the case where the lens constituting the zoom optical system is made of glass.

Moreover, the zoom optical system preferably satisfies the following condition (7):

$$1.5 < N2P \tag{7}$$

wherein N2P denotes the refractive index of the positive lens in the second lens unit.

When the condition (7) is satisfied, it is possible to reduce the Petzval sum generated by the positive lens.

Moreover, when a material having appropriate Abbe number is used for the positive lens in the second lens unit, it is possible to correct and reduce various aberrations, especially axial chromatic aberration which increases in the telephoto state. It is to be noted that the upper limit is determined by the preparation limit of the glass material.

In addition, a plastic lens may be adopted as the positive lens in the second lens unit without considering the condition formula (7). Then, the costs can be reduced as compared with the case where the positive lens in the second lens unit is made of glass.

Furthermore, when the surface of the positive lens in the third lens unit is coated with an optical thin film having a function of cutting infrared rays, any space for disposing an infrared-ray cutting filter is not required. Therefore, the zoom optical system can further be miniaturized.

When an electronic image sensor such as a CCD is used as an image sensor, the image plane is distant from the exit pupil of the zoom optical system to a certain degree. Therefore, when the positive lens in the third lens unit is coated with the optical thin film having a function of cutting the infrared rays, more stable infrared-ray cutting effect can be obtained.

Moreover, the lens made of the glass material has little deformation due to heat, and hardly absorbs humidity. Therefore, it is easy to coat the lens with a multi-layer optical thin film having a large number of layers. In consequence, it is preferable to make the positive lens in the third lens unit with the glass material in the case where the positive lens in the third lens unit is coated with the optical thin film having the infrared-ray cutting function.

Furthermore, it is preferable to make the positive lens in the third lens unit with glass regardless of whether or not the lens is coated with the optical thin film. The glass material has more alternatives of the refractive index and the Abbe number as compared with the plastic material. When the glass material having appropriate refractive index and Abbe number is selected for the lens, it is possible to more satisfactorily correct off-axial aberration, especially curvature of field.

When the positive lens in the third lens unit is made of the glass material, manufacturing precision of the lens surface can be improved, and edge thickness of the lens can be reduced as compared with the case where the lens is made of the plastic material. Moreover, when glass having large refractive index is selected, the thickness of the positive lens in the third lens unit can be reduced while maintaining necessary refractive power. As a result, the total length of the zoom optical system can be shortened, and the zoom optical system can be miniaturized.

Moreover, the plastic lens may be adopted in the case where the high imaging performance and the miniaturization are not taken into consideration. Then, the costs can be reduced as compared with the case where each lens constituting the zoom optical system is made of glass.

Furthermore, each of the first and second lens units is preferably composed of at least one glass lens. The refractive index of the plastic material is limited to about 1.5. Therefore, when glass is used as the material of the positive lens in the second lens unit, it is possible to reduce the Petzval sum generated by the positive lens in the second lens unit as compared with the case where plastic is used.

When each of the first and second lens units is composed of at least one glass lens, the alternatives of the Abbe number are increased as compared with the case where the lens unit is composed of the plastic lens. Therefore, chromatic aberration can be corrected sufficiently, and it is possible to reduce the fluctuations of aberrations during the variation of magnification. Especially, axial chromatic aberration can be kept more favorably.

Moreover, when the negative lens in the first lens unit and the positive lens in the second lens unit are made of glass, there are less fluctuations in refractive index and volume accompanying changes of temperature and humidity as compared with the case where the lenses are made of plastic. Therefore, the fluctuations of the lens focal lengths due to the changes of temperature and humidity decrease. Therefore, it is possible to reduce the deviation of the image plane due to the temperature change.

Furthermore, the zoom optical system preferably satisfies the following condition (8).

$$0.3<(r8+r9)/(r8-r9)<3.0 \quad (8)$$

wherein r8 denotes the radius of curvature of the object-side surface of the positive lens in the third lens unit on the optical axis, and r9 denotes the radius of curvature of the image-side surface of the positive lens in the third lens unit on the optical axis.

The condition (8) defines conditions for providing an optical system having short total length without much enlarging the angle of emergence of the off-axial luminous flux from the third lens unit.

If the value of (r8+r9)/(r8−r9) exceeds the upper limit of the condition (8), the angle of emergence of the off-axial luminous flux becomes excessively large, and quantity of light is running short in the peripheral portion of the image on the image pickup surface of the CCD or the like that receives the image formed by the zoom optical system. As a result, the difference in brightness becomes excessively large between the central portion and the peripheral portion of the image. In addition, off-axial aberration especially coma deteriorates, and it becomes difficult to secure the performance of the zoom optical system.

On the other hand, if the value of (r8+r9)/(r8−r9) is less than the lower limit of the condition (8), the total length of the optical system increases. This is disadvantageous in reducing the total length of the zoom optical system and in miniaturizing the zoom optical system.

Moreover, the zoom optical system preferably satisfies the following condition (9):

$$0.8<f2/fw<1.6 \quad (9)$$

wherein f2 denotes the focal length of the second lens unit, and fw denotes the focal length of the zoom optical system at the wide-angle end.

The condition (9) defines a ratio between the focal length f2 of the second lens unit and the focal length fw of the zoom optical system at the wide-angle end.

If the value of f2/fw exceeds the upper limit of the condition (9), the refractive power of the second lens unit weakens, and the total length of the optical system increases. This is disadvantageous for the miniaturization of the zoom optical system. Further, when the zooming ratio of the zoom optical system becomes large, the zoom optical system will be enlarged.

On the other hand, when the value of f2/fw is less than the lower limit of the condition (9), the total length of the optical system shortens, and this is advantageous for the miniaturization of the optical system. However, the amount of aberrations generated in the second lens unit increases, and it becomes difficult to correct off-axial aberration. As a result, it becomes difficult to secure the performance of the zoom optical system.

Moreover, the zoom optical system preferably satisfies the following condition (10):

$$1.3<f3/fw<4.0 \quad (10)$$

wherein f3 denotes the focal length of the third lens unit, and fw denotes the focal length of the zoom optical system at the wide-angle end.

The condition (10) defines the ratio between the focal length f3 of the third lens unit and the focal length fw of the zoom optical system at the wide-angle end.

If the value of f3/fw exceeds the upper limit of the condition (10), the back focus of the optical system is advantageously secured and the aberration is advantageously corrected. However, the total length of the optical system increases, and this is disadvantageous for the miniaturization of the optical system.

On the other hand, if the value of f3/fw is less than the lower limit of the condition (10), the total length of the zoom optical system shortens, and this is advantageous in miniaturizing the optical system. However, the amount of aberrations generated in the third lens unit increases, it becomes difficult to correct off-axial aberration, especially coma, and it becomes difficult to secure the performance of the zoom optical system.

In the zoom optical system of the present invention, the first lens unit may be moved to perform focusing. According to such formation, the fluctuations of aberration due to the change in the object distance are reduced. As a result, it is possible to achieve a small-sized optical system having a high zooming ratio.

Moreover, when the third lens unit is fixed and the first and second lens units only are moved to perform zooming and the focusing, the number of movable lens units decreases, and a mechanism of a lens barrel of the zoom optical system can be simplified.

Furthermore, the third lens unit may be moved to perform focusing. Such formation is advantageous in correcting off-axial aberration, especially curvature of field. As a result, it is possible to achieve the optical system having a high zooming ratio, and the image quality of the peripheral portion of the image plane can further be improved. It is possible to keep superiority in driving the lens unit. That is, since the motor for driving the third lens unit for focusing can be disposed in a portion close to the rear of the zoom optical system, it is possible to adopt a lens barrel structure in which the first lens unit is collapsible therein.

It is preferable to select the first or third lens unit to be moved in performing focusing depending on characteristics of the image pickup apparatus to which the zoom optical system is applied.

When the above-described zoom optical system is used as an objective optical system of an image pickup apparatus provided with an image sensor, the zoom optical system preferably satisfies the following condition (11):

$$0.6<(G2L)/Y'<1.16 \quad (11)$$

wherein G2L denotes the sum of thicknesses of the lenses in the second lens unit measured along the optical axis, and Y' denotes a half of the diagonal length of the effective image pickup area of the image sensor.

If the value of (G2L)/Y' exceeds the upper limit of the condition (11), the total length of the second lens unit increases, and the total length of the zoom optical system increases. This is disadvantageous for the miniaturization of the zoom optical system.

On the other hand, if the value of (G2L)/Y' is less than the lower limit of the condition (11), the total length of the second lens unit shortens. This is advantageous for the miniaturization of the whole optical system. However, the lens in the second lens unit becomes thin for its diameter. This is unfavorable in working and assembling the system since the lens in the second lens unit is easily broken.

Next, as described above, in still another aspect, the zoom optical system of the present invention comprises: a first lens unit having a negative refractive power; a second lens unit having a positive refractive power; and a third lens unit having a positive refractive power which are arranged in order from an object side. Zooming is performed by varying spaces between the lens units and the zoom optical system satisfies the following condition:

$$-35(\%) \leq DTmin \leq -10(\%)$$

wherein DTmin is a minimum value (a unit being %) of the distortion of the zoom optical system.

An optical system used in the electronic equipment such as a cellular phone needs to have a comparatively long back focus. Therefore, it is optimum to adopt a retrofocus type of optical system in which a lens unit having negative refractive power is disposed in the front. Arranging a lens unit having negative refractive power as the first lens unit is advantageous in enlarging the angle of view and obtaining the comparatively long back focus. When a lens unit having positive refractive power is disposed as the third lens unit, the exit pupil can be disposed distant from the image plane. On the other hand, when the angle of view of the zoom optical system is enlarged, it is difficult to correct distortion and coma. To solve the problem, in the zoom optical system of the present invention, the distortion is generated so as to satisfy the condition (12), thereby reducing a burden of distortion correction imposed on the zoom optical system. That is, minus distortion is generated at the wide-angle end to thereby concentrate an aberration correcting capacity of the optical system on the correction of aberration other than distortion. Accordingly, especially shape and/or material of the lens in the first lens unit are set to be appropriate for the correction of coma, and the zoom optical system can obtain a wide angle of view. At this time, distortion remains in the image formed by the zoom optical system, but this distortion can be removed when the image is electrically corrected by image processing performed after capturing the image with the image sensor. That is, the zoom optical system satisfying the condition (12) can be combined with the electric distortion correction to thereby maintain a satisfactory image quality and realize the wide angle of view.

It is to be noted that if the upper limit of the condition (12) is exceeded, negative distortion generated mainly in the wide angle state has to be reduced simultaneously with coma. Therefore, the number of the lenses of the zoom optical system increases, or the zoom optical system enlarges (total length during photographing increases). If the lower limit value is not reached, an enlarging magnification increases in the peripheral portion of the image in the case where distortion is electrically corrected. Therefore, after distortion is electrically corrected, the image unfavorably becomes coarse. It is to be noted that image processing for electrically correcting distortion may be performed in an image processing device integrally provided with the zoom optical system or separately provided therewith.

Moreover, the first lens unit is preferably composed of one negative lens.

The number of lenses in the first lens unit can be reduced to reduce the number of lenses of the whole optical system and reduce the total length of the system while securing an imaging performance. In addition, the diameter of the first lens unit can be suppressed by reducing the number of lenses in the first lens unit.

Furthermore, the zoom optical system preferably satisfies the following condition (13):

$$-4.5 < r1/fw < -1.0 \tag{13}$$

wherein r1 denotes the radius of curvature of the surface closest to the object of the negative lens in the first lens unit, and fw denotes the focal length of the zoom optical system at the wide-angle end.

Especially, in the case where wide angle of view is achieved, and the system is miniaturized, if the upper limit of the condition (13) is exceeded, it becomes difficult to correct specific off-axial coma. If the lower limit is not reached, the refractive power of the first lens unit weakens, and the optical system enlarges. When the refractive power is to be kept, the amount of aberration generated by the object-side surface of the negative lens increases, and it becomes difficult to correct curvature of field and coma.

It is to be noted that when it becomes possible to electrically correct the distortion, the generation of distortion, especially by the negative lens in the first lens unit, does not have to be suppressed, and further miniaturization (reduction of the total length during the photographing) can be achieved.

In addition, preferably the first lens unit of the zoom optical system is composed of one negative lens, the second lens unit is composed of one positive lens and one negative lens in order from the object side, the third lens unit is composed of one positive lens, and the system satisfies the above-described condition (1).

$$-5.0 < (r5+r6)/(r5-r6) < 2.0 \tag{1}$$

It is to be noted that the zoom optical system further preferably satisfies the conditions (1-1):

$$-3.8 < (r5+r6)/(r5-r6) < 0 \tag{1-1}$$

Moreover, preferably the first lens unit is composed of one negative lens, the second lens unit is composed of one positive lens and on negative lens in order from the object side, the third lens unit is composed of one positive lens, and the zoom optical system satisfies the above-described condition (2):

$$-0.1 < (r6+r7)/(r6-r7) < 5.0 \tag{2}$$

It is to be noted that the zoom optical system further preferably satisfies the conditions (2-1):

$$0.1 < (r6+r7)/(r6-r7) < 1.81 \tag{2-1}$$

Furthermore, preferably the first lens unit is composed of one negative lens, the second lens unit is composed of on positive lens and one negative lens in order from the object side, the third lens unit is composed of one positive lens, respectively, and the zoom optical system simultaneously satisfies the above-described conditions "(1) or (1-1)" and "(2) or (2-1)".

When the zoom optical system simultaneously satisfies the conditions "(1) or (1-1)" and "(2) or (2-1)", it is possible to realize an optical system establishing both the high performance and the miniaturization while keeping an appropriate zooming ratio.

Moreover, the zoom optical system preferably satisfies the above-mentioned condition (3):

$$0.53 \leq r4/fw < 1.2 \tag{3}$$

Furthermore, the zoom optical system further preferably satisfies the above-mentioned condition (3-1):

$$0.55 \leq r4/fw < 0.95 \tag{3-1}$$

In addition, the zoom optical system preferably satisfies the above-mentioned condition (4):

$$0.1 < r7/fw \leq 1.1 \quad (4).$$

Moreover, the zoom optical system further preferably satisfies the above-mentioned condition (4-1):

$$0.23 \leq r7/fw < 1.0 \quad (4\text{-}1).$$

Furthermore, the zoom optical system preferably satisfies the condition formula (5):

$$50 < vd1 \quad (5).$$

It is to be noted that the zoom optical system further preferably satisfies the above-mentioned condition (5-1):

$$50 < vd1 < 100 \quad (5\text{-}1).$$

In addition, the zoom optical system preferably satisfies the above-mentioned condition (6):

$$50 < vd2 \quad (6).$$

It is to be noted that the zoom optical system further preferably satisfies the above-mentioned condition (6-1):

$$50 < vd2 < 100 \quad (6\text{-}1).$$

Moreover, the zoom optical system preferably satisfies the above-mentioned condition (7):

$$1.5 < N2P \quad (7).$$

Furthermore, in the zoom optical system, at least one plastic lens is preferably used.

Additionally, the positive lens in the third lens unit is preferably coated with an optical thin film having an infrared-ray cutting function.

Moreover, the third lens unit is preferably composed of a glass lens.

Furthermore, each of the first and second lens units preferably has at least one glass lens.

In addition, the positive lens in the second lens unit is preferably made of glass.

Moreover, the zoom optical system preferably satisfies the above-mentioned condition (8):

$$0.3 < (r8+r9)/(r8-r9) < 3.0 \quad (8).$$

Furthermore, the zoom optical system preferably satisfies the above-mentioned condition (9):

$$0.8 < f2/fw < 1.6 \quad (9).$$

In addition, the zoom optical system preferably satisfies the above-mentioned condition (10):

$$1.3 < f3/fw < 4.0 \quad (10).$$

Moreover, the negative lens in the first lens unit is preferably moved to perform focusing.

Alternatively, the third lens unit is preferably moved to perform the focusing.

It is to be noted that the third lens unit may be fixed to reduce the number of movable lens units, and a mechanism of a lens barrel of the zoom optical system can be simplified. The third lens unit may be movable for advantageously correcting off-axial aberration, especially curvature of field, and for improving the image quality of the peripheral portion of the image plane. These formations are appropriately selected depending on characteristic to which the zoom optical system is applied.

In the case where any of the zoom optical systems according to the present invention is used as an objective lens system of an electronic image pickup apparatus, the electronic image pickup apparatus preferably further includes: an electronic image sensor disposed on the image side of the zoom optical system; and an image processing section which electrically processes image data captured by the electronic image sensor to change a shape of the image.

When the image processing section can output the image data whose distortion has been corrected, a satisfactory image can be obtained even by use of a printer or a display which does not have any image processing section for electrically processing the data to change the shape of the image.

Moreover, the electronic image pickup apparatus preferably includes: any of the zoom optical systems according to the present invention; and the electronic image sensor disposed on the image side of the zoom optical system, and the condition (11) is satisfied:

$$0.6 < (G2L)/Y' < 1.16 \quad (11)$$

wherein G2L is sum of the thicknesses of the lenses forming the second lens unit measured along the optical axis.

Next, there will be described a basic concept for electrically correcting image distortion well by processing digital signal.

For example, as shown in FIG. 1, magnification is fixed in each point on the circumference of the radius R (image height R) inscribed by the short side of the effective image pickup surface centering on the intersection between the optical axis Lc and the image pickup surface, and each point of the circumference is used as a reference of the correction. Moreover, each point on the circumference of another arbitrary radius r(ω) (image height r(ω)) is moved concentrically in the substantially radial direction to the position of the radius r'(ω) (image height r'(ω)). For example, in FIG. 1, the point P1 on the circumference of an arbitrary radius r1'(ω) positioned in the circle having the radius R is moved to the point P2 on the circumference of the radius r1'(ω) toward the center of the circle. The point Q1 on the circumference of an arbitrary radius r2(ω) positioned externally from the circle having the radius R is moved in the direction distant from the center of the circle to the point Q2 on the circumference of the radius r2 (ω). Here, r'(ω) can be represented as follows:

$$r'(\omega) = \alpha \cdot f \cdot \tan\omega \quad (0 \leq \alpha \leq 1)$$

wherein ω denotes a half angle of view of an object, and f denotes the focal length of the image forming optical system (zoom optical system in the present invention).

Here, assuming that an ideal image height corresponding to the point on the circumference of the radius R (image height R) is Y, the following results:

$$\alpha = R/Y = R/(f \cdot \tan\omega).$$

The optical system is ideally rotationally symmetric with respect to the optical axis. Therefore, distortion is also generated rotationally symmetrically with respect to the optical axis. Therefore, in the case where the optically generated distortion is electrically corrected as described above, "the magnification is fixed in each point on the circumference of the circle having the radius R inscribed by the short side of the effective image pickup surface centering on the point corresponding to the intersection between the optical axis and the image pickup surface in a reproduced image, and each point on the circumference of the other radius r(ω) is moved concentrically in the substantially radial direction to the position of the radius r'(ω) to correct distortion". This is supposed to be advantageous in respect of amount of data and/or amount of calculation.

In the electronic image pickup apparatus which performs such correction, in order to calculate a correction r'(ω)−r(ω), there may be stored data representing r(ω), that is, a relation between the half angle of view and the image height or data representing a relation between the actual image height r and an ideal image height r'/α, in a storage medium applied to the electronic image pickup apparatus.

It is to be noted that there has been described above the correction of distortion with respect to an image, but in the zoom optical system, the focal length changes, and a state of distortion included in the image changes together with the focal length. Therefore, as to a focal length range requiring distortion correction between the maximum value (telephoto end) and the minimum value (wide-angle end) of the focal length, the range is divided into several focal length zones to correct aberration. For example, the correction amount is set so as to obtain the correction result which substantially satisfies the following equation in the vicinity of the telephoto end of each divided focal length zone (position where the focal length is maximum in each zone):

$$r'(\omega) = \alpha \cdot f \cdot \tan \omega.$$

Distortion of the image in the range can be corrected by use of this correction amount. However, in this case, a certain degree of barrel type distortion remains in the resultant image in the wide-angle end (position where the focal length is minimum in each zone) in each divided focal length zone. When the number of the divided zones is increased in order to avoid the above problem, the data to be stored in the storage medium for correction unfavorably increases. Therefore, there is calculated beforehand one or several coefficients corresponding to one or several focal lengths other than the telephoto end or the wide-angle end in each divided focal length zone. This coefficient may be determined based on simulation or measurement by use of an actual image pickup apparatus. When using these coefficients, the correction amount may be calculated so as to obtain a correction result which substantially satisfies the following equation in the vicinity of the telephoto end in each divided zone:

$$r'(\omega) = \alpha \cdot f \cdot \tan \omega.$$

This correction amount may be multiplied by the coefficient for each focal length to determine the correction amount of the image obtained at the each focal length in the focal length zone.

In addition, in the case where the zoom optical system is distortion-free when forming an image of an infinite object, the following equation is established in the image:

$$f = y/\tan \omega,$$

wherein y denotes a height of an image point from the optical axis (image height), f denotes the focal length of the image forming optical system (zoom optical system herein), and ω denotes an angle (half angle of view of the object) between the optical axis and a line directed toward the object point corresponding to the image point formed in the position having the height y from the center of the image pickup surface.

When the image forming optical system generates barrel type distortion, the following results:

$$f > y/\tan \omega.$$

That is, assuming that the focal length f of the image forming optical system and the image height y are constant, the value of ω increases.

Figure 2:
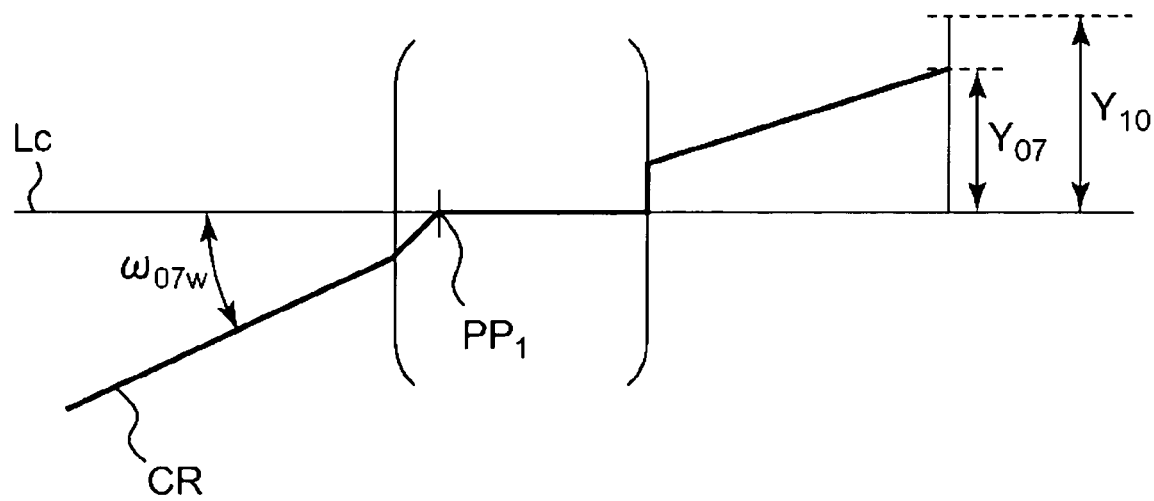
FIG. 2 is a diagram showing the relation between an incidence angle of light with respect to the optical axis Lc and an image height.

The following condition defines the degree of barrel type distortion at the wide-angle end of the zoom optical system:

$$0.85 < y07/[fw \cdot \tan(\omega 07w)] < 0.97,$$

wherein fw denotes the focal length of the zoom optical system at the wide-angle end, y07 denotes the image height represented by $0.7 \cdot y10$ in the case where the distance (maximum image height) to the point farthest from the center of the effective image pickup surface (region of the image pickup surface where the image pickup is possible) of the electronic image sensor is y10, and ω07w denotes an angle between the optical axis and the line directed toward the object point corresponding to the image point formed in the position having the image height y07 from the center of the effective image pickup surface of the electronic image sensor in the wide-angle end. In more detail, as shown in FIG. 2, ω07w denotes an object-side angle formed by the optical axis and a chief ray CR passing through the front principal point PP1 of the zoom optical system and reaching the position having the image height y07 on the image plane.

When this condition is satisfied, an image can be taken in over a wide angle of view while maintaining a small size of the optical system. During the image processing by the signal processing system built in the electronic image pickup apparatus, the enlarging ratio of the image in the peripheral portion thereof in the radial direction does not increase, and image distortion generated by the optical system can be corrected without making deterioration of sharpness of the image in its peripheral portion noticeable.

As described above, distortion is intentionally generated in the optical system, and the image captured with the electronic image sensor is electrically processed to correct the distortion. This formation miniaturizes the optical system, and achieves a wide angle of view, a high zooming ratio.

In further aspect, the zoom optical system of the present invention is a three-unit zoom optical system comprising: a first lens unit having a negative refractive power; a second lens unit having a positive refractive power; and a third lens unit having a positive refractive power which are arranged in order from an object side, the spaces between the lens units being changed for varying magnification. The first lens unit includes a double-concave negative lens, the second lens unit includes a positive lens and a negative lens in order from the object side, the third lens unit includes a positive lens, and the following condition is satisfied:

$$1.2 \text{ mm} \leq D12t \leq 3.0 \text{ mm} \qquad (14)$$

wherein $D12t$ denotes the space between the first lens unit and the second lens unit in the telephoto end.

In still further aspect, the zoom optical system of the present invention is a three-unit zoom lens comprising: a first lens unit having a negative refractive power; an aperture stop; a second lens unit having a positive refractive power; and a third lens unit having a positive refractive power which are arranged in order from an object side, the spaces between the lens units being changed for varying magnification. The first lens unit includes a double-concave negative lens, the second lens unit includes a positive lens and a negative lens in order from the object side, the third lens unit includes a positive lens, and the following condition is satisfied:

$$0.3 \text{ mm} \leq Ds2t \leq 1.2 \text{ mm} \qquad (15)$$

wherein $Ds2t$ denotes the space between the aperture stop and the second lens unit in the telephoto end.

A wide angle zoom optical system whose power layout is negative-positive-positive type as described above has an optical performance to obtain high quality images. The combination of this type of zoom optical system and a mechanism such as a mechanical shutter which enables to switch a light shielding state and a light transmitting state, is suitable to prevent smear from occurring when the CCD is used as the image sensor or to prevent distortion of images due to the movement of the object from being generated when the CMOS type of sensor is used as the image sensor. Also, since any excess light is not introduced onto the image sensor, there can be provided a clearer image having a high image quality.

When the condition (14) is satisfied, the space for disposing a mechanical shutter and the space for moving the lens unit for zooming and/or focusing are secured.

When the upper limit of the condition (14) is exceeded, the size from the first surface of the zoom optical system to the image plane increases in the wide angle state, the diameter of the first negative lens increases, and the optical system is enlarged. Further, off-axial aberration generated in the first negative lens becomes large, and curvature of field cannot be sufficiently corrected. Alternatively, the image pickup area of the image sensor has to be enlarged, the whole optical system becomes large, and this is disadvantageous for energy consumption or the layout of the component in the electronic equipment in which the zoom optical system is applied. When the lower limit is not reached, the retrofocus effect is reduced, and it becomes difficult to secure the back focus.

When the upper limit of the condition (14) is exceeded, in the case where the angle of view of the zoom optical system is broadened, diameters of the lenses constituting the second and third lens units increase, and the size the lens units enlarges. Further, off-axial aberration generated in the second lens unit increases, and the curvature of field cannot be sufficiently corrected. Alternatively, the image pickup area of the image sensor has to be enlarged, the whole zoom optical system enlarges, and this is disadvantage for the energy consumption or the layout of the component in the electronic equipment in which the zoom optical system is applied. When the lower limit is not reached, the space for disposing the mechanical shutter or the like may not be secured. This is disadvantageous for preventing smear from occurring or for preventing the distortion of images due to the movement of the object from being generated. Alternatively, costs of the mechanical shutter mechanism increase and/or sizes thereof increase. This is disadvantageous for the layout of the component in the electronic equipment in which the zoom optical system is applied.

In the case where the shutter mechanism, preferably the mechanical shutter is disposed in the zoom optical system, it is preferably disposed in the vicinity of the aperture stop.

Since the mechanical shutter may be formed by using a light shielding member made of a thin plate or a thin membrane, the shutter mechanism can be disposed without much enlarging the space between the first and second lens units. Thus, both the miniaturization and high imaging performance may be realized by using the mechanical shutter.

The zoom optical system preferably satisfies the above-mentioned condition (1)

$$-5.0 < (r5+r6)/(r5-r6) < 2.0 \quad (1)$$

When the zoom optical system satisfies the above-mentioned condition (1-1), it is further preferable to reduce various off-axial aberration, especially curvature of field:

$$-3.8 < (r5+r6)/(r5-r6) < 0 \quad (1\text{-}1)$$

Moreover, the zoom optical system preferably satisfies the above-mentioned condition (4):

$$0.1 < r7/fw \leq 1.1 \quad (4)$$

Furthermore, when the zoom optical system satisfies the above-mentioned condition (4-1), various aberrations may be preferably reduced:

$$0.23 \leq r7/fw < 1.0 \quad (4\text{-}1)$$

In addition, the zoom optical system preferably satisfies the above-mentioned condition (5):

$$50 < vd1 \quad (5)$$

Furthermore, the zoom optical system further preferably satisfies the above-mentioned condition (5-1):

$$50 < vd1 < 100 \quad (5\text{-}1)$$

In addition, the zoom optical system preferably satisfies the above-mentioned condition (6):

$$50 < vd2 \quad (6)$$

Furthermore, the zoom optical system further preferably satisfies the above-mentioned condition (6-1):

$$50 < vd2 < 100 \quad (6\text{-}1)$$

Moreover, the zoom optical system preferably satisfies the above-mentioned condition (7):

$$1.5 < N2P \quad (7)$$

The surface of the positive lens in the third lens unit can be coated with an optical thin film having an infrared-ray cutting function.

Moreover, the third lens unit is preferably made of glass material.

Furthermore, each of the first and second lens units is preferably composed of at least one glass lens.

Additionally, in the zoom optical system, at least one plastic lens is preferably used.

Moreover, the zoom optical system preferably satisfies the above-mentioned condition (8):

$$0.3 < (r8+r9)/(r8-r9) < 3.0 \quad (8)$$

Furthermore, the zoom optical system preferably satisfies the above-mentioned condition (9):

$$0.8 < f2/fw < 1.6 \quad (9)$$

In addition, the zoom optical system preferably satisfies the above-mentioned condition (10):

$$1.3 < f3/fw < 4.0 \quad (10)$$

In the zoom optical system described above, the first lens unit can be moved to perform focusing. Alternatively, the third lens unit may be moved to perform focusing.

In the case where the zoom optical system is used as an objective optical system of an image pickup apparatus provided with an image sensor, the above-mentioned condition (11) is preferably satisfied:

$$0.6 < (G2L)/Y' < 1.16 \quad (11)$$

NUMERICAL EXAMPLES

Next, specific numerical examples will be described.

First Example

Figure 3A:
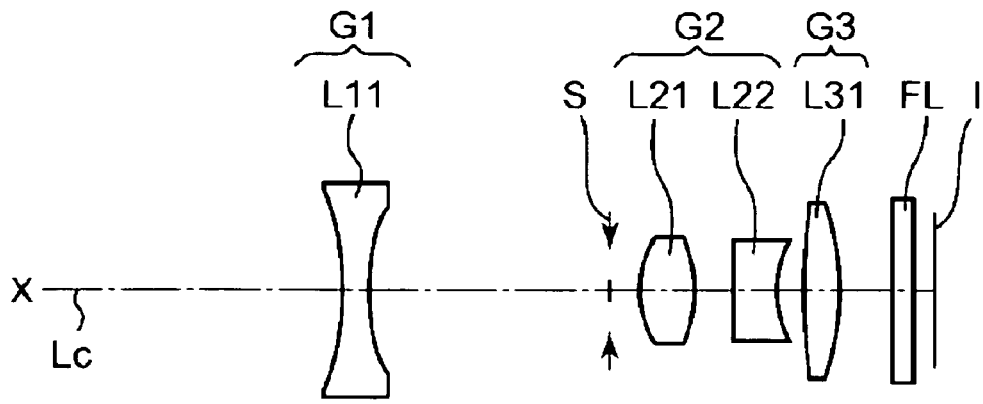
FIGS. 3A to 3C are sectional views of the first embodiment of the present invention, cut along a plane including the optical axis of the zoom optical system.
Figure 3B:
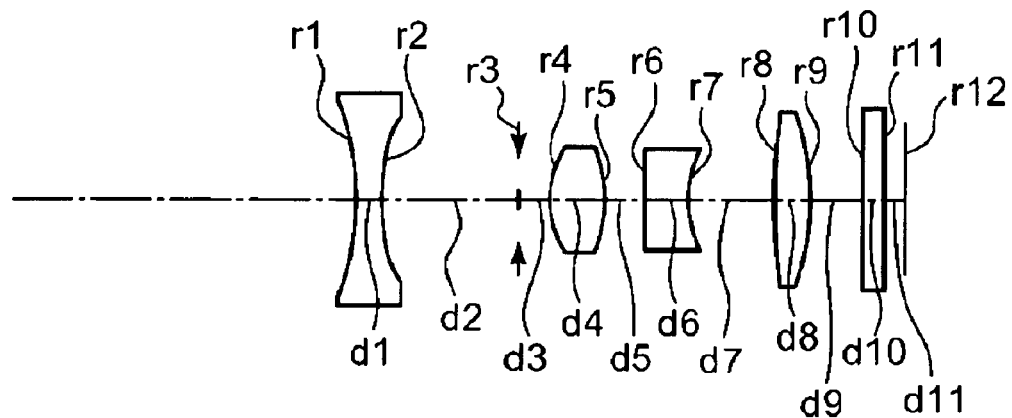
Figure 3C:
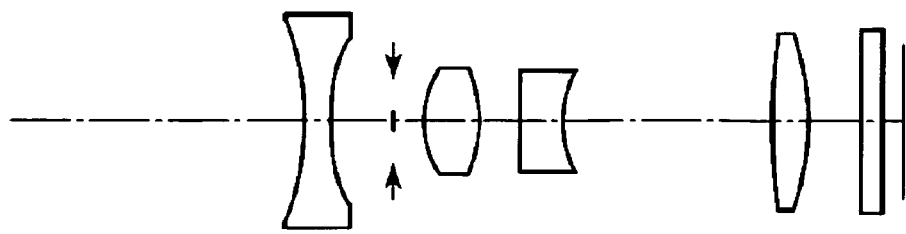

FIGS. 3A to 3C are sectional views of the first example including the optical axis thereof, FIG. 3A shows a state at the wide-angle end, FIG. 3B shows a state at an intermediate focal length position, and FIG. 3C shows a state at the telephoto end, respectively. FIGS. 4A to 4C show spherical aberration, astigmatism, and distortion of the first example, FIG. 4A shows a state at the wide-angle end, FIG. 4B shows a state at the intermediate focal length position, and FIG. 4C shows a state at the telephoto end, respectively.

As shown in FIG. 3A, the zoom optical system comprises a first lens unit G1 having a negative refractive power, a second lens unit G2 having a positive refractive power, and a third lens unit G3 having a positive refractive power in order from an object side X toward an image pickup surface I.

The first lens unit G1 includes a double-concave negative lens L11 and has a negative refractive power. The first lens unit moves during variation of magnification.

The second lens unit G2 is disposed on the image pickup surface I side of the first lens unit G1 with the aperture stop S in the space between the first and second lens units. The second lens unit includes a double-convex positive lens L21 and a double-concave negative lens L22 in order from the object side X, with an air space between the lenses L21 and L22. The second lens unit has a positive refractive power.

The third lens unit G3 includes a double-convex positive lens L31. The third lens unit has a positive refractive power, and the unit is fixed during variation of magnification. A plane parallel plate FL is disposed between the third lens unit G3 and the image pickup surface I. The plane parallel plate FL is formed of an optical low pass filter, an infrared-ray absorbing filter and the like.

The second lens unit G2 moves from the image pickup surface I side toward the object side X during variation of magnification from the wide-angle end (FIG. 3A) to the telephoto end (FIG. 3C). The third lens unit G3 is fixed. At this time, the space d2 between the first lens unit G1 and the second lens unit G2 decreases, the space d7 between the second lens unit G2 and the third lens unit G3 increases, and the spaces between the lens units changes. It is to be noted that on the image pickup surface I, the maximum image height is a half of the diagonal length of the effective image pickup surface of the CCD or the CMOS sensor.

The numerical data of the first example is given below.

Here, r denotes a radius (mm) of curvature of the surface of each optical element, d denotes a thickness of each optical element or an air space (mm) between the optical elements, nd denotes a refractive index of each optical element at a wavelength (587.6 nm) of d-line, and vd denotes the Abbe number of each optical element at the wavelength (587.6 nm) of d-line. Moreover, IH denotes the image height (half of the diagonal length of the effective image pickup area on the image pickup surface), fL denotes the focal length of the zoom optical system, Fno denotes the F number, 2ω denotes the angle of view, and D1 and D2 denote variable spaces.

Furthermore, assuming that the optical axis is the z-axis, two lines crossing each other in the plane crossing the optical axis at right angles are x and y-axes, the conic coefficient is k, and aspherical coefficients of the rotationally symmetrical aspherical surface are A4, A6, A8, and A10, a shape of an aspherical surface rotationally symmetrical about the optical axis is defined by the following equation:

$$z=(y^2/r)/[1+[1-(1+k)(y/r)^2]^{1/2}]+A_4y^4+A_6y^6+A_8y^8+A_{10}y^{10}$$

These symbols are common to those in the numerical data of the subsequent second to ninth examples. It is to be noted that in the numerical values of the aspherical surface coefficients are expressed by using the symbol E−3, E−5, etc. These symbols indicate the power of 10. Therefore, for example, the value of A4 of the aspherical surface 2 of first example, which is expressed as −4.4963E−3, is −4.4963×10$^{-3}$.

Numerical Data 1
IH: 2.25 mm
fL: 3.2 mm to 8.5 mm
Fno: 2.8 to 4.8

TABLE 1

| Surface No. | r | d | nd | vd |
|---|---|---|---|---|
| 1* | −7.898 | 0.67 | 1.52542 | 55.78 (plastic lens) |
| 2* | 6.245 | D1(variable) | | |
| 3(aperture stop) | ∞ | 0.75 | | |
| 4* | 2.581 | 1.40 | 1.52542 | 55.78 (plastic lens) |
| 5* | −3.679 | 1.02 | | |
| 6 | −8.795 | 0.99 | 1.60687 | 27.03 (plastic lens) |
| 7* | 3.222 | D2(variable) | | |
| 8 | 19.576 | 0.88 | 1.52542 | 55.78 (plastic lens) |
| 9* | −7.913 | 1.40 | | |
| 10 | ∞ | 0.50 | 1.51633 | 64.14 |
| 11 | ∞ | 0.50 | | |
| 12(image pickup surface) | ∞ | | | |

*mark: aspherical surface

TABLE 2

Aspherical surface Coefficient

| surface No. | k | A4 | A6 | A8 |
|---|---|---|---|---|
| 1 | 0 | −4.4963E−3 | 1.1928E−3 | −6.1456E−5 |
| 2 | 0 | −5.9954E−3 | 1.8182E−3 | 5.4713E−6 |
| 4 | 0 | 6.8196E−3 | −4.6381E−4 | 0 |
| 5 | 0 | 1.1181E−2 | −1.2020E−3 | 8.4288E−5 |
| 7 | 0 | −1.3938E−2 | 4.6177E−3 | −1.5879E−3 |
| 9 | 0 | 6.563E−3 | −1.1630E−3 | 7.0550E−5 |

TABLE 3

Zoom Data

| Zoom State | Wide-Angle End | Intermediate | Telephoto End |
|---|---|---|---|
| fL | 3.2 | 5.1 | 8.5 |
| Fno. | 2.8 | 3.5 | 4.8 |
| ω(half angle of view) | 38.1° | 24.7° | 14.4° |
| D1 | 5.83 | 3.30 | 1.53 |
| D2 | 0.65 | 2.25 | 5.20 |

Second Example

Figure 5A:
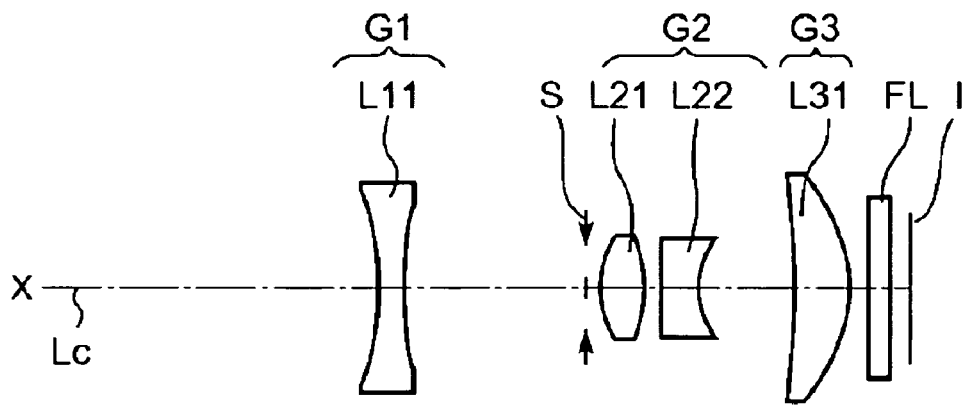
FIGS. 5A to 5C are sectional views of the second embodiment of the present invention, cut along a plane including the optical axis of the zoom optical system.
Figure 5B:
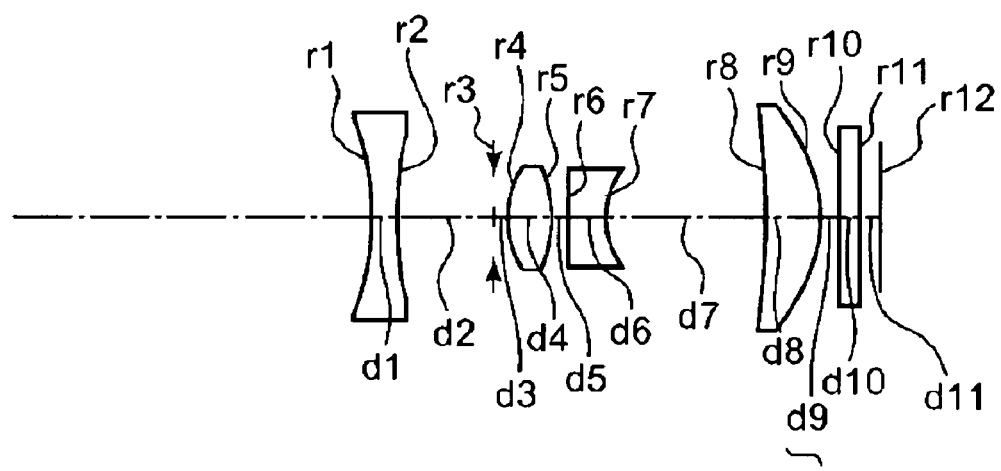
Figure 5C:
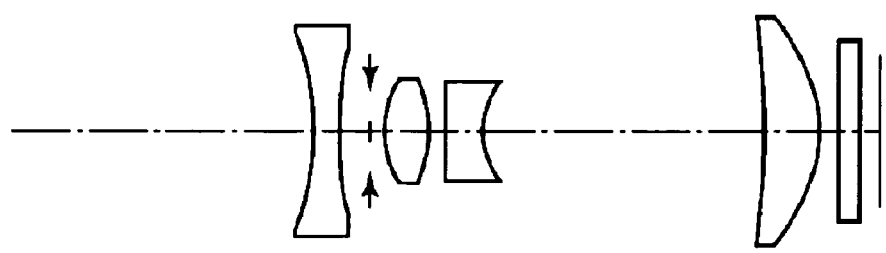

FIGS. 5A to 5C are sectional views of the second example including the optical axis thereof, FIG. 5A shows a state at the wide-angle end, FIG. 5B shows a state at an intermediate focal length position, and FIG. 5C shows a state at the telephoto end, respectively.

Figure 6A:
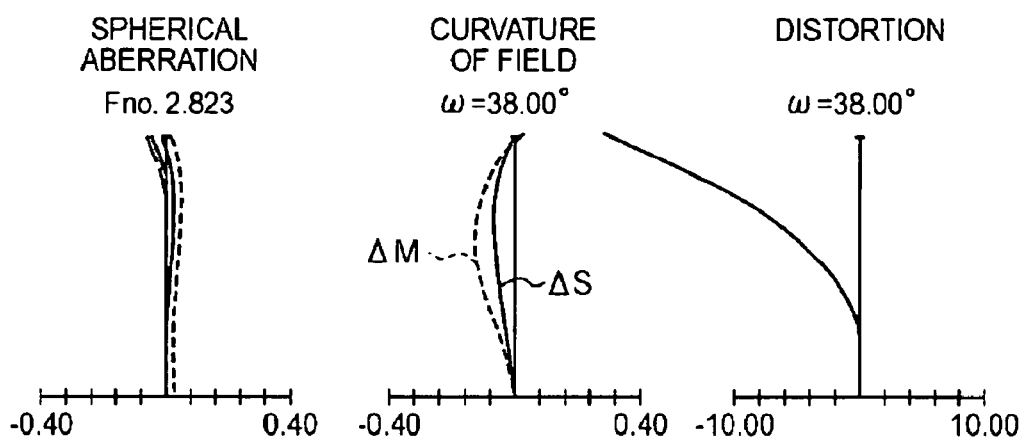
FIGS. 6A to 6C show spherical aberration, astigmatism, and distortion of the second embodiment.
Figure 6B:
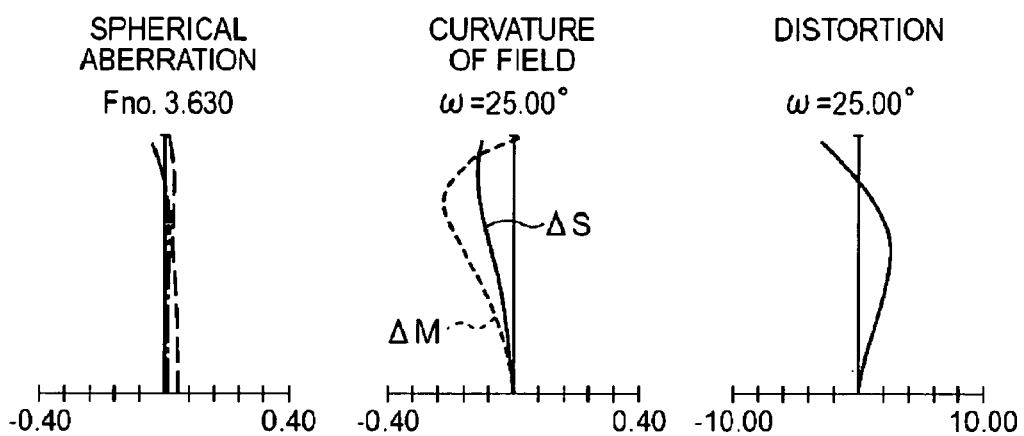
Figure 6C:
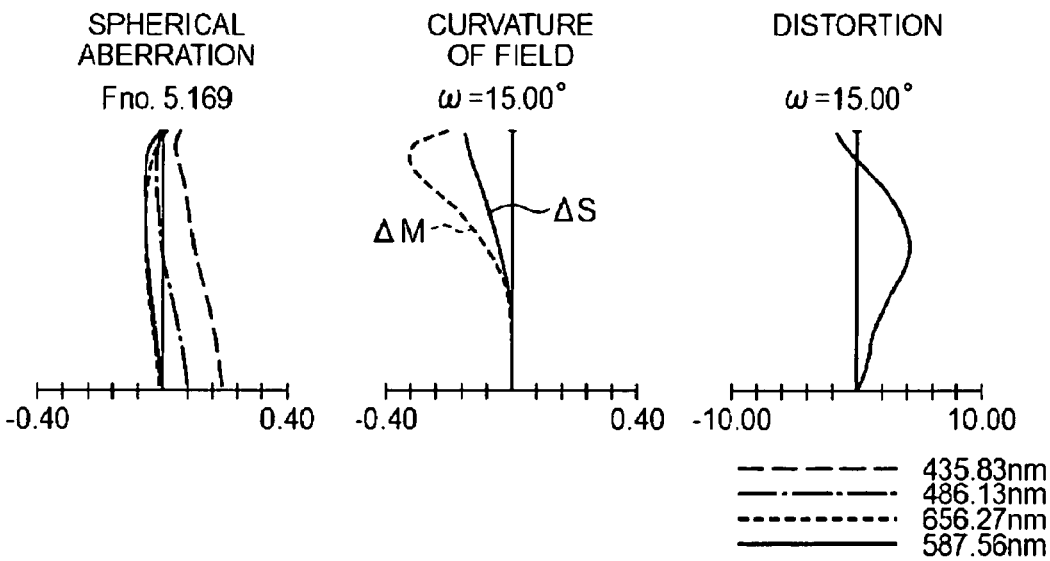

FIGS. 6A to 6C show spherical aberration, astigmatism, and distortion of the second example, FIG. 6A shows a state at the wide-angle end, FIG. 6B shows a state at the intermediate focal length position, and FIG. 6C shows a state at the telephoto end, respectively.

As shown in FIG. 5A, the zoom optical system comprises a first lens unit G1 having a negative refractive power, a second lens unit G2 having a positive refractive power, and a third lens unit G3 having a positive refractive power in order from the object side X toward the image pickup surface I.

The first lens unit G1 includes a double-concave negative lens L11 and has a negative refractive power. The unit moves during variation of magnification.

The second lens unit G2 is disposed on the image pickup surface I side of the first lens unit G1 with the aperture stop S in the space between the first and second lens units. The second lens unit includes a double-convex positive lens L21 and a negative meniscus lens L22 whose concave surface is directed toward the image pickup surface I side in order from the object side X, with an air space between the lenses L21 and L22. The second lens unit has a positive refractive power.

The third lens unit G3 includes a positive meniscus lens L31 whose concave surface is directed toward the object side. The third lens unit has a positive refractive power, and the unit is fixed during variation of magnification. A plane parallel plate FL is disposed between the third lens unit G3 and the image pickup surface I. The plane parallel plate FL is formed of an optical low pass filter, an infrared-ray absorbing filter and the like.

The second lens unit G2 moves from the image pickup surface I side toward the object side X during variation of magnification from the wide-angle end (FIG. 5A) to the telephoto end (FIG. 5C). The third lens unit G3 is fixed. At this time, the space d2 between the first lens unit G1 and the second lens unit G2 decreases, the space d7 between the second lens unit G2 and the third lens unit G3 increases, and the spaces between the lens units changes. It is to be noted that on the image pickup surface I, the maximum image height is a half of the diagonal length of the effective image pickup surface of the CCD or the CMOS sensor.

Numerical Data 2
IH: 2.25 mm
fL: 3.2 mm m to 8.5 mm
Fno: 2.8 to 5.2

TABLE 4

| Surface No. | r | d | nd | vd |
|---|---|---|---|---|
| 1* | −6.323 | 0.44 | 1.49700 | 81.54 |
| 2* | 4.922 | D1(variable) | | |
| 3(aperture stop) | ∞ | 0.27 | | |
| 4* | 1.844 | 0.90 | 1.51633 | 64.14 |
| 5* | −2.442 | 0.39 | | |
| 6 | 40.886 | 0.71 | 1.60687 | 27.03 (plastic lens) |
| 7* | 1.550 | D2(variable) | | |
| 8* | −15.137 | 1.10 | 1.52542 | 55.78 (plastic lens) |
| 9 | −2.831 | 0.20 | | |
| 10 | ∞ | 0.50 | 1.51633 | 64.14 |
| 11 | ∞ | 0.50 | | |
| 12(image pickup surface) | ∞ | | | |

*mark: aspherical surface

TABLE 5

Aspherical Surface Coefficient

| Surface No. | k | A4 | A6 | A8 |
|---|---|---|---|---|
| 1 | 3.5169 | −2.1335E−2 | 6.3053E−3 | −5.4714E−4 |
| 2 | 2.9441 | −3.0890E−2 | 8.0850E−3 | −7.3810E−4 |
| 4 | −1.4468 | 4.3351E−3 | 1.0293E−3 | −1.9064E−3 |
| 5 | −0.1228 | 4.7204E−2 | −1.5997E−2 | 2.8091E−3 |
| 7 | −0.6647 | −3.2923E−2 | 7.3056E−2 | −2.9607E−2 |
| 8 | −2.1618 | 2.1542E−2 | −6.3161E−3 | 4.5745E−4 |

TABLE 6

Zoom Data 2

| Zoom State | Wide-Angle End | Intermediate | Telephoto End |
|---|---|---|---|
| fL | 3.2 | 5.0 | 8.5 |
| Fno. | 2.8 | 3.6 | 5.2 |
| ω(half angle of view) | 38° | 25° | 15° |
| D1 | 3.95 | 2.10 | 0.78 |
| D2 | 2.01 | 3.35 | 5.88 |

Third Example

Figure 7A:
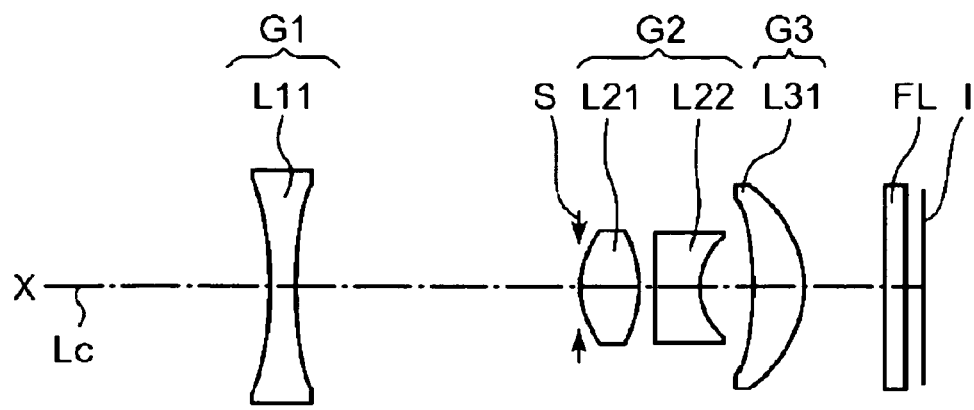
FIGS. 7A to 7C are sectional views of the third embodiment of the present invention, cut along a plane including the optical axis of the zoom optical system.
Figure 7B:
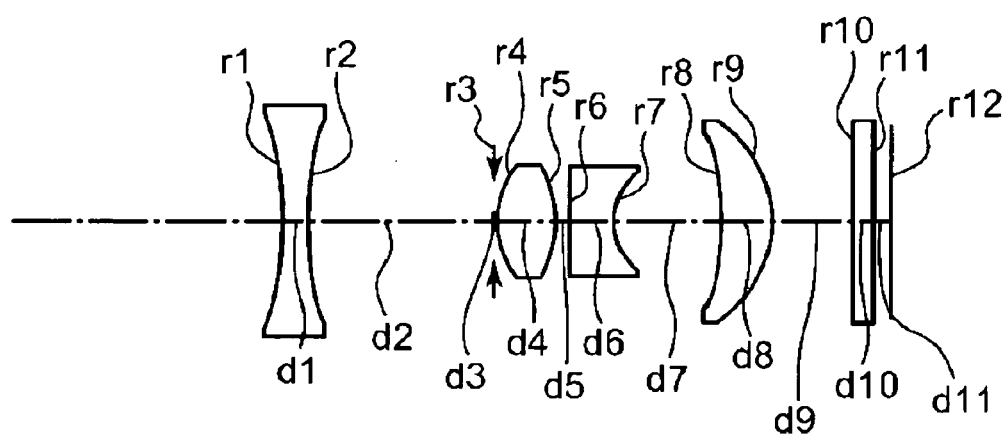
Figure 7C:
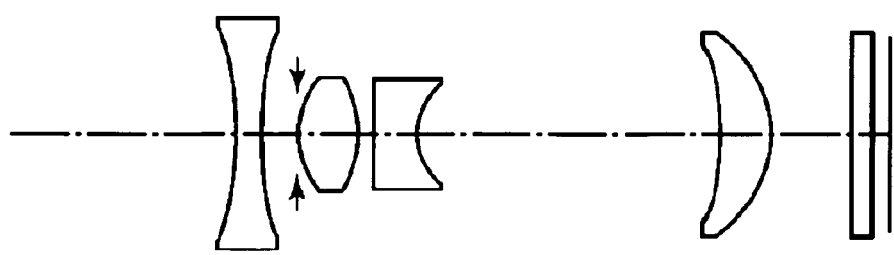

FIGS. 7A to 7C are sectional views of the third example including the optical axis thereof, FIG. 7A shows a state at the wide-angle end, FIG. 7B shows a state at an intermediate focal length position, and FIG. 7C shows a state at the telephoto end, respectively.

FIGS. 8A to 8C show spherical aberration, astigmatism, and distortion of the third embodiment, FIG. 8A shows a state at the wide-angle end, FIG. 8B shows a state at the intermediate focal length position, and FIG. 8C shows a state at the telephoto end, respectively.

As shown in FIG. 7A, the zoom optical system comprises a first lens unit G1 having a negative refractive power, a second lens unit G2 having a positive refractive power, and a third lens unit G3 having a positive refractive power in order from the object side X toward the image pickup surface I.

The first lens unit G1 includes a double-concave negative lens L11 and has a negative refractive power. The unit moves during variation of magnification.

The second lens unit G2 is disposed on the image pickup surface I side of the first lens unit G1 with the aperture stop S in the space between the first and second lens units. The second lens unit includes a double-convex positive lens L21 and a negative meniscus lens L22 whose concave surface is directed toward the image pickup surface I side in order from the object side X, with an air space between the lenses L21 and L22. The second lens unit has a positive refractive power as a whole.

The third lens unit G3 comprises a positive meniscus lens L31 whose concave surface is directed toward the object side. The third lens unit has a positive refractive power as a whole. A plane parallel plate FL is disposed between the third lens unit G3 and the image pickup surface I. The plane parallel plate FL is formed of an optical low pass filter, an infrared-ray absorbing filter and the like.

The second lens unit G2 moves from the image pickup surface I side toward the object side X during variation of magnification from the wide-angle end (FIG. 7A) to the telephoto end (FIG. 7C). At this time, the space d2 between the first lens unit G1 and the second lens unit G2 decreases, the space d7 between the second lens unit G2 and the third lens unit G3 increases, and the spaces between the lens units changes. It is to be noted that on the image pickup surface I, the maximum image height is a half of the diagonal length of the effective image pickup surface of the CCD or the CMOS sensor.

Numerical Data 3
IH: 1.8 mm
fL: 2.9 mm to 8.6 mm
Fno: 2.8 to 5.4

TABLE 7

| Face No. | r | d | nd | vd |
|---|---|---|---|---|
| 1* | −6.189 | 0.40 | 1.49700 | 81.54 |
| 2* | 8.271 | D1(variable) | | |
| 3(aperture stop) | ∞ | 0.00 | | |
| 4* | 1.873 | 1.06 | 1.52542 | 55.78 (plastic lens) |
| 5* | −2.314 | 0.18 | | |
| 6* | 7.080 | 0.78 | 1.60687 | 27.03 (plastic lens) |
| 7* | 1.080 | D2(variable) | | |
| 8* | −7.666 | 0.85 | 1.52542 | 55.78 (plastic lens) |
| 9* | −2.391 | D3(variable) | | |
| 10 | ∞ | 0.40 | 1.51633 | 64.14 |
| 11 | ∞ | 0.33 | | |
| 12(image pickup surface) | ∞ | | | |

*mark: aspherical surface

TABLE 8

Aspherical Surface Coefficient

| Surface No. | k | A4 | A6 | A8 | A10 |
|---|---|---|---|---|---|
| 1 | −0.0568 | −2.3559E−3 | 1.7721E−3 | −1.9360E−4 | −1.0991E−5 |
| 2 | −2.1637 | −5.6891E−3 | 3.0569E−3 | −5.4836E−4 | 8.7164E−5 |
| 4 | 0.4306 | −3.1502E−2 | −4.0799E−3 | −1.3165E−2 | −1.0298E−3 |
| 5 | −0.1578 | 3.4059E−2 | 2.5636E−3 | −3.1371E−2 | 1.1813E−2 |
| 6 | 0.3275 | −6.7907E−2 | 6.7727E−2 | −7.6610E−2 | 4.1113E−2 |
| 7 | −0.835 | −1.0237E−1 | 1.5387E−1 | −1.5605E−1 | 1.1755E−1 |
| 8 | 0.6675 | 7.1144E−3 | −2.7304E−4 | −9.0043E−4 | −2.5328E−4 |
| 9 | −3.1465 | −3.8165E−3 | −2.1378E−3 | 4.0285E−4 | −3.2690E−4 |

TABLE 9

Zoom Data 3

| Zoom State | Wide-Angle End | Intermediate | Telephoto End |
|---|---|---|---|
| fL | 2.9 | 4.0 | 8.6 |
| Fno. | 2.8 | 3.3 | 5.4 |
| ω(half angle of view) | 32.9° | 23.7° | 11.8° |
| D1 | 4.82 | 3.19 | 0.63 |
| D2 | 0.64 | 1.68 | 5.05 |
| D3 | 1.48 | 1.33 | 1.30 |

Fourth Example

Figure 9A:
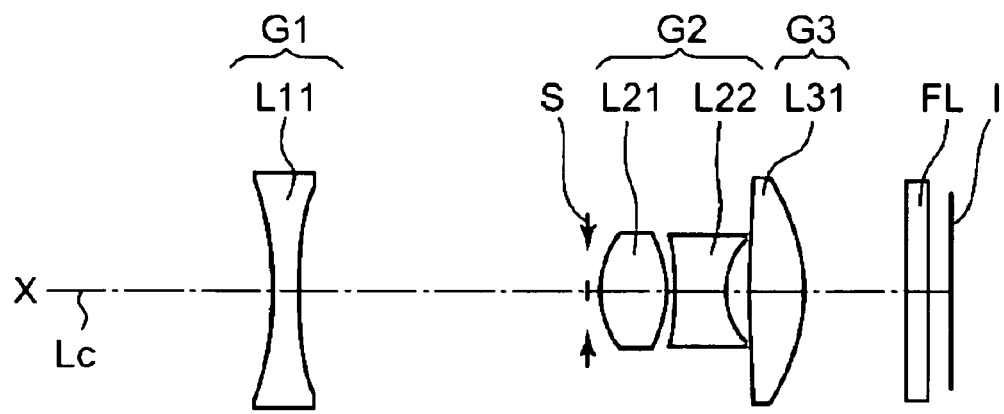
FIGS. 9A to 9C are sectional views fourth embodiment of the present invention, cut along a plane including the optical axis of the zoom optical system.
Figure 9B:
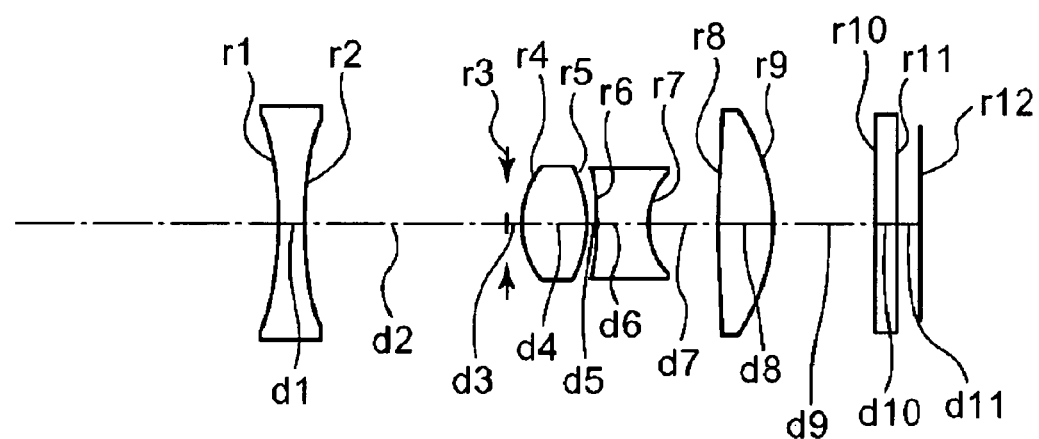
Figure 9C:
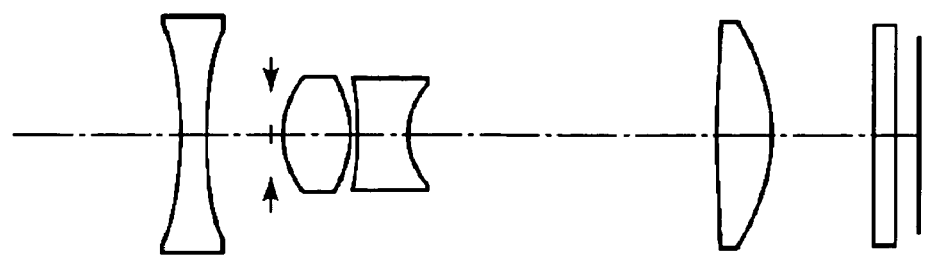

FIGS. 9A to 9C are sectional views of the fourth example including the optical axis thereof, FIG. 9A shows a state at the wide-angle end, FIG. 9B shows a state at an intermediate focal length position, and FIG. 9C shows a state at the telephoto end, respectively.

FIGS. 10A to 10C show spherical aberration, astigmatism, and distortion of the fourth embodiment, FIG. 10A shows a state at the wide-angle end, FIG. 10B shows a state at the intermediate focal length position, and FIG. 10C shows a state at the telephoto end, respectively.

As shown in FIG. 9A, the zoom optical system comprises a first lens unit G1 having a negative refractive power, a second lens unit G2 having a positive refractive power, and a third lens unit G3 having a positive refractive power in order from the object side X toward the image pickup surface I.

The first lens unit G1 includes a double-concave negative lens L11 and has a negative refractive power. The unit moves during variation of magnification.

The second lens unit G2 is disposed on the image pickup surface I side of the first lens unit G1 with the aperture stop S in the space between the first and second lens units. The second lens unit includes a double-convex positive lens L21 and a double-concave negative lens L22 in order from the object side X, with an air space between the lenses L21 and L22. The second lens unit has a positive refractive power.

The third lens unit G3 includes a positive lens L31 having a double-convex shape in the vicinity of the optical axis. The third lens unit has a positive refractive power. The unit is fixed during variation of magnification. A plane parallel plate FL is disposed between the third lens unit G3 and the image pickup surface I. The plane parallel plate FL is formed of an optical low pass filter, an infrared-ray absorbing filter and the like.

The second lens unit G2 moves from the image pickup surface I side toward the object side X during variation of magnification from the wide-angle end (FIG. 9A) to the telephoto end (FIG. 9C). At this time, the space d2 between the first lens unit G1 and the second lens unit G2 decreases, the space d7 between the second lens unit G2 and the third lens unit G3 increases, and the spaces between the lens units changes. It is to be noted that on the image pickup surface I, the maximum image height is a half of the diagonal length of the effective image pickup surface of the CCD or the CMOS sensor.

Numerical Data 4
IH: 2.25 mm
fL: 3.8 mm to 10.6 mm
Fno: 2.8 to 5.4

TABLE 10

| Surface No. | r | d | nd | vd |
|---|---|---|---|---|
| 1* | −7.951 | 0.50 | 1.49700 | 81.54 |
| 2* | 9.240 | D1(variable) | | |
| 3(aperture stop) | ∞ | 0.30 | | |
| 4* | 2.042 | 1.32 | 1.52542 | 55.78 (plastic lens) |
| 5* | −3.427 | 0.23 | | |
| 6* | −97.277 | 1.08 | 1.60687 | 27.03 (plastic lens) |
| 7* | 1.561 | D2(variable) | | |
| 8* | −65.860 | 1.07 | 1.52542 | 55.78 (plastic lens) |
| 9* | −4.157 | 2.05 | | |
| 10 | ∞ | 0.50 | 1.51633 | 64.14 |
| 11 | ∞ | 0.50 | | |
| 12(image pickup surface) | ∞ | | | |

*mark: aspherical surface

TABLE 11

Aspherical Surface Coefficient

| Surface No. | k | A4 | A6 | A8 | A10 |
|---|---|---|---|---|---|
| 1 | 0.7471 | −1.4226E−3 | 6.5133E−4 | −4.6454E−5 | 8.7004E−7 |
| 2 | −8.0216 | −3.3136E−3 | 1.2213E−3 | −8.1474E−5 | 3.7344E−7 |
| 4 | 0.4278 | −1.3528E−2 | −1.1334E−3 | −1.6795E−3 | −1.0532E−3 |
| 5 | −0.3099 | 1.7843E−2 | 6.9048E−4 | −9.8864E−3 | 2.6979E−3 |
| 6 | 0 | −3.6225E−2 | 1.1625E−2 | −1.6419E−2 | 5.0282E−3 |
| 7 | −0.6338 | −4.2511E−2 | 2.5540E−2 | −4.8808E−3 | 1.7965E−4 |

TABLE 11-continued

Aspherical Surface Coefficient

| Surface No. | k | A4 | A6 | A8 | A10 |
|---|---|---|---|---|---|
| 8 | 0 | 1.1036E−2 | −1.7247E−3 | −1.9329E−5 | 1.4789E−5 |
| 9 | −6.0409 | 6.0114E−3 | −1.7213E−3 | −4.3832E−7 | 1.2409E−5 |

TABLE 12

Zoom Data 4

| Zoom State | Wide-Angle End | Intermediate | Telephoto End |
|---|---|---|---|
| f | 3.8 | 5.0 | 10.6 |
| Fno. | 2.8 | 3.3 | 5.4 |
| ω(half angle of view) | 31.8° | 24.1° | 12.2° |
| D1 | 5.88 | 4.15 | 1.21 |
| D2 | 0.56 | 1.60 | 6.51 |

Fifth Example

Figure 11A:
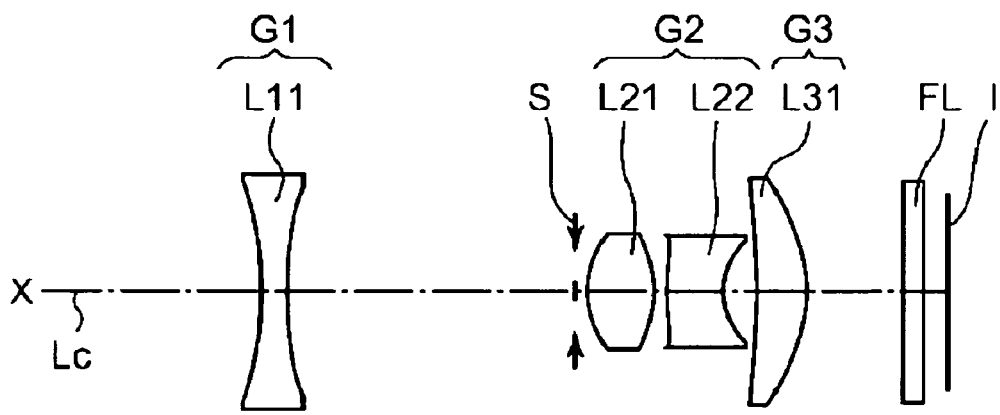
FIGS. 11A to 11C are sectional views of the fifth embodiment of the present invention, cut along a plane including the optical axis of the zoom optical system.
Figure 11B:
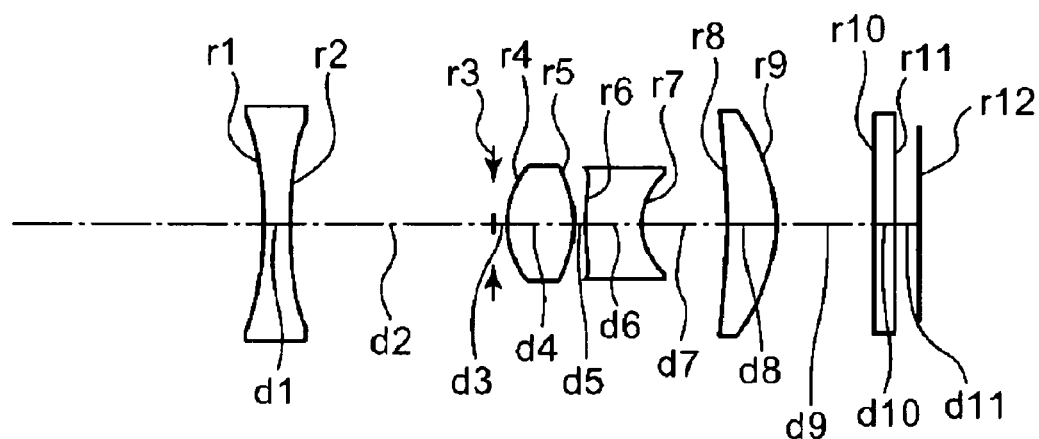
Figure 11C:
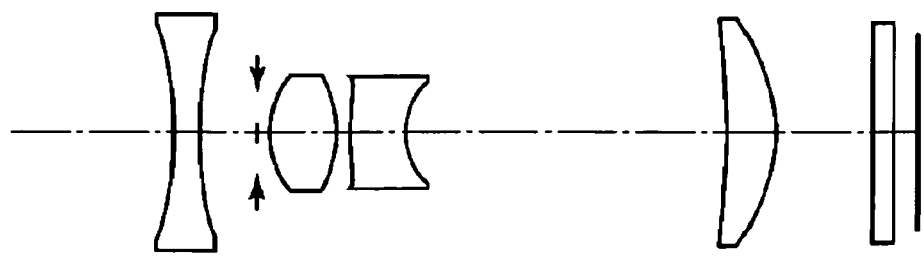

FIGS. 11A to 11C are sectional views of the fifth example including an optical axis thereof, FIG. 11A shows a state at the wide-angle end, FIG. 11B shows a state at an intermediate focal length position, and FIG. 11C shows a state at the telephoto end, respectively.

Figure 12A:
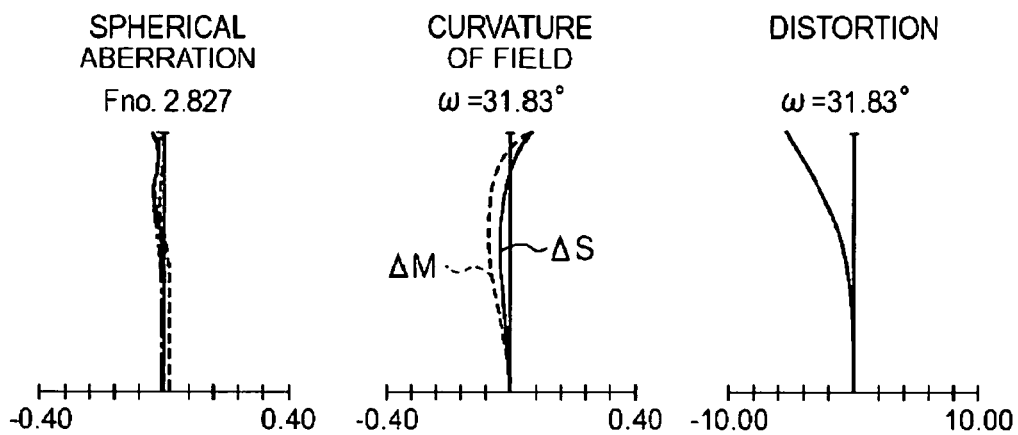
FIGS. 12A to 12C show spherical aberration, astigmatism, and distortion of the fifth embodiment.
Figure 12B:
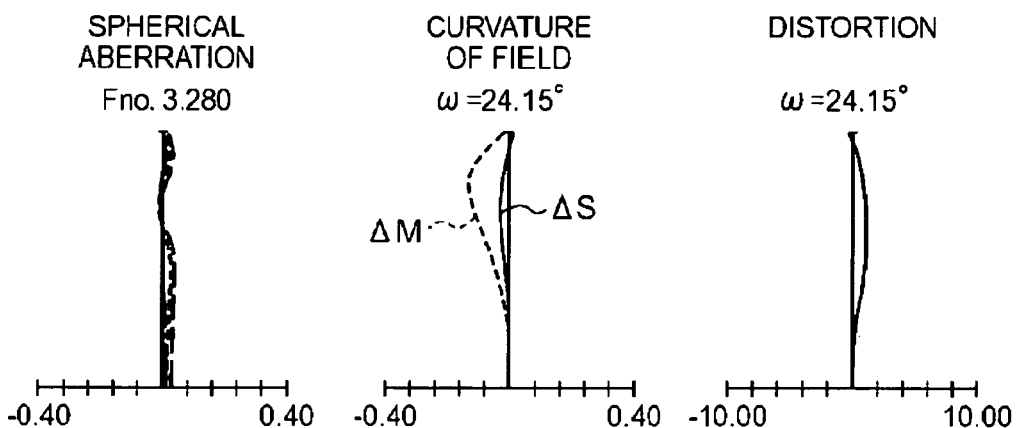
Figure 12C:
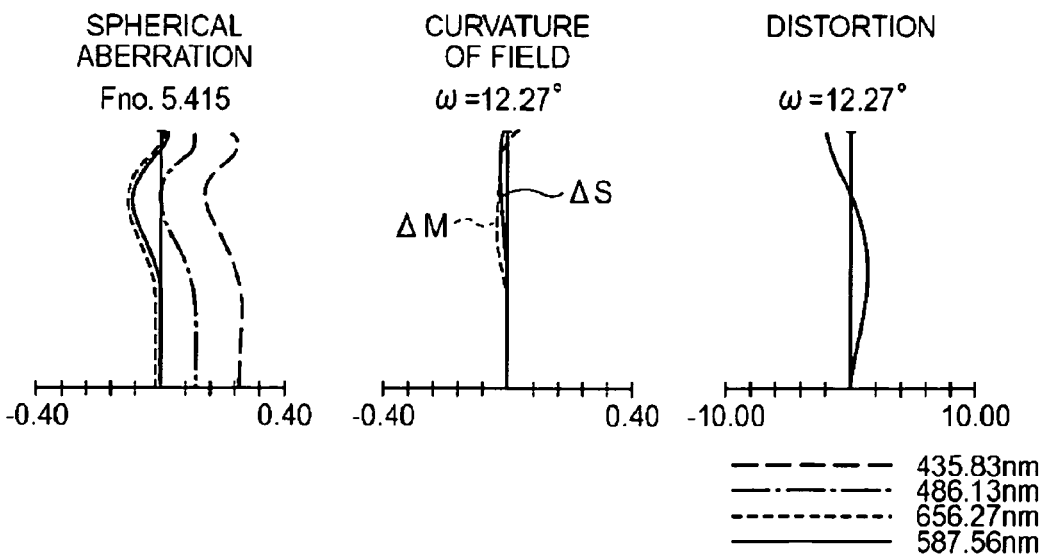

FIGS. 12A to 12C show spherical aberration, astigmatism, and distortion of the fifth embodiment, FIG. 12A shows a state in the wide-angle end, FIG. 12B shows a state in the intermediate focal length position, and FIG. 12C shows a state in the telephoto end, respectively.

As shown in FIG. 11A, the zoom optical system comprises a first lens unit G1 having a negative refractive power, a second lens unit G2 having a positive refractive power, and a third lens unit G3 having a positive refractive power in order from the object side X toward the image pickup surface I.

The first lens unit G1 includes a double-concave negative lens L11 and has a negative refractive power. The unit moves during variation of magnification.

The second lens unit G2 is disposed on the image pickup surface I side of the first lens unit G1 with the aperture stop S in the space between the first and second lens units. The second lens unit includes a double-convex positive lens L21 and a negative meniscus lens L22 whose concave surface is directed toward the image pickup surface I side in order from the object side X, with an air space between the lenses L21 and L22. The second lens unit has a positive refractive power.

The third lens unit G3 comprises a positive meniscus lens L31 whose concave surface is directed toward the object side. The third lens unit has a positive refractive power. The unit is fixed during variation of magnification. A plane parallel plate FL is disposed between the third lens unit G3 and the image pickup surface I. The plane parallel plate FL is formed of an optical low pass filter, an infrared-ray absorbing filter and the like.

The second lens unit G2 moves from the image pickup surface I side toward the object side X during variation of magnification from the wide-angle end (FIG. 11A) to the telephoto end (FIG. 11C). At this time, the space d2 between the first lens unit G1 and the second lens unit G2 decreases, the space d7 between the second lens unit G2 and the third lens unit G3 increases, and the spaces between the lens units changes. It is to be noted that on the image pickup surface I, the maximum image height is a half of the diagonal length of the effective image pickup surface of the CCD or the CMOS sensor.

Numerical Data 5
IH: 2.25 mm
fL: 3.8 mm to 10.6 mm
Fno: 2.8 to 5.4

TABLE 13

| Surface No. | r | d | nd | νd |
|---|---|---|---|---|
| 1* | −7.853 | 0.50 | 1.49700 | 81.54 |
| 2* | 9.085 | D1(variable) | | |
| 3 (aperture stop) | ∞ | d3 = 0.30 | | |
| 4* | 2.108 | 1.32 | 1.51633 | 64.14 |
| 5* | −3.839 | 0.23 | | |
| 6* | 11.847 | 1.172 | 1.60687 | 27.03(plastic lens) |
| 7* | 1.428 | D2(variable) | | |
| 8* | −33.723 | 1.07 | 1.52542 | 55.78(plastic lens) |
| 9* | −3.956 | 1.94 | | |
| 10 | ∞ | 0.50 | 1.51633 | 64.14 |
| 11 | ∞ | 0.50 | | |
| 12 (image pickup surface) | ∞ | | | |

*mark: aspherical surface

TABLE 14

Aspherical Surface Coefficient

| Surface No. | k | A4 | A6 | A8 | A10 |
|---|---|---|---|---|---|
| 1 | 0.9810 | −1.4737E−3 | 6.5315E−4 | −4.8254E−5 | 7.4343E−7 |
| 2 | −7.8939 | −3.3009E−3 | 1.2166E−3 | −8.4213E−5 | −5.9356E−7 |
| 4 | 0.4903 | −1.1535E−2 | −1.0013E−4 | −1.0979E−3 | −7.5035E−4 |
| 5 | −1.0874 | 2.0121E−2 | 3.6737E−3 | −9.2262E−3 | 2.0420E−3 |
| 6 | 0 | −2.7733E−2 | 1.1102E−2 | −1.7554E−2 | 4.4269E−3 |
| 7 | −0.6661 | −4.2240E−2 | 1.9386E−2 | −3.2246E−3 | −1.5530E−3 |
| 8 | 0 | 1.0910E−2 | −2.0296E−3 | −8.5832E−5 | 1.7517E−5 |
| 9 | −5.1586 | 5.0166E−3 | −1.9639E−3 | −1.8925E−5 | 8.6882E−6 |

TABLE 15

Zoom Data 5

| Zoom State | Wide-Angle End | Intermediate | Telephoto End |
|---|---|---|---|
| fL | 3.8 | 5.0 | 10.6 |
| Fno. | 2.8 | 3.3 | 5.4 |
| ω(half angle of view) | 31.8° | 24.1° | 12.3° |
| D1 | 5.80 | 4.10 | 1.20 |
| D2 | 0.59 | 1.58 | 6.28 |

Sixth Example

Figure 13A:
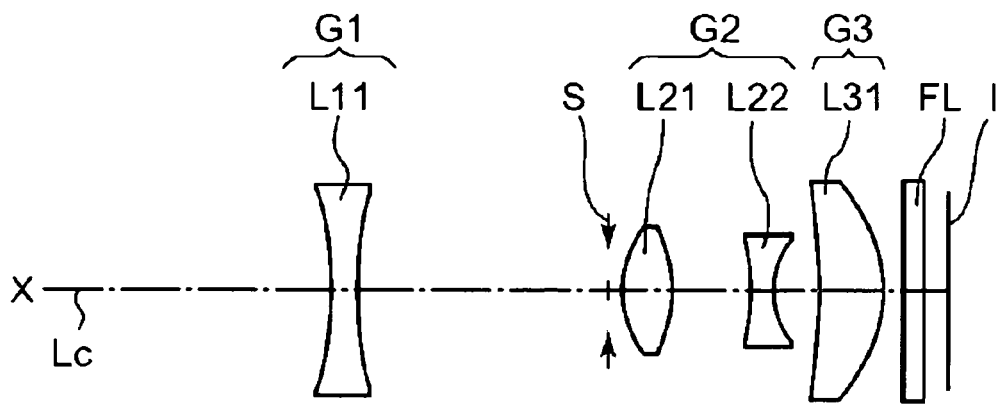
FIGS. 13A to 13C are sectional views of the sixth embodiment of the present invention, cut along a plane including the optical axis of the zoom optical system.
Figure 13B:
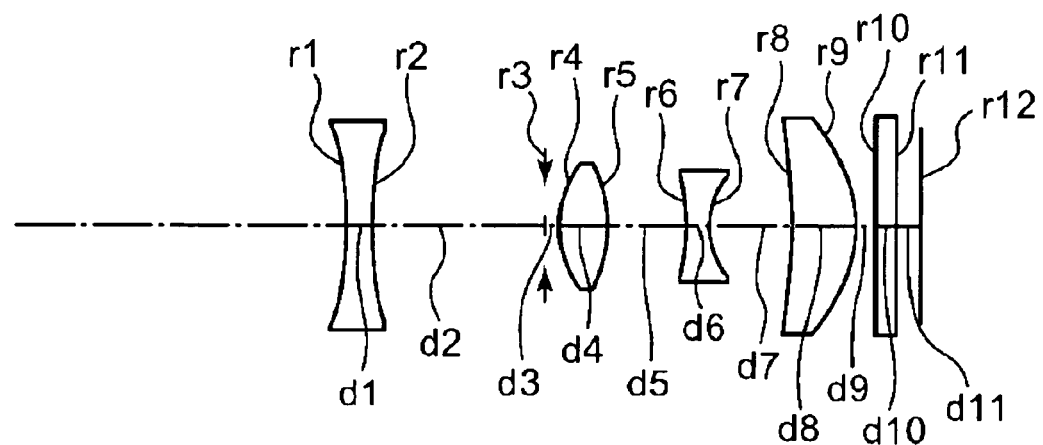
Figure 13C:
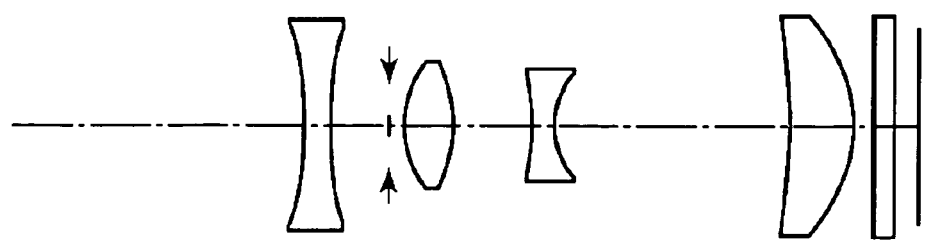

FIGS. 13A to 13C are sectional views of the sixth example including the optical axis thereof, FIG. 13A shows a state at the wide-angle end, FIG. 13B shows a state at an intermediate focal length position, and FIG. 13C shows a state at the telephoto end, respectively.

Figure 14A:
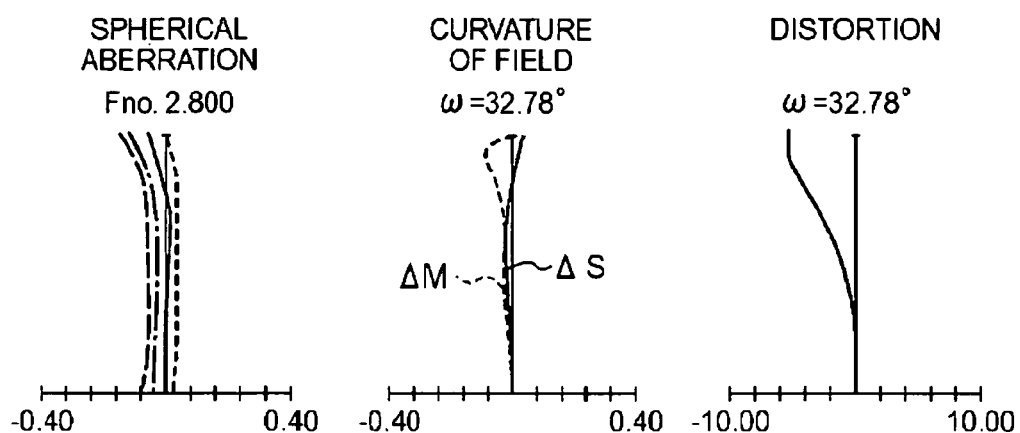
FIGS. 14A to 14C show spherical aberration, astigmatism, and distortion of the sixth embodiment.
Figure 14B:
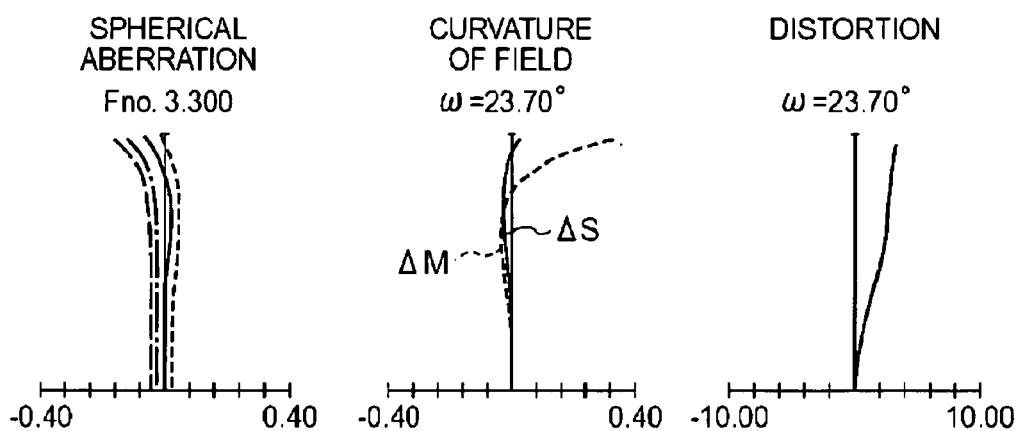
Figure 14C:
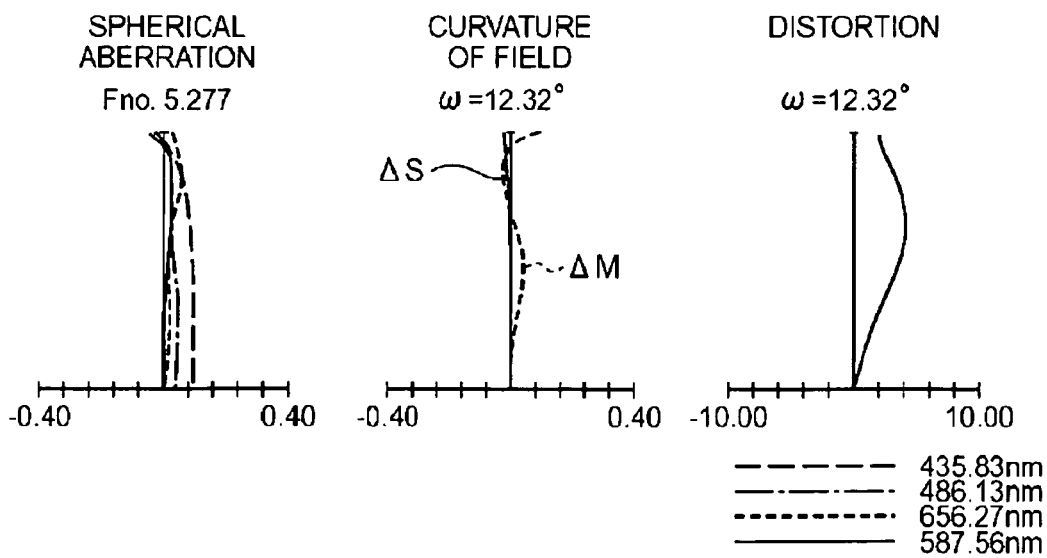

FIGS. 14A to 14C show spherical aberration, astigmatism, and distortion in the sixth example, FIG. 14A shows a state at the wide-angle end, FIG. 14B shows a state at the intermediate focal length position, and FIG. 14C shows a state at the telephoto end, respectively.

As shown in FIG. 13A, the zoom optical system comprises a first lens unit G1 having a negative refractive power, a second lens unit G2 having a positive refractive power, and a third lens unit G3 having a positive refractive power in order from the object side X toward the image pickup surface I.

The first lens unit G1 includes a double-concave negative lens L11 and has a negative refractive power. The unit moves during variation of magnification.

The second lens unit G2 is disposed on the image pickup surface I side of the first lens unit G1 with the aperture stop S in the space between the first and second lens units. The second lens unit includes a double-convex positive lens L21 and a double-concave negative lens L22 in order from the object side X, with an air space between the lenses L21 and L22. The second lens unit has a positive refractive power.

The third lens unit G3 includes a positive meniscus lens L31 whose concave surface is directed toward the object side. The third lens unit has a positive refractive power, and the unit is fixed during variation of magnification. The plane parallel plate FL is disposed between the third lens unit G3 and the image pickup surface I. The plane parallel plate FL is formed of an optical low pass filter, an infrared-ray absorbing filter and the like.

The second lens unit G2 moves from the image pickup surface I side toward the object side X during variation of magnification from the wide-angle end (FIG. 13A) to the telephoto end (FIG. 13C). The third lens unit G3 is fixed. At this time, the space d2 between the first lens unit G1 and the second lens unit G2 decreases, the space d7 between the second lens unit G2 and the third lens unit G3 increases, and the spaces between the lens units changes. It is to be noted that on the image pickup surface I, the maximum image height is a half of the diagonal length of the effective image pickup surface of the CCD or the CMOS sensor.

Numerical Data 6
IH: 2.25 mm
fF: 3.7 mm to 10.1 mm
Fno: 2.8 to 5.3

TABLE 16

| Surface No. | r | d | nd | vd |
|---|---|---|---|---|
| 1* | −9.540 | 0.50 | 1.52542 | 55.80(plastic lens) |
| 2* | 7.264 | D1(variable) | | |
| 3 (aperture stop) | ∞ | 0.30 | | |
| 4* | 2.328 | 1.11 | 1.48749 | 70.23 |
| 5* | −3.540 | 1.65 | | |
| 6 | −7.568 | 0.50 | 1.60687 | 27.03(plastic lens) |
| 7* | 2.371 | D2(variable) | | |
| 8 | −80.915 | 1.45 | 1.52542 | 55.78(plastic lens) |
| 9* | −2.771 | 0.94 | | |
| 10 | ∞ | 0.50 | 1.51633 | 64.14 |
| 11 | ∞ | 0.50 | | |
| 12 (image pickup surface) | ∞ | | | |

*mark: aspherical surface

TABLE 17

Aspherical Surface Coefficient

| Surface No. | k | A4 | A6 | A8 |
|---|---|---|---|---|
| 1 | 0 | −1.9086E−2 | 4.9653E−3 | −3.5838E−4 |
| 2 | 0 | −2.0726E−2 | 5.9923E−3 | −3.1807E−4 |
| 4 | −1.9712 | 7.5983E−3 | −8.6524E−4 | 0 |

TABLE 17-continued

Aspherical Surface Coefficient

| Surface No. | k | A4 | A6 | A8 |
|---|---|---|---|---|
| 5 | 0 | 1.1441E−2 | −1.5539E−3 | 1.0720E−4 |
| 7 | 2.1787 | −1.7149E−2 | 4.6266E−3 | −8.1781E−3 |
| 9 | −5.2351 | −2.1273E−3 | −1.1166E−3 | 8.9849E−5 |

TABLE 18

Zoom Data 6

| Zoom State | Wide-Angle End | Intermediate | Telephoto End |
|---|---|---|---|
| fL | 3.7 | 5.0 | 10.1 |
| Fno. | 2.8 | 3.3 | 5.3 |
| ω(half angle of view) | 32.8° | 23.7° | 12.3° |
| D1 | 5.55 | 3.83 | 1.28 |
| D2 | 0.89 | 1.73 | 5.15 |

Seventh Example

Figure 15A:
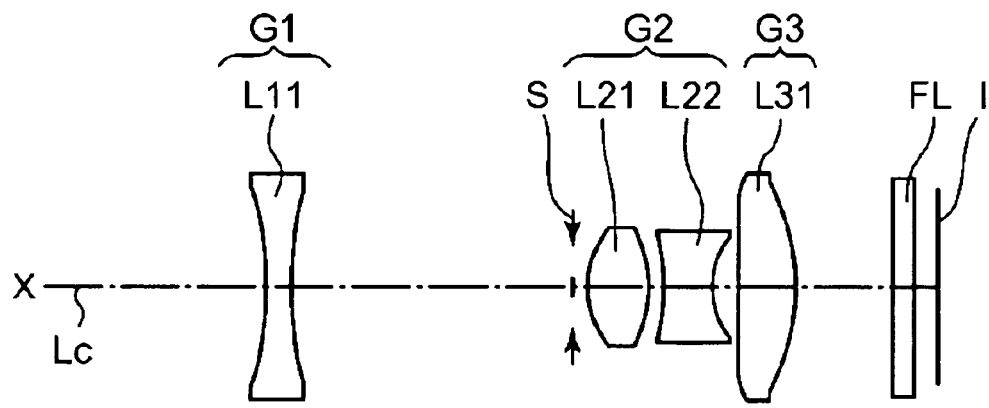
FIGS. 15A to 15C are sectional views of the seventh embodiment of the present invention, cut along a plane including the optical axis of the zoom optical system.
Figure 15B:
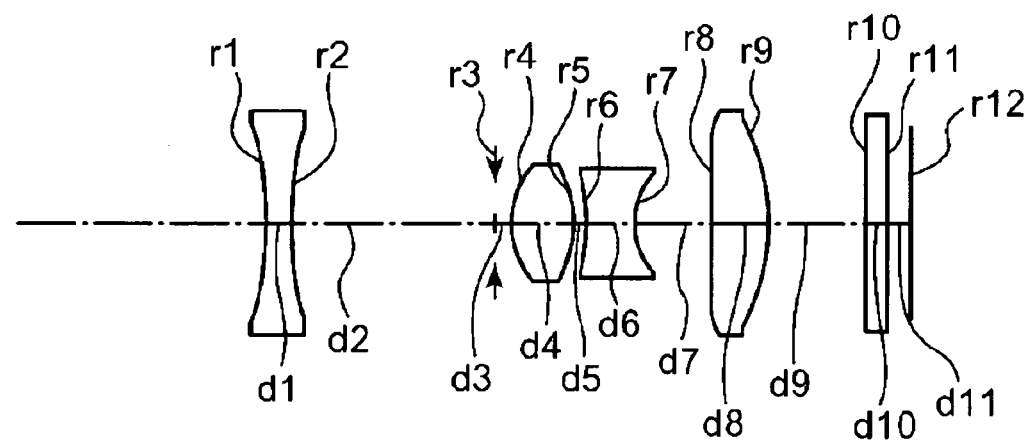
Figure 15C:
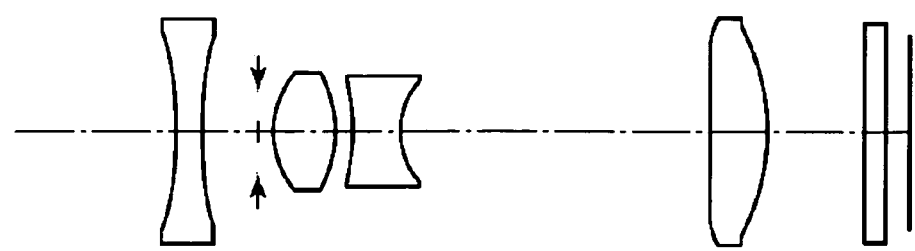

FIGS. 15A to 15C are sectional views of the seventh example including the optical axis thereof, FIG. 15A shows the state at the wide-angle end, FIG. 15B shows the state at the intermediate focal length position, and FIG. 15C shows the state at the telephoto end, respectively.

Figure 16A:
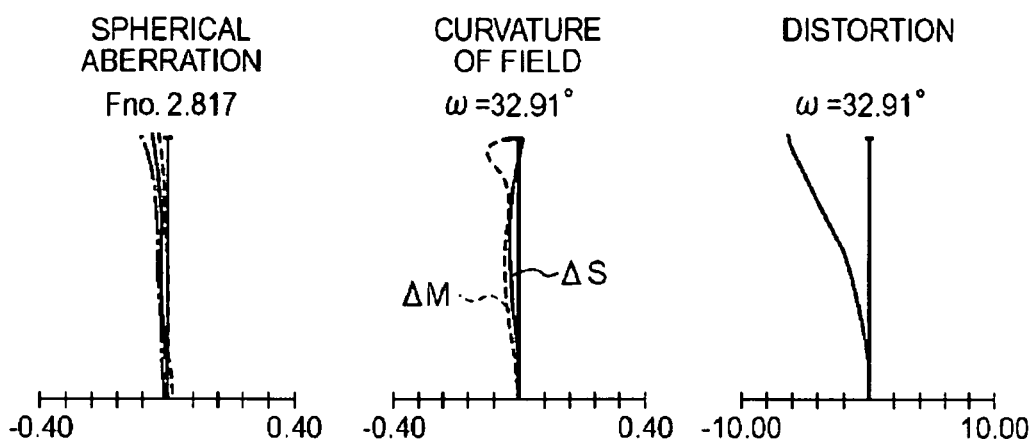
FIGS. 16A to 16C show spherical aberration, astigmatism, and distortion of the seventh embodiment.
Figure 16B:
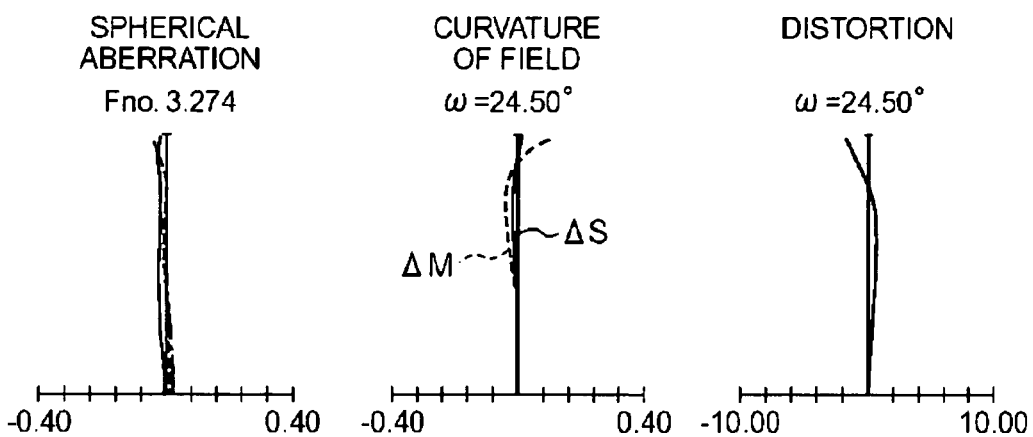
Figure 16C:
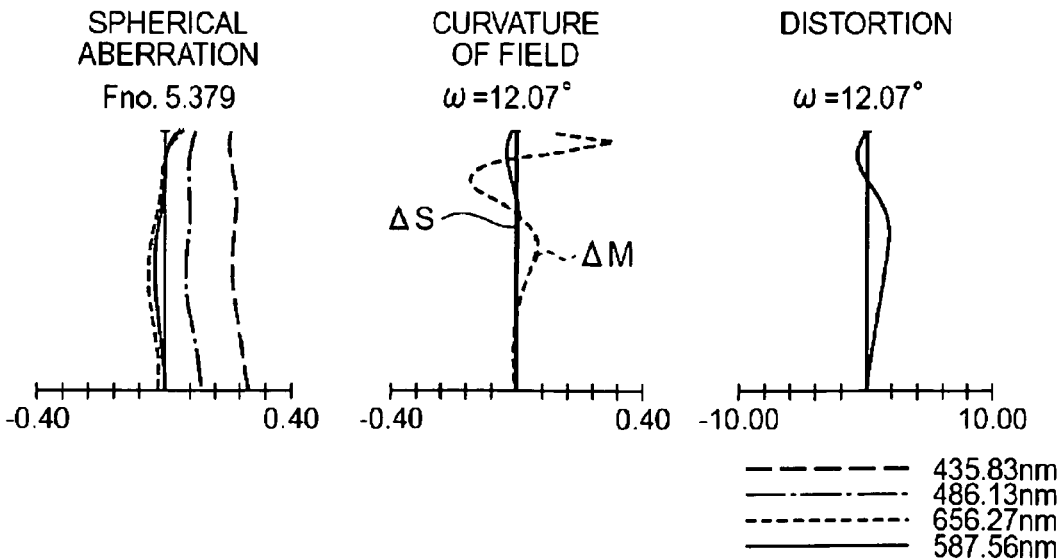

FIGS. 16A to 16C show spherical aberration, astigmatism, and distortion of the seventh embodiment, FIG. 16A shows the state at the wide-angle end, FIG. 16B shows the state at the intermediate focal length position, and FIG. 16C shows the state at the telephoto end, respectively.

As shown in FIG. 15A, the zoom optical system comprises a first lens unit G1 having a negative refractive power, a second lens unit G2 having a positive refractive power, and a third lens unit G3 having a positive refractive power in order from the object side X toward the image pickup surface I.

The first lens unit G1 includes a double-concave negative lens L11 and has a negative refractive power. The unit moves during variation of magnification.

The second lens unit G2 is disposed on an image pickup surface I side of the first lens unit G1 with the aperture stop S in the space between the first and second lens units. The second lens unit includes a double-convex positive lens L21 and a double-concave negative lens L22 in order from the object side X, with an air space between the lenses L21 and L22. The second lens unit has a positive refractive power.

The third lens unit G3 includes a double-convex positive lens L31. The third lens unit has a positive refractive power, and is fixed during variation of magnification. The plane parallel plate FL is disposed between the third lens unit G3 and the image pickup surface I. The plane parallel plate FL is formed of an optical low pass filter, an infrared-ray absorbing filter and the like.

The second lens unit G2 moves from the image pickup surface I side toward the object side X during variation of magnification from the wide-angle end (FIG. 15A) to the telephoto end (FIG. 15C). At this time, the space d2 between the first lens unit G1 and the second lens unit G2 decreases, the space d7 between the second lens unit G2 and the third lens unit G3 increases, and the spaces between the lens units changes. It is to be noted that on the image pickup surface I, the maximum image height is a half of the diagonal length of the effective image pickup surface of the CCD or the CMOS sensor.

Numerical Data 7
IH: 2.25 mm
fL: 3.7 mm to 10.1 mm
Fno: 2.8 to 5.3

TABLE 19

| Surface No. | r | d | nd | vd |
|---|---|---|---|---|
| 1* | −11.831 | 0.50 | 1.49700 | 81.54 |
| 2* | 6.858 | D1(variable) | | |
| 3 (aperture stop) | ∞ | 0.30 | | |
| 4* | 1.911 | 1.32 | 1.52542 | 55.78(plastic lens) |
| 5* | −3.294 | 0.23 | | |
| 6* | −9.724 | 1.05 | 1.60687 | 27.03(plastic lens) |
| 7* | 1.720 | D2(variable) | | |
| 8* | 146.052 | 1.18 | 1.69100 | 54.82 |
| 9* | −5.882 | 2.01 | | |
| 10 | ∞ | 0.50 | 1.51633 | 64.14 |
| 11 | ∞ | 0.49 | | |
| 12 (image pickup surface) | ∞ | | | |

*mark: aspherical surface

TABLE 20

Aspherical Surface Coefficient

| Surface No. | k | A4 | A6 | A8 | A10 |
|---|---|---|---|---|---|
| 1 | 0.7505 | −3.0131E−3 | −8.0295E−5 | 1.9229E−4 | −1.7195E−5 |
| 2 | −8.0068 | −1.2875E−3 | −5.4296E−4 | 4.2774E−4 | −3.6982E−5 |
| 4 | 0.4017 | −1.0944E−2 | −3.5790E−3 | 1.7809E−4 | −9.6814E−4 |
| 5 | −0.3103 | 1.7853E−2 | 7.5270E−3 | −1.0390E−2 | 3.7988E−3 |
| 6 | 0 | −4.5896E−2 | 1.6389E−2 | −1.3073E−2 | 4.8923E−3 |
| 7 | −0.6318 | −4.2907E−2 | 3.5560E−2 | −1.336E−2 | 7.1005E−3 |
| 8 | 0 | 1.0643E−2 | −2.9194E−3 | 1.0575E−4 | 2.7686E−5 |
| 9 | −6.0465 | 8.7300E−3 | −1.7994E−3 | −2.8530E−4 | 5.9468E−5 |

TABLE 21

Zoom Data 7

| Zoom State | Wide-Angle End | Intermediate | Telephoto End |
|---|---|---|---|
| fL | 3.8 | 5.0 | 10.5 |
| Fno. | 2.8 | 3.3 | 5.4 |
| ω(half angle of view) | 31.9° | 24.5° | 12.1° |
| D1 | 5.88 | 4.15 | 1.21 |
| D2 | 0.55 | 1.61 | 6.49 |

Eighth Example

Figure 17A:
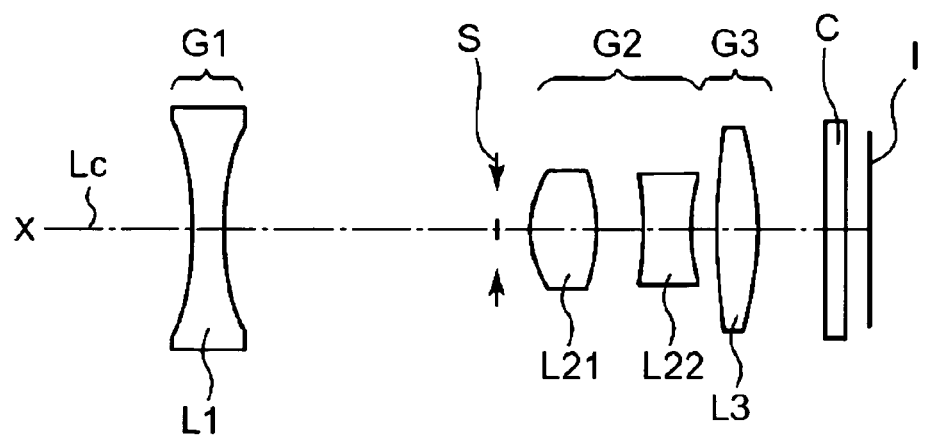
FIGS. 17A to 17C are sectional views of the eighth embodiment of the present invention, cut along a plane including the optical axis of the zoom optical system.
Figure 17B:
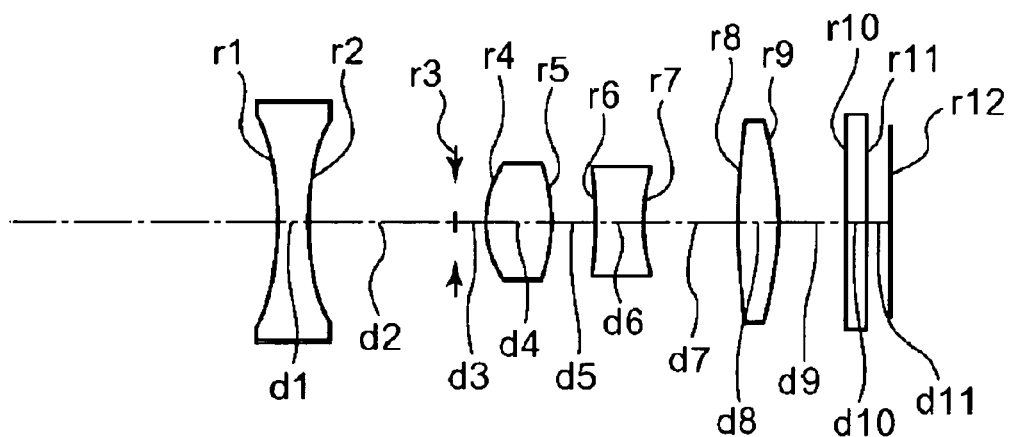
Figure 17C:
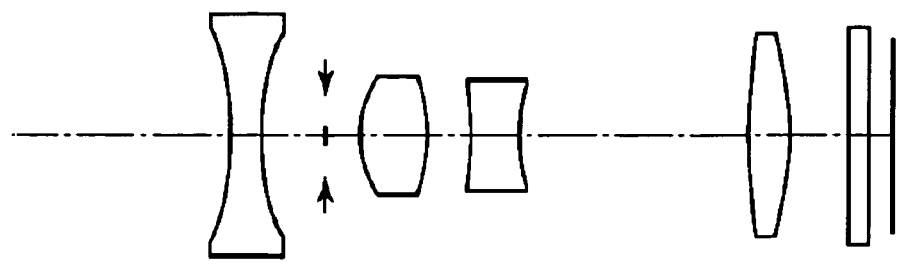

FIGS. 17A to 17C are sectional views of the eighth example including an optical axis thereof, FIG. 17A shows the state at the wide-angle end, FIG. 17B shows the state at the intermediate focal length position, and FIG. 17C shows the state at the telephoto end, respectively.

Figure 18A:
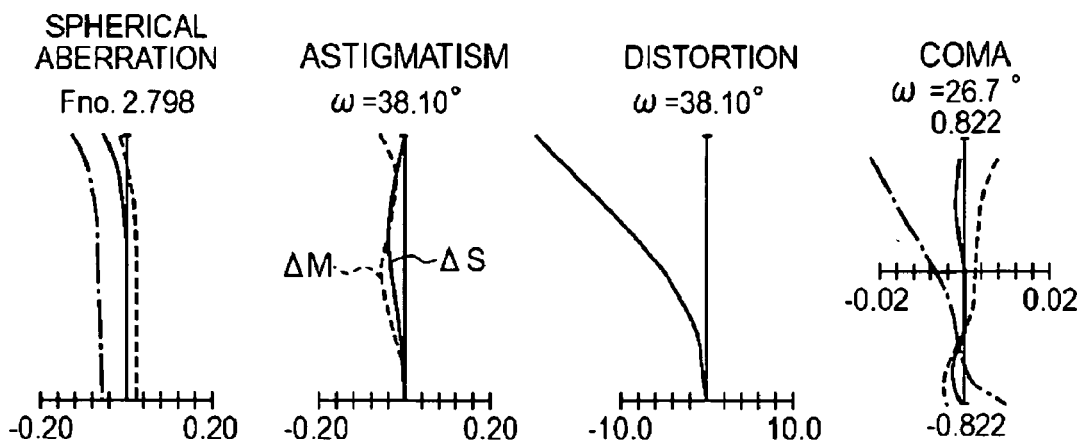
FIGS. 18A to 18C show spherical aberration, astigmatism, distortion, and coma of the eighth embodiment.
Figure 18B:
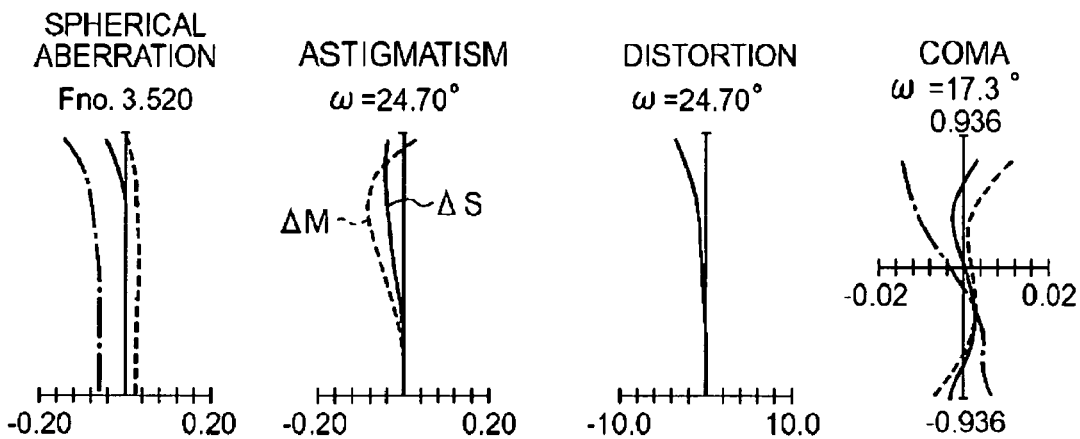
Figure 18C:
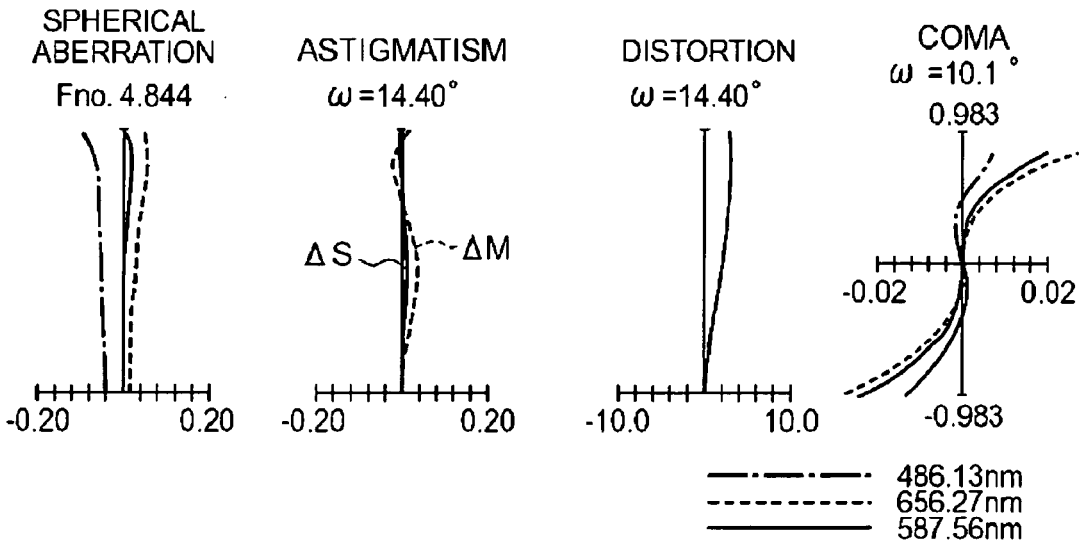

FIGS. 18A to 18C show spherical aberration, astigmatism, distortion, and lateral coma of the eighth example, FIG. 18A shows the state at the wide-angle end, FIG. 18B shows the state at the intermediate focal length position, and FIG. 18C shows the state at the telephoto end, respectively.

As shown in FIG. 18A, the zoom optical system comprises a first lens unit G1 having a negative refractive power, a second lens unit G2 having a positive refractive power, and a third lens unit G3 having a positive refractive power in order from the object side X toward the image pickup surface I.

The first lens unit G1 includes only one double-concave negative lens L1 whose opposite surfaces are aspherical surfaces. The second lens unit G2 includes a double-convex positive lens L21 whose opposite surfaces are aspherical surfaces, and a double-concave negative lens L22 whose image-side surface is an aspherical surface in order from the object side. The third lens unit G3 includes only one double-convex positive lens L3 whose object-side surface is coated with an optical thin film (not shown) so as to cut an infrared ray and whose image-side surface is an aspherical surface. S denotes an aperture stop, and CG denotes cover glass.

It is to be noted that the coating for cutting the infrared ray may be disposed on the image-side surface of the positive lens L3, or on the surface of another lens. Alternatively, the coating may be disposed on the surface of a filter such as an optical low pass filter.

During variation of magnification from the wide-angle end (FIG. 17A) to the telephoto end (FIG. 17C), along an optical axis Lc, the first lens unit G1 moves toward the image side and then toward the object side, the second lens unit G2 moves toward the object side, and the third lens unit G3 is fixed.

Numerical Data 8
IH: 2.25 mm
fL: 3.2 mm to 8.5 mm
Fno: 2.8 to 4.8
Angle of view (2ω): 76.2° to 28.8°

TABLE 22

| Surface No. | R | D | Nd | Vd |
|---|---|---|---|---|
| 1* | −7.898 | 0.67 | 1.52542 | 55.78(plastic lens) |
| 2* | 6.245 | D1(variable) | | |
| 3 (aperture stop) | ∞ | 0.75 | | |
| 4* | 2.581 | 1.40 | 1.52542 | 55.78(plastic lens) |
| 5* | −3.679 | 1.02 | | |
| 6* | −8.795 | 0.99 | 1.60687 | 27.03(plastic lens) |
| 7* | 3.222 | D2(variable) | | |
| 8 | 19.576 | 0.88 | 1.52542 | 55.78(plastic lens) |
| 9* | −7.913 | 1.40 | | |
| 10 | ∞ | 0.50 | 1.51633 | 64.14 |
| 11 | ∞ | 0.50 | | |
| 12 (image pickup surface) | | | | |

*mark: aspherical surface

TABLE 23

Aspherical Surface Coefficient

| Surface No. | k | A4 | A6 | A8 |
|---|---|---|---|---|
| 1 | 0 | −4.4963E−3 | 1.1928E−3 | −6.1456E−5 |
| 2 | 0 | −5.9954E−3 | 1.8182E−3 | 5.4713E−6 |
| 4 | −1.9920 | 6.8196E−3 | −4.6381E−4 | |
| 5 | 0 | 1.1181E−2 | −1.2020E−3 | 8.4288E−5 |
| 7 | 3.1471 | −1.3938E−2 | 4.6177E−3 | −1.5879E−3 |
| 9 | −0.7915 | 6.5630E−3 | −1.1630E−3 | 7.0550E−5 |

TABLE 24

Zoom Data

| Zoom State | Wide-Angle End | Intermediate | Telephoto End |
|---|---|---|---|
| f | 3.2 | 5.1 | 8.5 |
| Fno. | 2.8 | 3.5 | 4.8 |
| ω(half angle of view) | | | |
| D1 | 5.83 | 3.30 | 1.53 |
| D2 | 0.65 | 2.25 | 5.20 |

Ninth Example

Figure 19A:
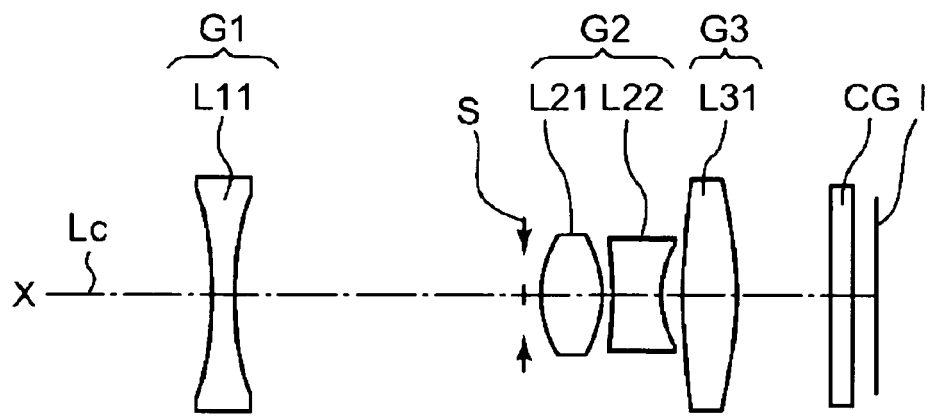
FIGS. 19A to 19C are sectional views of the ninth embodiment of the present invention, cut along a plane including an optical axis of a zoom optical system.
Figure 19B:
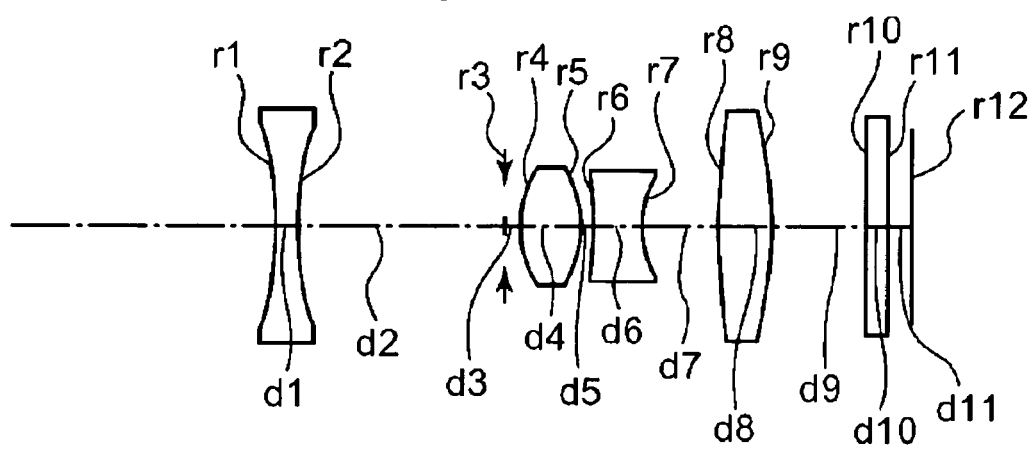
Figure 19C:
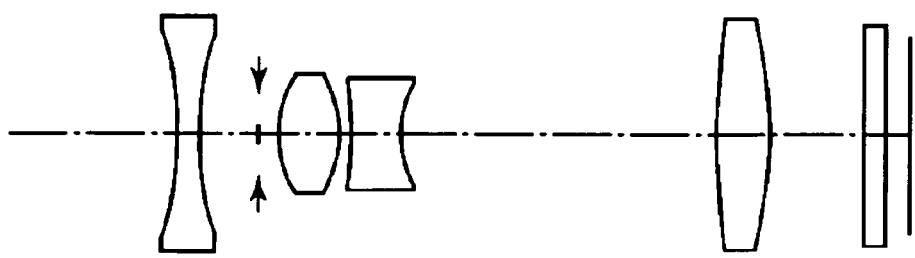

FIGS. 19A to 19C are sectional views of the ninth example including the optical axis thereof, FIG. 19A shows the state at the wide-angle end, FIG. 19B shows the state at the intermediate focal length position, and FIG. 19C shows the state at the telephoto end, respectively.

Figure 20A:
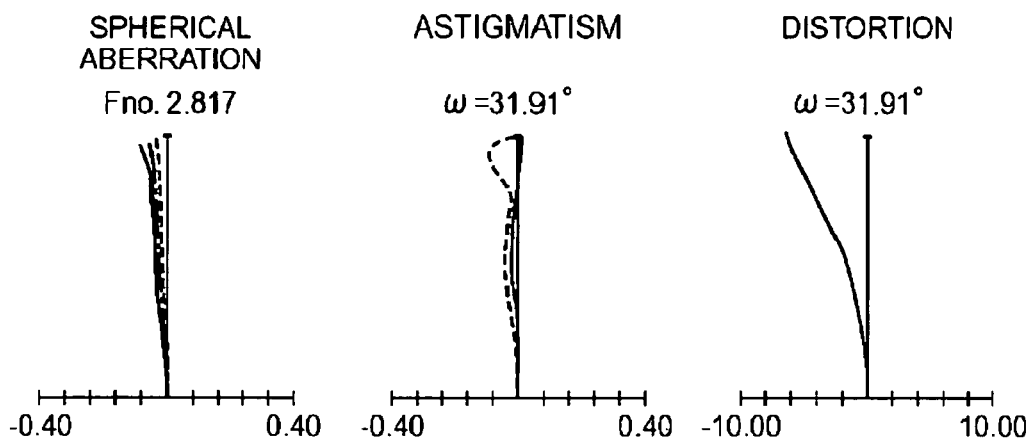
FIGS. 20A to 20C show spherical aberration, astigmatism, and distortion of the ninth embodiment.
Figure 20B:
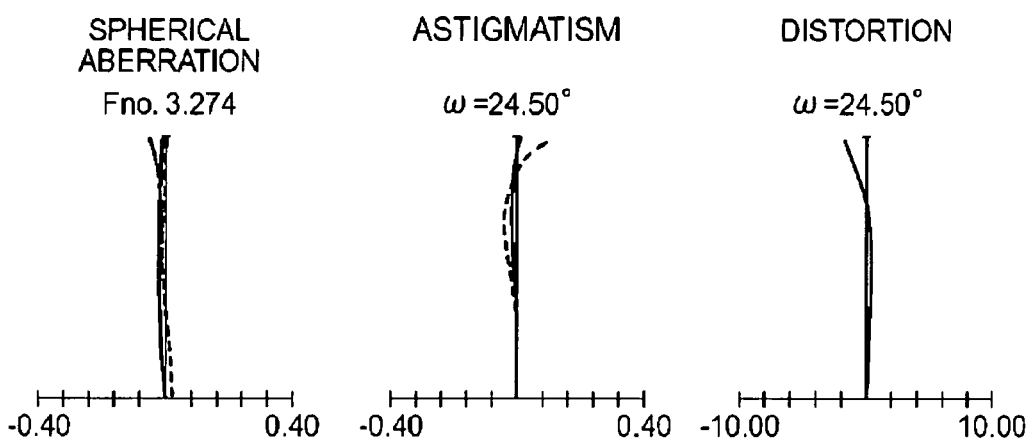
Figure 20C:
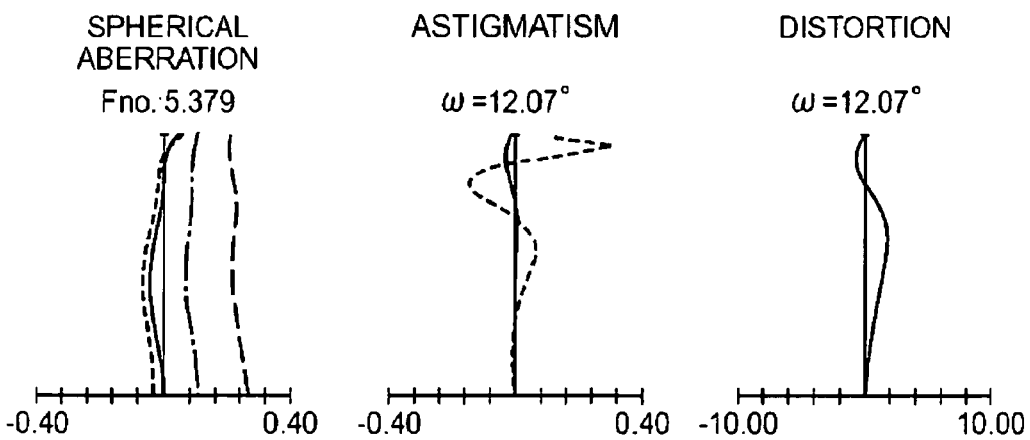

FIGS. 20A to 20C show spherical aberration, astigmatism, and distortion of the ninth example, FIG. 20A shows the state at the wide-angle end, FIG. 20B shows the state at the intermediate focal length position, and FIG. 20C shows the state at the telephoto end, respectively.

As shown in FIG. 19A, the zoom optical system comprises a first lens unit G1 having a negative refractive power, an aperture stop S, a second lens unit G2 having a positive refractive power, and a third lens unit G3 having a positive refractive power in order from the object side X toward the image pickup surface I. Moreover, CG denotes cover glass, and I denotes the image pickup surface I of an electronic image sensor.

The first lens unit G1 includes a double-concave negative lens L11 whose opposite surfaces are aspherical surfaces. The second lens unit G2 includes a double-convex positive lens L21 whose opposite surfaces are aspherical surfaces, and a double-concave negative lens L22 whose opposite surfaces are aspherical surfaces in order from the object side X, with an air space between the lenses L21 and L22. The third lens unit G3 includes a positive lens L31 whose opposite surfaces are aspherical surfaces and which has a double-convex shape in the vicinity of the optical axis. During variation of magnification from the wide-angle end to the telephoto end, the space between the first lens unit G1 and the second lens unit G2 decreases, and the space between the second lens unit G2 and the third lens unit G3 increases.

It is to be noted that the first lens unit G1 moves on the locus convex toward the image side, the second lens unit G2 monotinically moves toward the object side together with the aperture stop S, and the third lens unit G3 is fixed.

Numerical Data 9

IH: 2.25 mm fL: 3.8 mm to 10.5 mm

Fno: 2.8 to 5.4

Angle of view (2ω): 63.8° to 24.1°

TABLE 25

| Surface No. | R | D | Nd | Vd |
|---|---|---|---|---|
| 1* | −11.831 | 0.50 | 1.49700 | 81.54 |
| 2* | 6.858 | D1(variable) | | |
| 3(aperture stop) | ∞ | 0.30 | | |
| 4* | 1.911 | 1.32 | 1.52542 | 55.78(plastic lens) |
| 5* | −3.294 | 0.23 | | |
| 6 | −9.724 | 1.05 | 1.60687 | 27.03 |
| 7* | 1.720 | D2(variable) | | |
| 8* | 146.052 | 1.18 | 1.69100 | 54.82 |
| 9* | −5.882 | 2.01 | | |
| 10 | ∞ | 0.50 | 1.51633 | 64.14 |
| 11 | ∞ | 0.49 | | |
| 12(image pickup surface) | ∞ | | | |

*mark: aspherical surface

TABLE 26

Aspherical Surface Coefficient

| Surface No. | k | A4 | A6 | A8 | A10 |
|---|---|---|---|---|---|
| 1 | 0.7505 | −3.0131E−03 | −8.0295E−05 | 1.9229E−04 | −1.7195E−05 |
| 2 | −8.0068 | −1.2875E−03 | −5.4296E−04 | 4.2774E−04 | −3.6982E−05 |
| 4 | 0.4017 | −1.0944E−02 | −3.5790E−03 | 1.7809E−04 | −9.6814E−04 |
| 5 | −0.3103 | 1.7853E−02 | 7.5270E−03 | −1.0390E−02 | 3.7988E−03 |
| 6 | 0 | −4.5896E−02 | 1.6389E−02 | −1.3073E−02 | 4.8923E−03 |
| 7 | −0.6318 | −4.2907E−02 | 3.5560E−02 | −1.1336E−02 | 7.1005E−03 |
| 8 | 0 | 1.0643E−02 | −2.9194E−03 | 1.0575E−04 | 2.7686E−05 |
| 9 | −6.0465 | 8.7300E−03 | −1.7994E−03 | −2.8530E−04 | 5.9468E−05 |

TABLE 27

Zoom Data

| Zoom State | Wide-Angle End | Intermediate | Telephoto End |
|---|---|---|---|
| f | 3.8 | 5.0 | 10.5 |
| Fno. | 2.8 | 3.3 | 5.4 |
| ω(half angle of view) | 31.91° | 24.50° | 12.07° |
| D1 | 5.88 | 4.15 | 1.21 |
| D2 | 0.55 | 1.61 | 6.49 |

Table 28 shows numerical values of the parameters in the conditions (1) to (15) in the respective numerical examples.

TABLE 28

| Condition | Example 1 | 2 | 3 | 4 | 5 | 6 | 7 | 8 | 9 |
|---|---|---|---|---|---|---|---|---|---|
| (1) | −2.44 | −0.89 | −0.51 | −1.07 | −0.51 | −2.76 | −2.02 | −2.44 | −2.02 |
| (2) | 0.46 | 1.08 | 1.36 | 0.97 | 1.27 | 0.52 | 0.70 | 0.46 | |
| (3) | 0.80 | 0.57 | 0.64 | 0.53 | 0.55 | 0.63 | 0.50 | 0.80 | |
| (4) | 1.00 | 0.48 | 0.37 | 0.41 | 0.37 | 0.64 | 0.45 | 1.00 | 0.45 |
| (5) | 55.78 | 81.54 | 81.54 | 81.54 | 81.54 | 55.80 | 81.54 | 55.78 | 81.54 |
| (6) | 55.78 | 64.14 | 55.78 | 55.78 | 64.14 | 70.23 | 55.78 | 55.78 | 55.78 |
| (7) | 1.53 | 1.52 | 1.53 | 1.53 | 1.52 | 1.49 | 1.50 | 1.53 | 1.53 |
| (8) | 0.42 | 1.46 | 1.91 | 1.13 | 1.27 | 1.07 | 0.92 | 0.42 | 0.92 |
| (9) | 1.36 | 1.07 | 1.30 | 1.30 | 1.26 | 1.10 | 1.30 | 1.36 | 1.30 |
| (10) | 3.37 | 2.00 | 2.14 | 2.19 | 2.19 | 1.47 | 2.14 | 3.37 | 2.14 |
| (11) | 1.06 | 0.71 | 1.02 | 1.07 | 1.11 | 0.72 | 1.05 | 1.06 | 1.05 |
| (12) | | −29.90 | | | | | | −20.94 | |
| (13) | | −1.97 | | | | | | −2.45 | |
| (14) | 2.28 | | | 1.51 | 1.50 | 1.58 | | | 1.51 |
| (15) | 0.75 | | | 0.30 | 0.30 | 0.30 | | | 0.30 |

The above-described zoom optical system is usable when built in electronic equipment such as a digital camera, a video camera, a digital video unit, a personal computer, a mobile computer, a cellular phone, or an information portable terminal. Alternatively, in combination with the electronic equipment, the zoom optical system can be used as an attachment optical system detachably attached to such electronic equipment.

For example, the zoom optical system of the present invention is preferably usable in a photographing device in which an object image is formed, and the image is received by a solid image sensor such as a CCD to perform photographing, especially a camera, or a cellular phone having a photographing function. The system is also usable as an observation device in which an object image is observed through an eyepiece lens, and especially an objective optical system of a finder section of a camera. The system is further usable as an image pickup optical system for an optical device using a small-sized image sensor such as an endoscope. An embodiment will be described hereinafter.

Figure 21A:
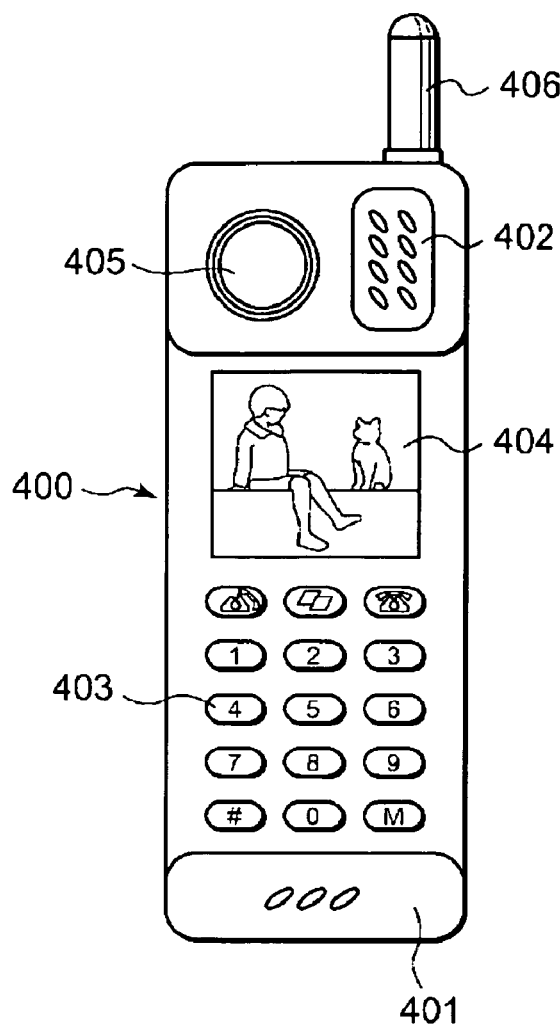
FIGS. 21A to 21C show an embodiment of a cellular phone in which the zoom optical system of the present invention is built as a picture taking optical system.
Figure 21B:
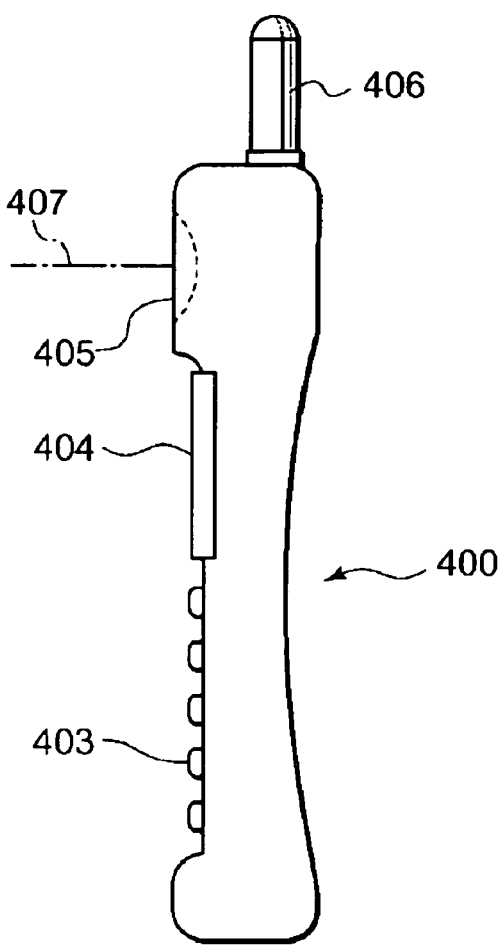
Figure 21C:
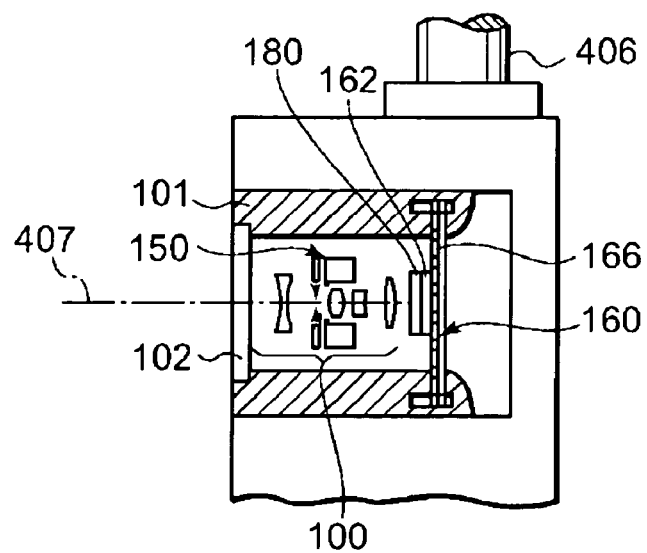

FIGS. 21A to 21C show an example in which the zoom lens of the present invention is built in a cellular phone as an example of the information processing device.

FIG. 21A is a front view of the cellular phone 400, FIG. 21B is a side view, and FIG. 21C is a sectional view of the photographing optical system 405. As shown in FIGS. 21A to 21C, the cellular phone 400 has: a microphone 401 which inputs operator's voice as information; a speaker 402 which outputs target's voice; input keys 403 with which an operator inputs information; a display 404 which displays the operator, target's image, information such as a phone number and the like; a photographing optical system 405; an antenna 406 which transmits and receives a communication radio wave; and processing means (not shown) for processing image information, communication information, input signal and the like. Here, the display 404 is a liquid crystal display element. A positional relation between the components mentioned above is not limited to that shown in the drawing. This photographing optical system 405 includes: an objective optical system 100 includes a zoom optical system disposed along the photographing optical path 407; a shutter mechanism 150; and an image sensor chip 162 which receives an image. These are built in the cellular phone 400.

An infrared-ray cutting filter 180 is attached onto the image sensor chip 162, and integrated as an image pickup unit 160 together with the image sensor chip and a substrate on which the image sensor chip is mounted. The image pickup unit is fitted into the rear end of the lens barrel 101 of the objective optical system 100 by a one-touch operation. Since the image pickup unit is thus attachable, alignment of the objective optical system 100 and the image sensor chip 162, and adjustment of the space therebetween are not required, and this facilitates assembling. Moreover, a tip of the lens barrel 101 is provided with cover glass 102 for protecting the objective optical system 100. It is to be noted that the driving mechanism or the like of the zoom optical system arranged in the lens barrel 101 is omitted from the drawing.

An object image received by the image sensor chip 162 is input into the processing means (not shown) via a terminal 166. The image is displayed as an electronic image in the display 404 and/or a display of a phone set of the target. The processing means includes a signal processing function of converting information of the object image received by the image sensor chip 162 into a transmittable signal in the case where the image is transmitted to the target.

Figure 22:
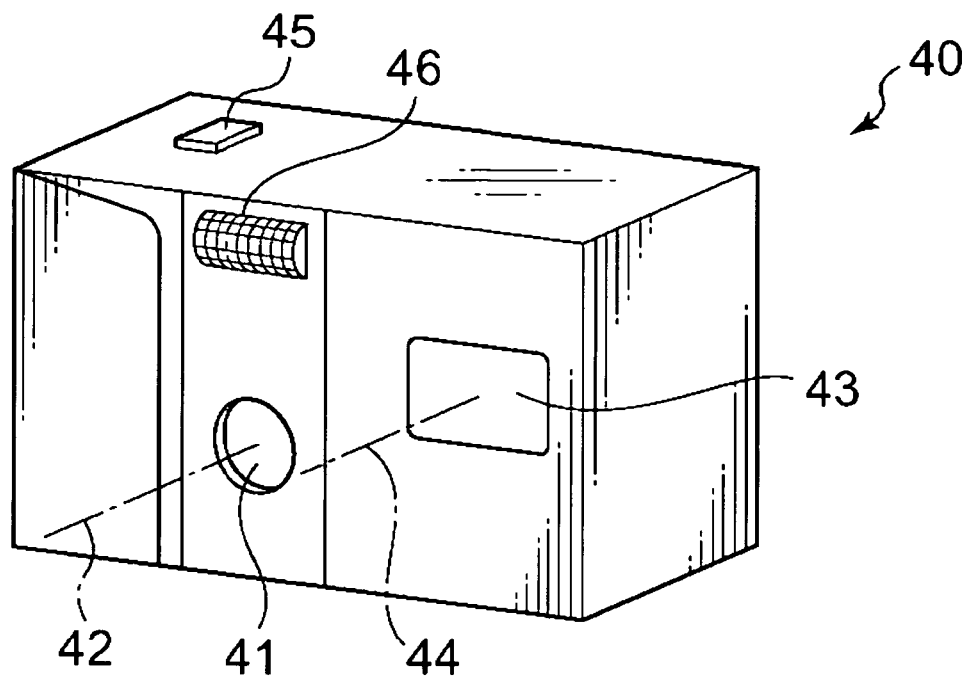
FIG. 22 to 24 shows an embodiment of an electronic camera in which the zoom optical system of the present invention is built as a picture taking optical system.
Figure 23:
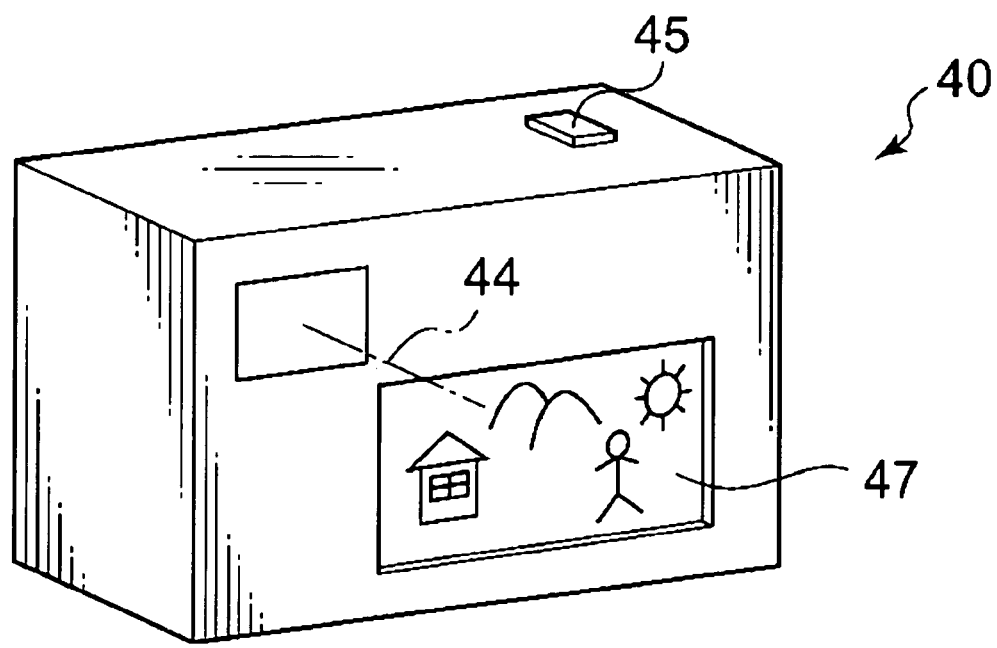
Figure 24:
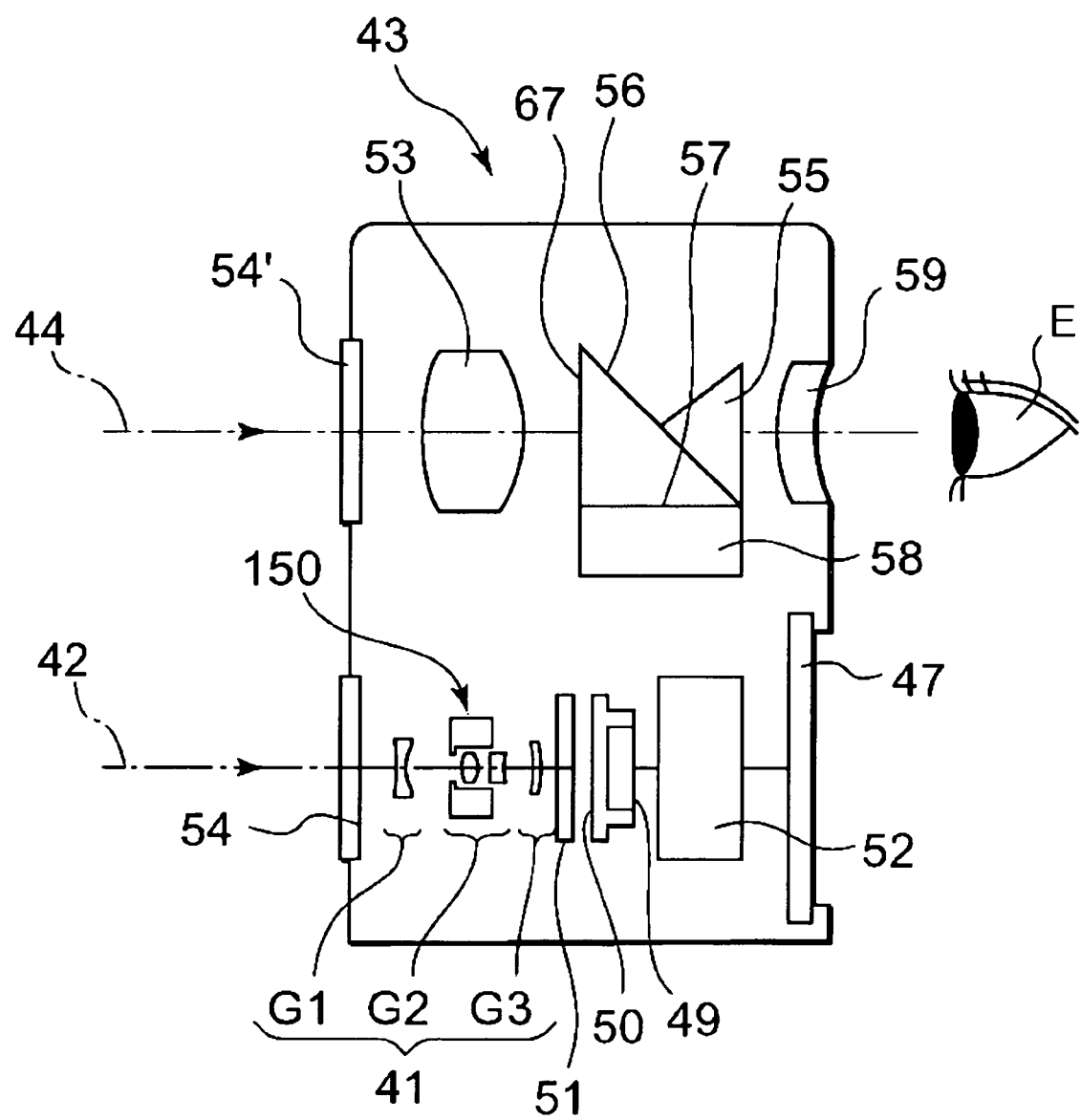

FIGS. 22 to 24 are schematic views of an electronic camera in which the zoom optical system of the present invention is incorporated into a photographing optical system 41. FIG. 22 is a front perspective view showing an appearance of an electronic camera 40, FIG. 23 is a rear perspective view of the electronic camera, and FIG. 24 is a sectional view showing an inner structure of the electronic camera 40. In this example, the electronic camera 40 includes: a photographing optical system 41 having a photographing optical path 42; a finder optical system 43 having a finder optical path 44; a shutter button 45; a flash 46; a liquid crystal display monitor 47 and the like. When the shutter button 45 disposed on the top of the camera 40 is pressed, the shutter mechanism 150 operates in relation to the pressing operation, and the photographing is performed through the photographing optical system 41. An object image is formed on the image pickup surface 50 of the CCD 49 by the photographing optical system 41. Reference numeral 51 denotes a filter unit including an optical low pass filter, an infrared-ray cutting filter and the like. The object image received by the CCD 49 is displayed as an electronic image on the liquid crystal display monitor 47 disposed in the rear of the camera via processing means 52. A memory and the like are disposed in the processing means 52, so that the photographed electronic image can be stored. It is to be noted that this memory may be disposed separately from the processing means 52. Alternatively, the image may be electronically recorded and reproduced by use of the floppy disk or the like.

Furthermore, a finder objective optical system 53 is disposed on the finder optical path 44. This finder objective optical system 53 forms the object image on the image forming surface 67 positioned in the view field frame 57 of the Poro-prism 55 which is an image electing member. It is to be noted that the view field frame 57 is disposed in the space between the first reflecting prism 56 and the second reflecting prism 58, which is formed by separating the first prism 56 and the second prism 58 of the Poro-prism. An eyepiece optical system 59 for guiding the elected object image into observer's eyeball E is disposed behind the Poro-prism 55. It is to be noted that cover members 54, 54' are disposed in front of incidence surfaces of the photographing optical system 41 and the finder objective optical system 53.

Since the zoom optical system of the present invention is used as the photographing optical system 41 in the camera 40, the number of optical members forming the photographing optical system 41 is small, and miniaturization and cost reduction can be realized. The photographing optical system 41 is a zoom optical system which has a high zooming ratio and in which the aberration is satisfactorily corrected. Therefore, a performance of the camera can be improved.

It is to be noted that in FIG. 24, a plane parallel plate is disposed as the cover member 54, but a lens having a refractive power may be used as the cover member.

Figure 25:
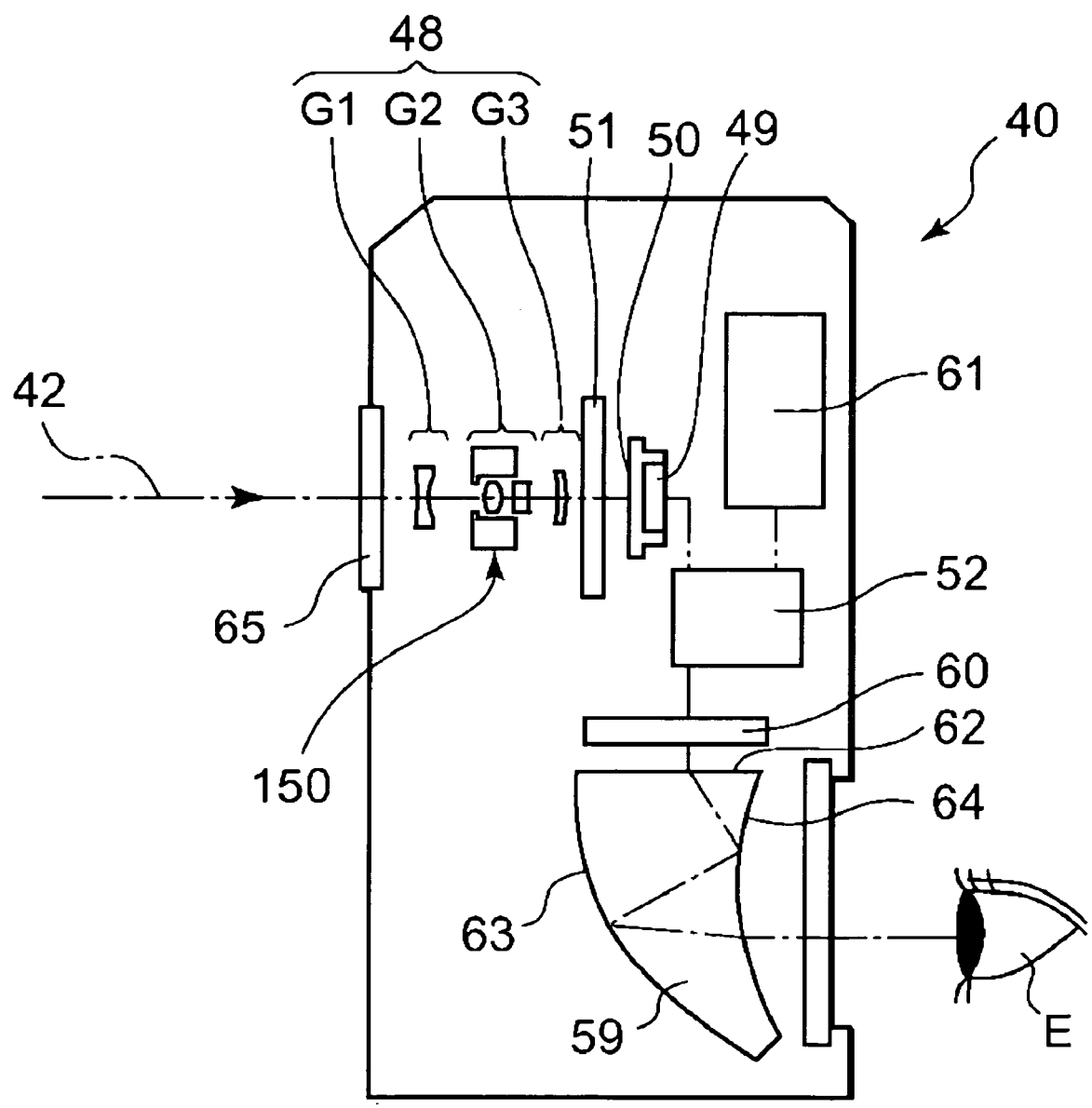
FIG. 25 is a conceptual diagram of another embodiment of an electronic camera, which shows the internal constitution thereof in which the zoom optical system of the present invention is incorporated as a picture taking optical system.

FIG. 25 is a sectional view showing an inner structure of the electronic camera 40 in which a zoom lens of the present invention is incorporated in a photographing objective optical system 48 of a photographing section. In this example, the zoom lens of the present invention is used in the photographing objective optical system 48. This photographing objective optical system 48 forms an object image on the image pickup surface 50 of the CCD 49. Reference numeral 51 denotes a filter unit including an optical low pass filter, an infrared-ray cutting filter and the like. Reference numeral 150 denotes a shutter mechanism. The object image received by the CCD 49 is displayed as an electronic image in the liquid crystal display element (LCD) 60 via the processing means 52. This processing means 52 also controls recording means 61 for recording the object image captured by the CCD 49 as electronic information. The image displayed in the LCD 60 is guided to the observer's eyeball E via the eyepiece optical system 59. This eyepiece optical system 59 is formed of a decentered prism. In this example, the decentered prism has three surfaces: an incidence surface 62; a reflective surface 63; and a reflective and refractive surface 64 having both of reflecting and refracting functions. Moreover, at least one or preferably both of the surfaces 63 and 64 having the reflecting function has an optical power and is formed as a free shaped surface having only one plane of symmetry for correcting decentering aberrations.

Since the zoom optical system of the present invention is used as the photographing objective optical system 48 in the camera 40, the number of optical members constituting the photographing objective optical system 48 is small, and miniaturization and cost reduction can be realized. The photographing objective optical system 48 is a zoom optical system which has a high zooming ratio and in which the aberration is satisfactorily corrected. Therefore, the performance of the camera can be improved.

It is to be noted that in the present example, a plane parallel plate is disposed as a cover member 65 of the photographing objective optical system 48, but a lens having an optical power may be used in the same manner as in the above-described example.

It is to be noted that the lens disposed closest to the object side in the zoom optical system may be used as the cover member without disposing any cover member. In the present example, in this case, the negative lens in the first lens unit G1 disposed closest to the object side also serves as the cover member.

Figure 26A:
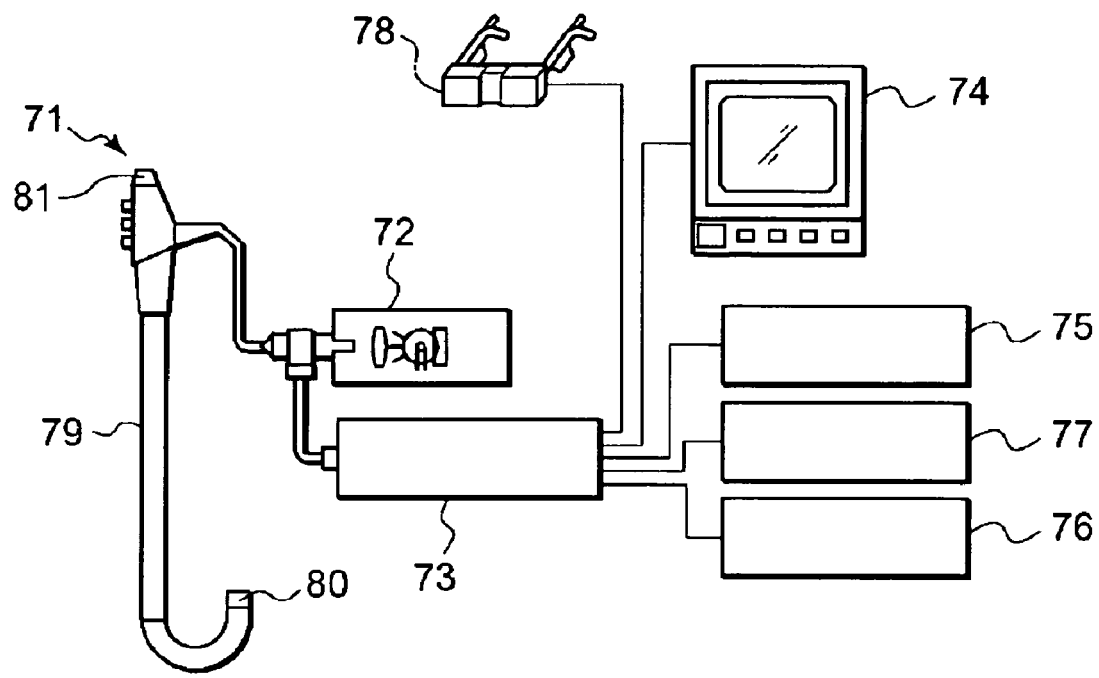
FIGS. 26A and 26B show an embodiment of an electronic endoscope system in which the zoom optical system of the present invention is applied as a picture taking optical system.
Figure 26B:
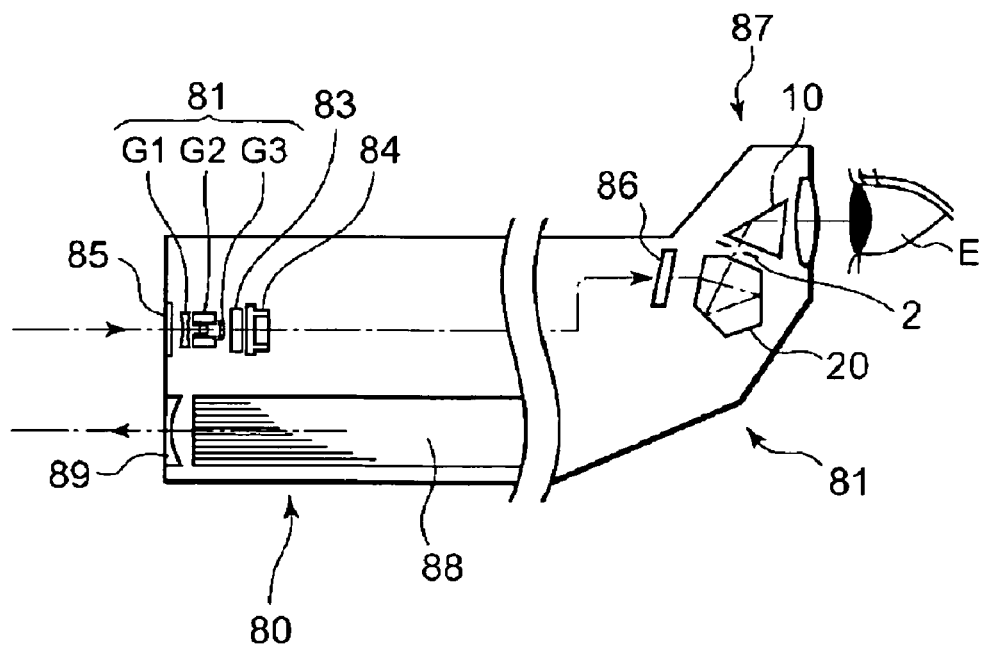

FIG. 26A is a schematic explanatory view of an electronic endoscope system in which the zoom optical system of the present invention is incorporated as an objective optical system 82 of the observation system, and FIG. 26B is an explanatory view showing a formation of the optical system built in the distal end of the electronic endoscope. In this example, a zoom optical system composed of four lenses is used as the objective optical system 82 of the observation system. An eyepiece optical system 87 includes a first prism 10, an aperture stop 2, and a second prism 20.

As shown in FIG. 26A, the electronic endoscope system includes: an electronic endoscope 71; a light source device 72 which supplies illuminative light; a video processor 73 which processes a signal for the electronic endoscope 71; a monitor 74 which displays a video signal output from the video processor 73; a VTR 75 and an optical disk 76 which are connected to the video processor 73 and which record the video signal and the like; a video printer 77 which prints out an image represented by the video signal; and a head mounted display (HMD) 78. FIG. 26B shows a formation of the optical system built in the distal end 80 of the insertion section 79 of the electronic endoscope 71, and an eyepiece section 81.

An illuminative luminous flux supplied from the light source device 72 passes through the light guide fiber bundle 88, and is guided to the distal end of the electronic endoscope 71. The observation portion is irradiated with the flux by the illumination optical system 89. Moreover, light from the observation portion enters the objective optical system 82 via the cover member 85. An object image is formed on the image pickup surface of the CCD 84 by the objective optical system 82. Reference numeral 83 denotes a filter unit including an optical low pass filter, and an infrared-ray cutting filter. Furthermore, the object image is converted into a video signal by the CCD 84, and the video signal is displayed on the monitor 74 by the video processor 73 shown in FIG. 26A. The same image is recorded in the VTR 75 and the optical disk 76. The same image is printed out of the video printer 77. The same image is displayed in the image display element of the HMD 78, and the user of the HMD 78 observes the image. The video signal obtained from the CCD 84 is displayed as an electronic image on the liquid crystal display element (LCD) 86 of the eyepiece section 81, and the image is guided to observer's eyeball E via the eyepiece optical system 87.

The endoscope mentioned above is formed with a small number of optical members, and high performance and low cost can be realized. Since lens units forming the objective optical system 80 are arranged in the longitudinal axis direction of the endoscope, the above-described effects can be obtained without increasing the diameter of the insertion section.

Figure 27:
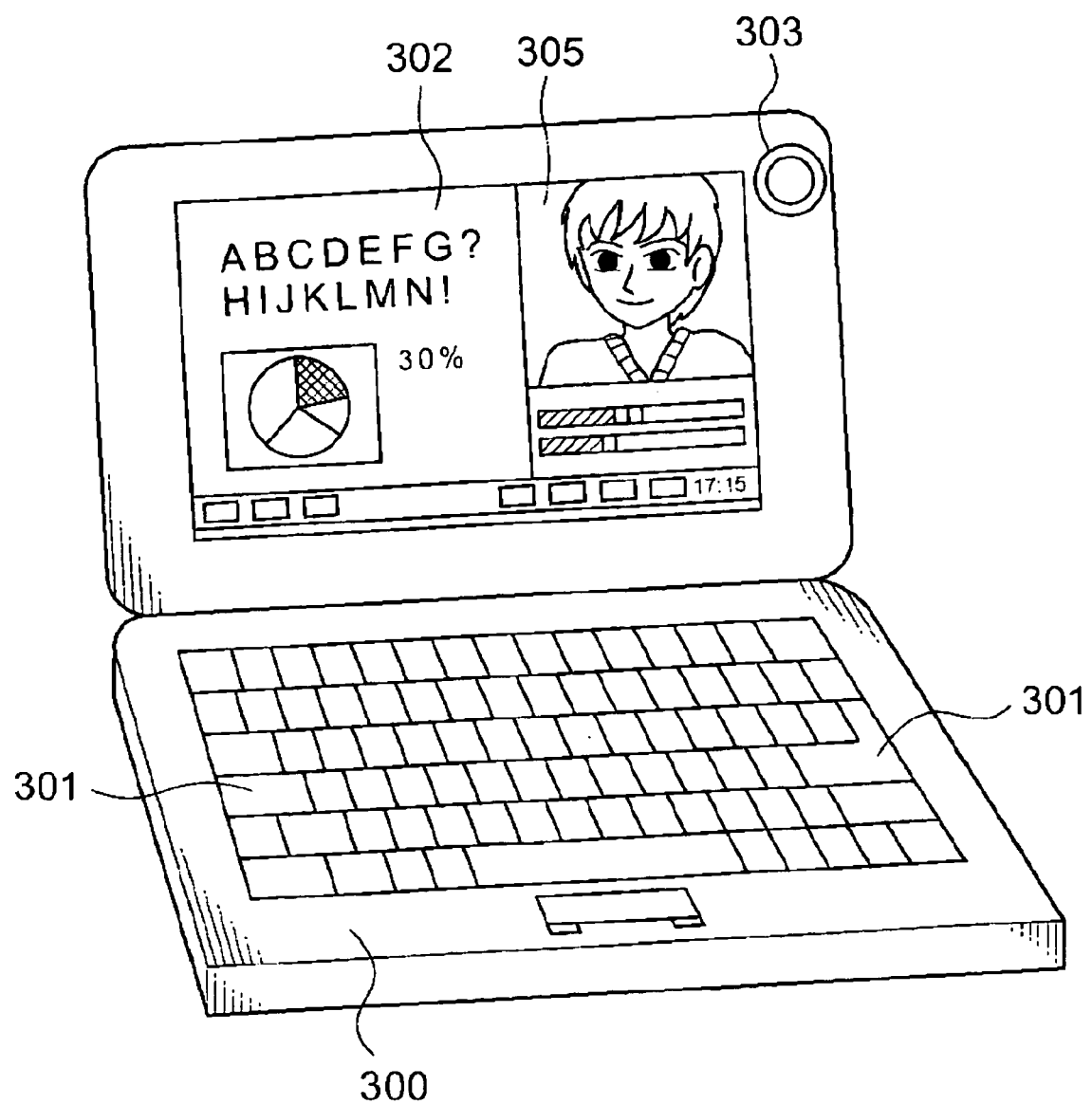
FIG. 27 to 29 shows a personal computer in which the zoom optical system of the present invention is built as a picture taking optical system.
Figure 28:
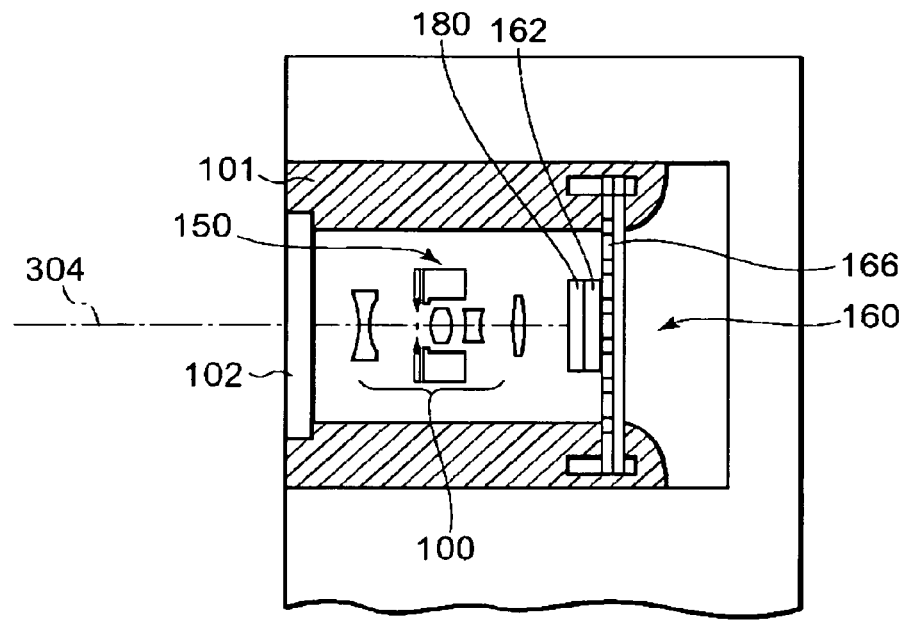
Figure 29:
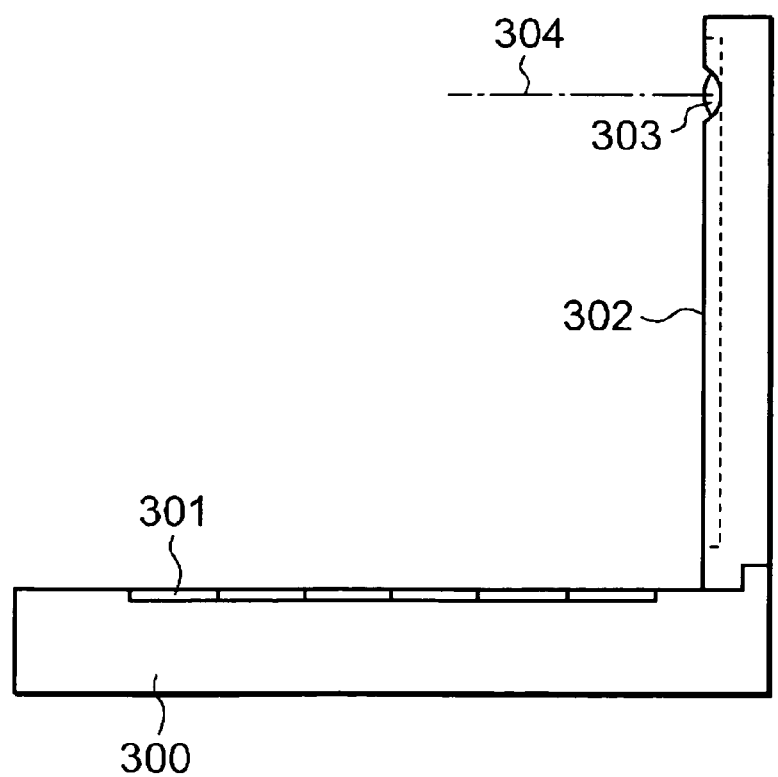

FIGS. 27 to 29 are schematic explanatory views showing a formation in which the zoom optical system of the present invention is built in a personal computer as another example of the information processing device.

FIG. 27 is a front perspective view of the state in which the cover of the personal computer 300 is opened, FIG. 28 is a sectional view of the photographing optical system 303 of the personal computer 300, and FIG. 29 is a side view of the state of FIG. 27. As shown in FIGS. 27 to 29, the personal computer 300 includes: a keyboard 301 for an operator to input information from the outside; information processing means and recording means (not shown); a monitor 302 which displays information for the operator; and the photographing optical system 303 for photographing the operator and its surroundings. Here, the monitor 302 may be a transmission type liquid crystal display element with a backlighting (not shown), a reflective liquid crystal display element which reflects light from the front to display the information, a CRT display or the like. In the drawing, the photographing optical system 303 is built in the upper right portion of the monitor 302, but may be disposed in any place such as a periphery of the monitor 302 or a periphery of the keyboard 301.

The photographing optical system 303 comprises, along the photographing optical path 304, an objective optical system 100 constituted of the zoom optical system of the present invention, a shutter mechanism 150, and an image sensor chip 162 which receives an image. They are built in the personal computer 300.

Here, an infrared-ray cutting filter 180 is attached onto the image sensor chip 162, and integrated as an image pickup unit 160 together with the image sensor chip and a substrate on which the image sensor chip is mounted. This image pickup unit is fitted into the rear end of the lens barrel 101 of the objective optical system 100 by a one-touch operation. Since the image pickup unit is thus attachable, alignment of the objective optical system 100 and the image sensor chip 162 and adjustment of the space therebetween are not required, and this facilitates assembling. Moreover, the tip of the lens barrel 101 is provided with cover glass 102 for protecting the objective optical system 100. It is to be noted that the driving mechanism or the like of the zoom optical system in the lens barrel 101 is omitted from the drawing.

It is to be noted that the infrared-ray cutting filter 180 may be omitted.

An object image received by the image sensor chip 162 is input into the processing means of the personal computer 300 via the terminal 166, and displayed as an electronic image in the monitor 302. FIG. 27 shows a photographed operator's image 305. This image 305 may be displayed in a communication target's personal computer from a remote area via the processing means and Internet and/or telephone line.

Figure 30:
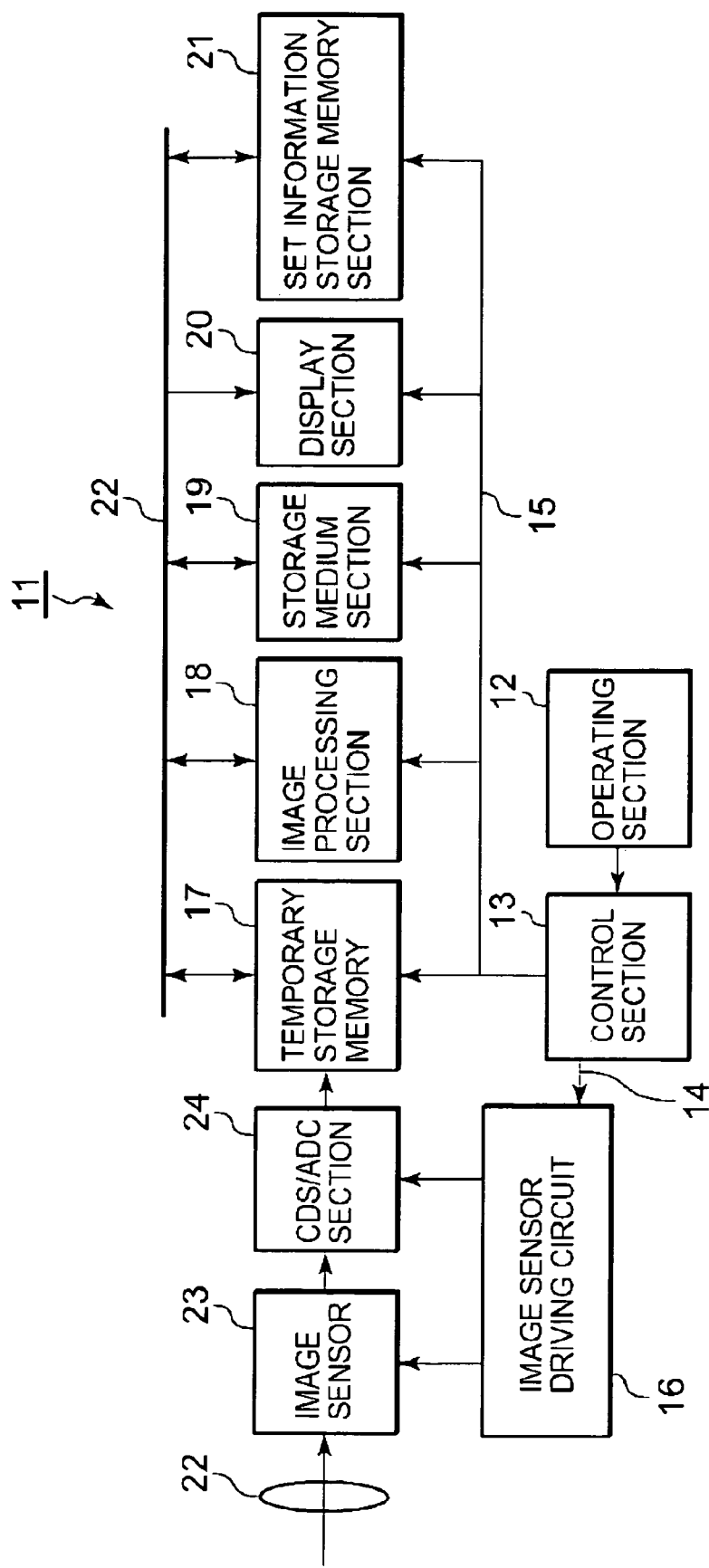
FIG. 30 is a block diagram of an example of an internal circuit that may be used with an electronic equipment such as a cellular phone, a personal computer, or an electronic camera.

FIG. 30 is a block diagram of a major part of the internal circuit of electronic equipment 11 such as a cellular phone, a personal computer, or an electronic camera. It is to be noted that in the following description, the image sensor chip 162 and the CCD 49 correspond to, for example, the image sensor 23. Moreover, the processing means 52 corresponds to the section formed of, for example, the CDS/ADC section 24, the temporary storage memory 17, the image processing section 18 and the like. The recording means 61 corresponds to, for example, the storage medium section 19 and the like.

As shown in FIG. 30, the electronic equipment 11 is provided with: an operating section 12; a control section 13 connected to the operating section 12; an image sensor driving circuit 16 and the temporary storage memory 17 connected to control signal output ports of the control section 13 via buses 14 and 15; the image processing section 18; the storage medium section 19; a display section 20; and a setting information storage memory section 21.

The temporary storage memory 17, the image processing section 18, the storage medium section 19, the display section 20, and the setting information storage memory section 21 are formed via a bus 22 so that they can mutually input or output data, and the image sensor driving circuit 16 is connected to the image sensor 23 and the CDS/ADC section 24.

The operating section 12 is a circuit which is provided with various types of input buttons and switches and which notifies the control section of event information input from the outside (electronic equipment user) via these input buttons or switches. The control section 13 is a central calculation processing device formed of, for example, a CPU and the like, and contains a program memory (not shown). The control section is a circuit which receives an instruction or a command input from the camera user via the operating section 12 to control the whole electronic equipment 11 in accordance with the program stored in the program memory.

The image sensor 23 receives an object image formed via the zoom optical system 22. The image sensor 23 is driven and controlled by the image sensor driving circuit 16, and converts, into an electric signal, a quantity of light of the object image for each pixel to output the signal to the CDS/ADC section 24.

The CDS/ADC section 24 is a circuit which amplifies the electric signal supplied from the image sensor 23 and which performs analog/digital conversion to output, to the temporary storage memory 17, video bare data (hereinafter referred to as RAW data) simply subjected to the amplification and the digital conversion.

The temporary storage memory 17 is a buffer formed of, for example, SDRAM or the like, and the memory is a memory device which temporarily stores the RAW data output from the CDS/ADC section 24. The image processing section 18 is a circuit which reads out the RAW data stored in the temporary storage memory 17 or the storage medium section 19 to electrically performs various types of image processing including distortion correction based on the image quality parameter(s) specified by the control section 13.

The storage medium section 19 is a control circuit of the device to which there is attached a detachable card or stick type recording medium constituted of, for example, a flash memory or the like and in which the RAW data transferred from the temporary storage memory 17 or the image data obtained by processing the image in the image processing section 18 is recorded and held in the card or stick type flash memory.

The display section 20 is a circuit which is provided with the liquid crystal display monitor 47 and which displays an image, an operation menu or the like in the liquid crystal display monitor 47. The setting information storage memory section 21 is provided with: a ROM section in which various types of image quality parameters are stored beforehand; and a RAM section to store the image quality parameter selected from the image quality parameters read from the ROM section by the input operation of the operating section 12. The setting information storage memory section 21 is a circuit which controls input and output with respect to the memories.

According to the present invention, it is possible to provide a small-sized zoom optical system which secures a high image-quality performance, and an electronic equipment provided with the zoom optical system.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom optical system comprising: a first lens unit having a negative refractive power; a second lens unit having a positive refractive power; and a third lens unit having a positive refractive power which are arranged in order from an object side, at least the first and second lens units being moved to change spaces between the lens units, thereby varying magnification, wherein the first lens unit includes a double-concave negative lens, the second lens unit includes a positive lens and a negative lens in order from the object side, the third lens unit includes a positive lens, a total number of lens units included in the zoom optical system is three, a total number of lenses included in the zoom optical system is four, and the following condition is satisfied:

$$-5.0<(r5+r6)/(r5-r6)<2.0 \quad (1)$$

wherein r5 denotes a radius of curvature of an image-side surface of the positive lens in the second lens unit on an optical axis, and r6 denotes a radius of curvature of an object-side surface of the negative lens in the second lens unit on the optical axis.

2. The zoom optical system according to claim 1, which satisfies the following condition:

$$-0.1<(r6+r7)/(r6-r7)<5.0 \quad (2)$$

wherein r6 denotes a radius of curvature of an object-side surface of the negative lens in the second lens unit on an optical axis, and r7 denotes a radius of curvature of an image-side surface of the negative lens in the second lens unit on the optical axis.

3. A zoom optical system comprising: a first lens unit having a negative refractive power; a second lens unit having a positive refractive power; and a third lens unit having a positive refractive power which are arranged in order from an object side, at least the first and second lens units being moved to change a space between the lens units, thereby varying magnification, wherein the first lens unit includes a double-concave negative lens, the second lens unit includes a positive lens and a negative lens in order from the object side, the third lens unit includes a positive lens, a total number of lenses included in the first through third lens units is four, and the following condition is satisfied:

$$-0.1<(r6+r7)/(r6-r7)<5.0 \quad (2)$$

wherein r6 denotes a radius of curvature of an object-side surface of the negative lens in the second lens unit on an optical axis, and r7 denotes a radius of curvature of an image-side surface of the negative lens in the second lens unit on the optical axis.

4. An electronic equipment comprising:
the zoom optical system according to claim 3.

5. A zoom optical system comprising: a first lens unit having a negative refractive power; a second lens unit having a positive refractive power; and a third lens unit having a positive refractive power which are arranged in order from an object side, an interval between the lens units being changed to vary magnification, wherein distortion of the zoom optical system satisfies the following condition:

$$-35(\%) \leq DT\min \leq -10(\%)$$

wherein DTmin is a minimum value (%) of distortion.

6. An electronic image pickup apparatus comprising:
the zoom optical system according to claim 5;
an electronic image sensor disposed on an image side of the zoom optical system; and
an image processing section which electrically processes image data captured by the electronic image sensor to change a shape of the image.

7. The zoom optical system according to claim 1 or 3, which satisfies the following condition:

$$0.53 \leq r4/fw<1.2 \quad (3)$$

wherein r4 denotes a radius of curvature of an object-side surface of the positive lens in the second lens unit on the optical axis, and fw denotes a focal length of the zoom optical system at a wide-angle end.

8. The zoom optical system according to claim 1 or 3, which satisfies the following condition:

$$0.1<r7/fw<1.1 \quad (4)$$

wherein r7 denotes a radius of curvature of the image-side surface of the negative lens in the second lens unit, and fw denotes a focal length of the zoom optical system at a wide-angle end.

9. The zoom optical system according to claim 1 or 3, satisfying the following condition:

$$50<vd1 \quad (5)$$

wherein vd1 denotes the Abbe number of the negative lens in the first lens unit.

10. The zoom optical system according to claim 1 or 3, satisfying the following condition:

$$50<vd2 \quad (6)$$

wherein vd2 denotes the Abbe number of the positive lens in the second lens unit.

11. The zoom optical system according to claim 1 or 3, satisfying the following condition:

$$1.5<N2P \quad (7)$$

wherein N2P denotes a refractive index of the positive lens in the second lens unit.

12. The zoom optical system according to claim 1 or 3, wherein an infrared-ray cutting coating is formed on a surface of the positive lens in the third lens unit.

13. The zoom optical system according to claim 1 or 3, wherein the positive lens in the third lens unit is formed as a glass lens.

14. The zoom optical system according to claim 1 or 3, wherein each of the first and second lens units is formed of at least one glass lens.

15. The zoom optical system according to claim 1 or 3, satisfying the following condition:

$$0.3<(r8+r9)/(r8-r9)<3.0 \quad (8)$$

wherein r8 denotes a radius of curvature of an object-side surface of the positive lens in the third lens unit on the optical axis, and r9 denotes a radius of curvature of an image-side surface of the positive lens in the third lens unit on the optical axis.

16. The zoom optical system according to claim 1 or 3, satisfying the following condition:

$$0.8<f2/fw<1.6 \quad (9)$$

wherein f2 denotes a focal length of the second lens unit, and fw denotes a focal length of the zoom optical system at a wide-angle end.

17. The zoom optical system according to claim 1 or 3, satisfying the following condition:

$$1.3<f3/fw<4.0 \quad (10)$$

wherein f3 denotes a focal length of the third lens unit, and fw denotes a focal length of the zoom optical system at a wide-angle end.

18. The zoom optical system according to claim 1 or 3, wherein the first lens unit is moved to perform focusing.

19. The zoom optical system according to claim 1 or 3, wherein the third lens unit is moved to perform focusing.

20. An image pickup apparatus comprising:
   the zoom optical system according to any one of claims 1, 3, and 5; and
   an electronic image sensor disposed on an image side of the zoom optical system
   wherein a sum of thicknesses of lenses constituting the second lens unit of the zoom optical system measured along an optical axis satisfies the following condition:

$$0.6 < (G2L)/Y' < 1.16 \tag{11}$$

wherein G2L denotes the sum of the thicknesses of the lenses constituting the second lens unit, and Y' denotes a length which is a half of a diagonal length of a effective image pickup area of the image sensor.

21. An electronic equipment comprising:
   the zoom optical system according to any one of claims 1, 3, and 5.

22. A zoom optical system comprising: a first lens unit having a negative refractive power; a second lens unit having a positive refractive power; and a third lens unit having a positive refractive power which are arranged in order from an object side, at least the first and second lens units being moved to change spaces between the lens units, thereby varying magnification,
   wherein the first lens unit includes a negative lens, the second lens unit includes a positive lens and a negative lens in order from the object side, the third lens unit includes a positive lens, a total number of lenses included in the first through third lens units is four,
   wherein the first lens unit is moved to perform focusing, and the following condition is satisfied:

$$-5.0 < (r5+r6)/(r5-r6) < 2.0 \tag{1}$$

wherein r5 denotes a radius of curvature of an image-side surface of the positive lens in the second lens unit on an optical axis, and r6 denotes a radius of curvature of an object-side surface of the negative lens in the second lens unit on the optical axis.

23. An electronic equipment comprising:
   the zoom optical system according to claim 22.

24. A zoom optical system comprising: a first lens unit having a negative refractive power; a second lens unit having a positive refractive power; and a third lens unit having a positive refractive power which are arranged in order from an object side, at least the first and second lens units being moved to change spaces between the lens units, thereby varying magnification,
   wherein the first lens unit includes a negative lens, the second lens unit includes a positive lens and a negative lens in order from the object side, the third lens unit includes a positive lens, a total number of lens units included in the zoom optical system is three, a total number of lenses included in the zoom optical system is four,
   wherein the third lens unit is moved to perform focusing, and the following condition is satisfied:

$$-5.0 < (r5+r6)/(r5-r6) < 2.0 \tag{1}$$

wherein r5 denotes a radius of curvature of an image-side surface of the positive lens in the second lens unit on an optical axis, and r6 denotes a radius of curvature of an object-side surface of the negative lens in the second lens unit on the optical axis.

25. An electronic equipment comprising:
   the zoom optical system according to claim 24.

26. A zoom optical system comprising: a first lens unit having a negative refractive power; a second lens unit having a positive refractive power; and a third lens unit having a positive refractive power which are arranged in order from an object side, at least the first and second lens units being moved to change a space between the lens units, thereby varying magnification,
   wherein the first lens unit includes a negative lens, the second lens unit includes a positive lens and a negative lens in order from the object side, the third lens unit includes a positive lens, a total number of lenses included in the first through third lens units is four,
   wherein the first lens unit is moved to perform focusing, and the following condition is satisfied:

$$-0.1 < (r6+r7)/(r6-r7) < 5.0 \tag{2}$$

wherein r6 denotes a radius of curvature of an object-side surface of the negative lens in the second lens unit on an optical axis, and r7 denotes a radius of curvature of an image-side surface of the negative lens in the second lens unit on the optical axis.

27. An electronic equipment comprising:
   the zoom optical system according to claim 26.

28. A zoom optical system comprising: a first lens unit having a negative refractive power; a second lens unit having a positive refractive power; and a third lens unit having a positive refractive power which are arranged in order from an object side, at least the first and second lens units being moved to change a space between the lens units, thereby varying magnification,
   wherein the first lens unit includes a negative lens, the second lens unit includes a positive lens and a negative lens in order from the object side, the third lens unit includes a positive lens, a total number of lenses included in the first through third lens units is four,
   wherein the third lens unit is moved to perform focusing, and the following condition is satisfied:

$$-0.1 < (r6+r7)/(r6-r7) < 5.0 \tag{2}$$

wherein r6 denotes a radius of curvature of an object-side surface of the negative lens in the second lens unit on an optical axis, and r7 denotes a radius of curvature of an image-side surface of the negative lens in the second lens unit on the optical axis.

29. An electronic equipment comprising:
   the zoom optical system according to claim 28.

30. A zoom optical system comprising: a first lens unit having a negative refractive power; a second lens unit having a positive refractive power; and a third lens unit having a positive refractive power which are arranged in order from an object side, at least the first and second lens units being moved to change spaces between the lens units, thereby varying magnification,
   wherein the first lens unit includes a double-concave negative lens, the second lens unit includes a positive lens and a negative lens in order from the object side, the third lens unit includes a positive lens, a total number of lenses included in the first through third lens units is four, and the following conditions are satisfied:

$$-5.0 < (r5+r6)/(r5-r6) < 2.0 \tag{1}$$

$$-0.1 < (r6+r7)/(r6-r7) < 5.0 \tag{2}$$

wherein r5 denotes a radius of curvature of an image-side surface of the positive lens in the second lens unit on an optical axis, r6 denotes a radius of curvature of an object-side surface of the negative lens in the second lens unit on the optical axis, and r7 denotes a radius of curvature of an image-side surface of the negative lens in the second lens unit on the optical axis.

31. A zoom optical system comprising: a first lens unit having a negative refractive power; a second lens unit having a positive refractive power; and a third lens unit having a positive refractive power which are arranged in order from an object side, at least the first and second lens units being moved to change spaces between the lens units, thereby varying magnification, wherein the first lens unit includes a double-concave negative lens, the second lens unit includes a positive lens and a negative lens in order from the object side, the third lens unit includes a positive lens, a total number of lens units included in the zoom optical system is three, a total number of lenses included in the first through third lens units is four, and the following conditions are satisfied:

$$-5.0 < (r5+r6)/(r5-r6) < 2.0 \quad (1)$$

$$0.1 < r7/fw < 1.1 \quad (4)$$

wherein r5 denotes a radius of curvature of an image-side surface of the positive lens in the second lens unit on an optical axis, r6 denotes a radius of curvature of an object-side surface of the negative lens in the second lens unit on the optical axis, r7 denotes a radius of curvature of the image-side surface of the negative lens in the second lens unit, and fw denotes a focal length of the zoom optical system at a wide-angle end.

32. A zoom optical system comprising: a first lens unit having a negative refractive power; a second lens unit having a positive refractive power; and a third lens unit having a positive refractive power which are arranged in order from an object side, at least the first and second lens units being moved to change spaces between the lens units, thereby varying magnification, wherein the first lens unit includes a double-concave negative lens, the second lens unit includes a positive lens and a negative lens in order from the object side, the third lens unit includes a positive lens, a total number of lenses included in the first through third lens units is four, and the following conditions are satisfied:

$$-5.0 < (r5+r6)/(r5-r6) < 2.0 \quad (1)$$

$$0.3 < (r8+r9)/(r8-r9) < 3.0 \quad (8)$$

wherein r5 denotes a radius of curvature of an image-side surface of the positive lens in the second lens unit on an optical axis, r6 denotes a radius of curvature of an object-side surface of the negative lens in the second lens unit on the optical axis, r8 denotes a radius of curvature of an object-side surface of the positive lens in the third lens unit on the optical axis, and r9 denotes a radius of curvature of an image-side surface of the positive lens in the third lens unit on the optical axis.

33. A zoom optical system comprising: a first lens unit having a negative refractive power; a second lens unit having a positive refractive power; and a third lens unit having a positive refractive power which are arranged in order from an object side, at least the first and second lens units being moved to change spaces between the lens units, thereby varying magnification, wherein the first lens unit includes a double-concave negative lens, the second lens unit includes a positive lens and a negative lens in order from the object side, the third lens unit includes a positive lens, a total number of lenses included in the first through third lens units is four, wherein the first lens unit is moved to perform focusing, and the following condition is satisfied:

$$-5.0 < (r5+r6)/(r5-r6) < 2.0 \quad (1)$$

wherein r5 denotes a radius of curvature of an image-side surface of the positive lens in the second lens unit on an optical axis, and r6 denotes a radius of curvature of an object-side surface of the negative lens in the second lens unit on the optical axis.

* * * * *

UNITED STATES PATENT AND TRADEMARK OFFICE
CERTIFICATE OF CORRECTION

| | |
|---|---|
| PATENT NO. | : 7,768,716 B2 |
| APPLICATION NO. | : 11/356205 |
| DATED | : August 3, 2010 |
| INVENTOR(S) | : Y. Kobayashi et al. |

It is certified that error appears in the above-identified patent and that said Letters Patent is hereby corrected as shown below:

On the title page item (73) Assignee: should read:

(73) Assignee: Olympus Imaging Corp., Tokyo (JP)
Olympus Corporation, Tokyo (JP)

Signed and Sealed this
Twenty-sixth Day of April, 2011

David J. Kappos
*Director of the United States Patent and Trademark Office*